(12) United States Patent
Sato et al.

(10) Patent No.: US 7,028,905 B2
(45) Date of Patent: Apr. 18, 2006

(54) INEXPENSIVE AND EASY-TO-HANDLE STRUCTURE OF OPTICAL INFORMATION READING APPARATUS

(75) Inventors: Masaki Sato, Kariya (JP); Hisashi Shigekusa, Okazaki (JP); Minoru Uchida, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 143 days.

(21) Appl. No.: 10/442,128

(22) Filed: May 21, 2003

(65) Prior Publication Data

US 2003/0222150 A1  Dec. 4, 2003

(30) Foreign Application Priority Data

| May 30, 2002 | (JP) | ............................. 2002-157647 |
| May 31, 2002 | (JP) | ............................. 2002-159520 |
| May 31, 2002 | (JP) | ............................. 2002-159521 |
| Aug. 30, 2002 | (JP) | ............................. 2002-252981 |
| Sep. 5, 2002 | (JP) | ............................. 2002-259972 |

(51) Int. Cl.
*G06K 7/10* (2006.01)

(52) U.S. Cl. ............................. 235/462.45; 235/472.01
(58) Field of Classification Search .......... 235/462.45, 235/462.46, 462.47, 472.01, 472.02, 472.03
See application file for complete search history.

(56) References Cited

U.S. PATENT DOCUMENTS

| 4,621,189 A | * | 11/1986 | Kumar et al. .......... 235/462.45 |
| 4,983,818 A | * | 1/1991 | Knowles ................ 235/462.47 |
| 5,410,141 A | * | 4/1995 | Koenck et al. ........ 235/472.02 |
| 5,786,585 A | | 7/1998 | Eastman et al. |

FOREIGN PATENT DOCUMENTS

| EP | 0945818 A2 | 9/1999 |
| JP | 10-269339 | 10/1998 |
| JP | 11-328121 | 11/1999 |

* cited by examiner

*Primary Examiner*—Karl D. Frech
(74) *Attorney, Agent, or Firm*—Posz Law Group, PLC

(57) ABSTRACT

An optical information reading apparatus is provided which is made of an assembly of a barcode reader and a personal digital assistant (PDA). The barcode reader and the PDA are joined through an attachment. The barcode reader includes a joint detector working to detect the joint to the PDA and a communication system establishing communication with the PDA. The barcode reader works to transmit barcode data to the PDA through the communication system only when the joint detector has detected the joint to the PDA, thereby providing ease of operability, useability, etc.

63 Claims, 34 Drawing Sheets

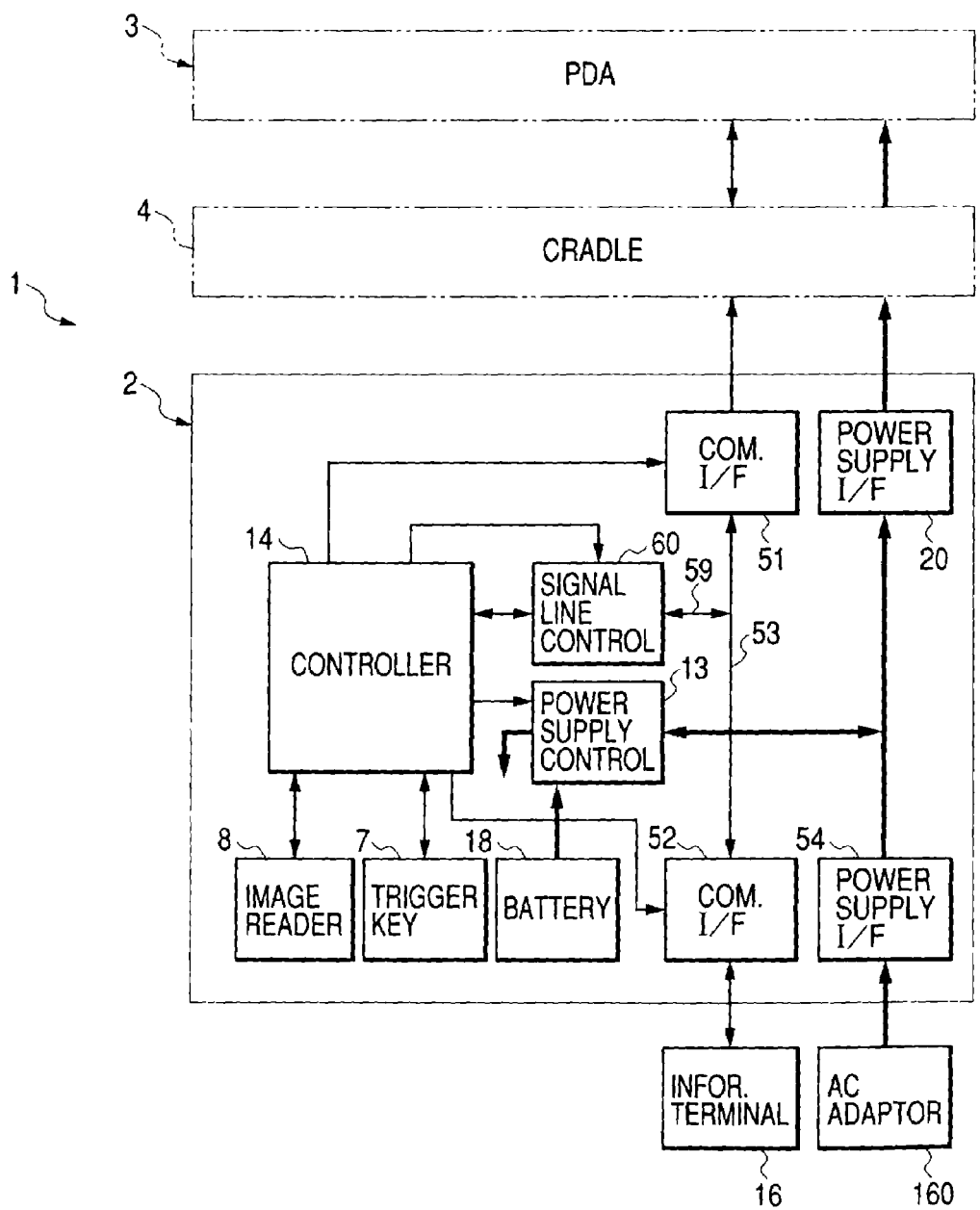

|  | BF1 | BF2 | BF3 |
|---|---|---|---|
| PDA JOINT DETECTED | OFF | ON | ON |
| EXTERNAL JOINT DETECTED | ON | OFF | ON |
| COM. WITH PDA | OFF | ON | ON |
| COM. WITH EXTERNAL | ON | OFF | ON |
| PDA COM. | ON | ON | ※ |

FIG. 42(a)

|  | PDA INTERLOCK MODE | PDA UNINTERLOCK MODE |
|---|---|---|
| BARCODE READER READ ENABLE MODE | ○ | × |
| BARCODE READER STANDBY MODE | ○ | ○ |

FIG. 42(b)

|  | PDA INTERLOCK MODE | PDA UNINTERLOCK MODE |
|---|---|---|
| BARCODE READER READ ENABLE MODE | KEEP MODE | SEE FIG. 42(a) |
| BARCODE READER STANDBY MODE | CHANGE TO READ ENABLE MODE | SEE FIG. 42(c) |

FIG. 42(c)

|  | MODE REQUEST SIGNAL RECEIVED | NO MODE REQUEST SIGNAL RECEIVED |
|---|---|---|
| BARCODE READER STANDBY MODE | CHANGE TO INTERLOCK MODE IN PDA CHANGE TO READ ENABLE MODE IN BARCODE READER | KEEP STANDBY MODE |

INEXPENSIVE AND EASY-TO-HANDLE STRUCTURE OF OPTICAL INFORMATION READING APPARATUS

BACKGROUND OF THE INVENTION

1. Technical Field of the Invention

The present invention relates generally to an improved structure of a portable optical information reading apparatus which works to optically read a code such as a barcode or a two-dimensional code and process input data.

2. Background Art

In recent years, portable devices made of an optical information reading unit such as a barcode reader to which a function of collecting and processing input data is added have been employed as a barcode handy terminal (BHT). Particularly, of such portable devices, a handheld type equipped with a gun grip is very popular in users.

For example, Japanese Patent First Publication No. 11-328121 discloses a BHT which is made up of a personal digital assistant (PDA) and a barcode reader built in the PDA and equipped with a gun grip. Japanese Patent First Publication No. 10-269339 discloses a BHT with a detachable grip.

The former BHT has drawbacks in that the building of the barcode reader in the PDA results in increases in development and production cost, thus making it difficult to produce the BHT on a commercial basis and in that in stand-alone use of the PDA without performing a barcode reader function, the bulky size of the PDA creates inconvenience for the user.

The latter BHT has drawbacks in that it is expensive and inferior in portability and operability of the BHT in a case where the grip is removed from the BHT.

SUMMARY OF THE INVENTION

It is therefore a principal object of the invention to avoid the disadvantages of the prior art.

It is another object of the invention to provide an inexpensive and simple structure of an optical information reading apparatus which is superior in portability, operability, and/or useability.

According to one aspect of the invention, there is provided an optical information reading apparatus which comprises: (a) a handheld optical information reading unit working to read optical information and output data on the optical information; (b) a portable information terminal designed to receive and process information to output the information; and (c) an attachment establishing a joint between said optical information reading unit and said portable information terminal. The optical information reading unit includes a joint detector working to detect the joint between said optical information reading unit and said portable information terminal and a communication system establishing communication with said portable information terminal. The optical information reading unit works to transmit the data on the optical information to said portable information terminal through the communication system when the joint detector has detected the joint between the optical information reading unit and the portable information terminal.

Specifically, joining the optical information reading unit to the portable information terminal through the attachment forms a handy terminal easily. The optical information reading unit determines whether it is joined to the portable information terminal or not, thereby permitting the optical information reading unit to decide whether it should be used alone or may be used in combination with the portable information terminal.

In the preferred mode of the invention, the communication system transmits the data on the optical information to the portable information terminal through wire communication. Each of the optical information reading unit and the portable information terminal is equipped with a wire communication connector. The attachment includes a first connector joined to the connector of the portable information terminal, a second connector joined to the connector of the optical information reading unit, and a signal line connecting between the first and second connectors.

The attachment includes a signal converter which works to convert a signal inputted to the first connector into a signal to be outputted from the second connector and also convert a signal inputted to the second connector into a signal to be outputted from the first connector.

The joint detector is designed to determine that the optical information reading unit is joined to the portable information terminal when the joint detector has outputted a test signal to the portable information terminal through the communication system and received a given answer signal from the portable information terminal.

The optical information reading unit may alternatively be designed to determine that the optical information reading unit is joined to the portable information terminal when the joint detector has received a given test signal from the portable information terminal through the communication system.

The optical information reading unit may alternatively be designed to determine that the optical information reading unit is joined to the portable information terminal when at least one of signal terminals of the communication system shows a predetermined electrical characteristic.

The predetermined electrical characteristic of the signal terminal of the communication system may be one of a voltage and an impedance.

The joint detector includes a joint sensor which senses the joint between the optical information reading unit and the portable information terminal and outputs a joint signal indicative thereof. The optical information reading unit determines that the optical information reading unit is joined to the portable information terminal when the joint sensor outputs the joint signal.

The joint sensor may be implemented by a contactless sensor using one of light and magnetism which outputs the joint signal when the portable information terminal has a preselected positional relation to the optical information reading unit.

The optical information reading unit has a wire communication system for establishing communication with an external information processing device. The wire communication system is designed to achieve transmission of data between the portable information terminal and the external information processing device.

When the joint detector does not detect the joint between the optical information reading unit and the portable information terminal, the optical information reading unit transmits the data on the optical information to the external information processing device through the wire communication system.

The optical information reading apparatus may further comprise a selecting circuit which switches between a normal mode in which the data on the optical information is transmitted to the external information processing device through the wire communication system and a bus use mode in which the portable information terminal uses the wire communication system. When the selecting circuit receives an information transmission request from the portable information terminal, the selecting circuit establishes the bus use mode.

The selecting circuit monitors use of the wire communication system in the bus use mode and determines that the portable information terminal has completed use of the wire communication system when no transmission is established by the wire communication system for a given period of time.

The attachment may have a data entry portion equipped with numeral keys which transmit input numeral data to the portable information terminal.

The portable information terminal may have a radio communication system which establishes radio communication with an external information processing device. In this case, the portable information terminal works to transmit the data on the optical information received through the communication system from the optical information reading unit to the external information processing device through the radio communication system.

The portable information terminal has a communication system. The attachment is designed to mount the portable information terminal on the optical information reading unit. The attachment has a first attachment surface to which the portable information terminal is joined detachably and a second attachment surface to be joined to the optical information reading unit. The optical information reading apparatus may further comprise an electrical connection member which establishes an electrical connection between the communication systems of the portable information terminal and the optical information reading unit.

The attachment has formed on the first attachment surface a pocket into which at least a lower portion of the portable information terminal is inserted so that the lower portion is held at front, back, side, and lower surfaces thereof within the pocket.

The attachment may include a retainer which retains and holds the portable information terminal from moving in a longitudinal direction of the portable information terminal from a lower to an upper portion of the portable information terminal.

The retainer may have a stopper which holds the portable information terminal from moving in a direction parallel to the first attachment surface.

The retainer may also have a claw which holds the portable information terminal from moving in a direction perpendicular to the first attachment surface.

The retainer may be designed to be movable between a locked position where the upper portion of the portable information terminal is locked to retain the portable information terminal on the attachment and an unlocked position which permits the portable information terminal to be removed from the attachment.

The retainer may be designed to be pivotable to an angular position where the retainer makes an acute angle with the second attachment surface of the attachment. The retainer serves as a support in the angular position which works to keep the attachment at a tilt angle on a plane.

The first and second attachment surfaces are opposed to each other and extend substantially parallel to each other.

Each of the communication systems of the portable information terminal and the optical information reading unit may have a wire communication connector. The electrical connection member may be implemented by a cable connecting the wire communication connectors of the portable information terminal and the optical information reading unit. The cable may be installed in the attachment.

The attachment may have a joint mechanism provided on the second attachment surface. The optical information reading unit may also have a joint mechanism which establishes a mechanical joint to the joint mechanism of the attachment through sliding motion of the attachment relative to the optical information reading unit.

The joint mechanism of the optical information reading unit has a path along which the joint mechanism of the portable information terminal slides in engagement with the joint mechanism of the optical information reading unit. The joint mechanism of the optical information reading unit has at one end of the path a stopper defining a limit of the sliding motion of the attachment and at the other end of the path an elastically deformable release deterrent working to deter the joint mechanism of the attachment from moving out of the engagement with the joint mechanism of the optical information reading unit.

The joint mechanism of the optical information reading unit extends in parallel to an optical axis of an optically reading system of the optical information reading unit.

The joint mechanism of the optical information reading unit may include a joint groove formed in an outer surface of the optical information reading unit.

The joint mechanism of the optical information reading unit may be designed to have a structure common to a plurality of attachments holding portable information terminals different in external shape from each other.

The attachment may be designed to bear the portable information terminal on a plane through a side of the attachment and a grip installed on the optical information reading unit so as to orient a front surface of the portable information terminal upward at a tilt angle to the plane.

The optical information reading apparatus may further comprise an intercommunication system which establish intercommunication between the portable information terminal and the optical information reading unit. The optical information reading unit may be equipped with a power output terminal which is used to supply an operating electrical power to the portable information terminal through a power input terminal installed in the portable information terminal.

The attachment may have a first power supply terminal joined to the power input terminal of the portable information terminal, a second power supply terminal joined to the power output terminal of the optical information reading unit, and a power supply connecting line connecting the first and second power supply terminals.

The attachment includes a voltage converter which works to convert a voltage of the operating electrical power inputted to the second power supply terminal into a voltage required to operate the portable information terminal correctly and output the converted voltage to the first power supply terminal.

The voltage converter may be made of a switching regulator which operates on the operating electrical power inputted to the second power supply terminal.

The attachment may be designed to establish communication with an external power supply and supply an operating electrical power provided by the external power supply to the portable information terminal through the first power supply terminal.

The intercommunication system may be implemented by a wire communication system. The attachment may include a fist and a second connector for establishing communication between the optical information reading unit and the portable information terminal through the wire communication system. The first and second power supply terminals are provided by portions of terminals installed in the first and second connectors.

When the joint detector detects the joint between the portable information terminal and the optical information reading unit, the optical information reading unit may output the operating electrical power from the power output terminal.

The optical information reading unit and the portable information terminal have installed therein batteries which work to provide electrical power to drive the optical information reading unit and the portable information terminal, respectively. The optical information reading unit compares an operable time of the optical information reading unit as estimated by an available reserve power remaining in the battery of the optical information reading unit with an operable time of the portable information terminal as estimated by an available reserve power remaining in the battery of the portable information terminal. When it is determined that the operable time of the portable information terminal is shorter than that of the optical information reading unit, the optical information reading unit outputs the operating electrical power from the power output terminal.

The optical information reading unit may have a feeder terminal for receiving an operating electrical power from an external power supply and works to output a portion of the operating electrical power from the power output terminal.

The optical information reading unit may have installed therein a battery working to provide an operating electrical power to the optical information reading unit and include a charging portion working to charge the battery with the operating electrical power supplied from the external power supply.

The feeder terminal is provided by a terminal of a connector installed in a lower end of a grip of the optical information reading unit. The optical information reading unit receives the operating electrical power from the external power supply through a feeder line connected detachably to the connector.

The connector may include a signal terminal used to establish wire communication with an external information processing device.

According to the second aspect of the invention, there is provided an optical information reading apparatus which comprises: (a) a handheld optical information reading unit working to read optical information and output data on the optical information, the optical information reading unit having installed therein a battery which works to provide an operating electrical power to drive the optical information reading unit; (b) a portable information terminal designed to receive and process information to output the information, the portable information terminal being joined detachably to the optical information reading unit, the portable information terminal having installed therein a battery which works to provide an operating electrical power to drive the portable information terminal; (c) a data transmission system establishing transmission of data between the optical information reading unit and the portable information terminal; and (d) a power supply connector which works to supply the operating electrical power produced by the battery of one of the optical information reading unit and the portable information terminal to the other of the optical information reading unit and the portable information terminal. This results in an increase in total operable time of the optical information reading apparatus.

In the preferred mode of the invention, the power supply connector includes a voltage converter made up of an output voltage converting circuit which works to convert a voltage of the operating electrical power to be supplied from the optical information reading unit to the portable information terminal into a voltage required to operate the portable information terminal correctly and an input voltage converting circuit which works to convert a voltage of the operating electrical power to be supplied from the portable information terminal to the optical information reading unit into a voltage required to operate the optical information reading unit correctly.

The optical information reading apparatus may further comprise an attachment which establishes a physical joint between the optical information reading unit and the portable information terminal. The voltage converter is installed in the attachment.

The voltage converter may alternatively be installed in the optical information reading unit.

The voltage converter may be installed detachably in the optical information reading unit.

The output voltage converting circuit of the voltage converter may be installed in the portable information terminal. The input voltage converting circuit may be installed in the optical information reading unit.

The optical information reading unit works to determine an operable time of the portable information terminal and compares the operable time with an operable time of the optical information reading unit as estimated by an available reserve power remaining in the battery of the optical information reading unit. A power supply controlling circuit is provided which works to supply the operating electrical power from one of the optical information reading apparatus and the portable information terminal which is determined to be shorter in the operable time to the other of the optical information reading apparatus and the portable information terminal.

The optical information reading unit determines the operable time of the portable information terminal using data on an available reserve power remaining in the battery of the portable information terminal as received through the data transmission system from the portable information terminal.

The optical information reading unit receives the data on the available reserve power of the battery from the portable information terminal at a given time interval and decreases the given time interval as the operable time as determined by the received data on the available reserve power decreases.

The battery of the optical information reading unit has a capacity ensuring the operable time longer than that of the portable information terminal.

According to the third aspect of the invention, there is provide an optical information reading apparatus which comprises: (a) a handheld optical information reading unit working to read optical information and output data on the optical information; (b) a portable information terminal designed to receive and process information to output the information, the portable information terminal being joined releasably to the optical information reading unit; and (c) a data transmission system establishing transmission of data between the optical information reading unit and the portable information terminal. The portable information terminal is designed to operate selectively in an interlocking mode which permits the portable information terminal to receive the data from the optical information reading unit and an uninterlocking mode in which reception of the data from the optical information reading unit is infeasible. The optical information reading unit is designed to operate selectively in a read enable mode which enables the optical information reading unit to read the optical information and a standby mode in which electrical power to be consumed by the optical information reading unit is saved without reading the optical information. The optical information reading unit includes a mode detecting circuit working to detect an operating mode of the portable information terminal in connection with the portable information terminal and a mode limiting circuit working to limit an operating mode thereof to one of the read enable mode and the standby mode as a function of the operating mode as detected by the mode detecting circuit.

When the mode detecting circuit does not detect the interlocking mode of the portable information terminal, the mode limiting circuit prohibits the optical information reading unit from entering the read enable mode.

The optical information reading unit switches the operating mode thereof from the standby mode to the read enable mode in response to a given mode selecting operation, after which when the mode detecting circuit does not detect the interlocking mode of the portable information terminal, the mode limiting circuit returns the operating mode of the optical information reading unit to the standby mode.

A switch from the standby mode to the read enable mode in the optical information reading unit is accomplished in response to actuation of a data reading key.

The mode detecting circuit receives a mode indicative signal from the portable information terminal through the data transmission system to determine the operating mode of the portable information terminal.

The mode detecting circuit outputs a mode request signal to the portable information terminal through the data transmission system and determines that the portable information terminal is in the interlocking mode when a given answer signal is received from the portable information terminal.

The data transmission system may include a signal converter which works to convert a signal outputted from one of the optical information reading unit and the portable information terminal into a signal in a form of communication matching a protocol of the other of the optical information reading unit and the portable information terminal.

An attachment may be provided which establishes a joint between the optical information reading unit and the portable information terminal, and wherein the signal converter is installed in the attachment.

The portable information terminal is responsive to input of the mode request signal from the optical information reading unit to switch the operating mode thereof to the interlocking mode and output a given answer signal indicative the interlocking mode to the optical information reading unit.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 28 is a block diagram which shows an optical information reading apparatus according to the tenth embodiment of the invention;

FIGS. 42(a), 42(b), and 42(c) are tables listing combinations of operating modes of a barcode reader and a PDA of the optical information reading apparatus of FIG. 41.

DESCRIPTION OF THE PREFERRED EMBODIMENTS

Figure 1:
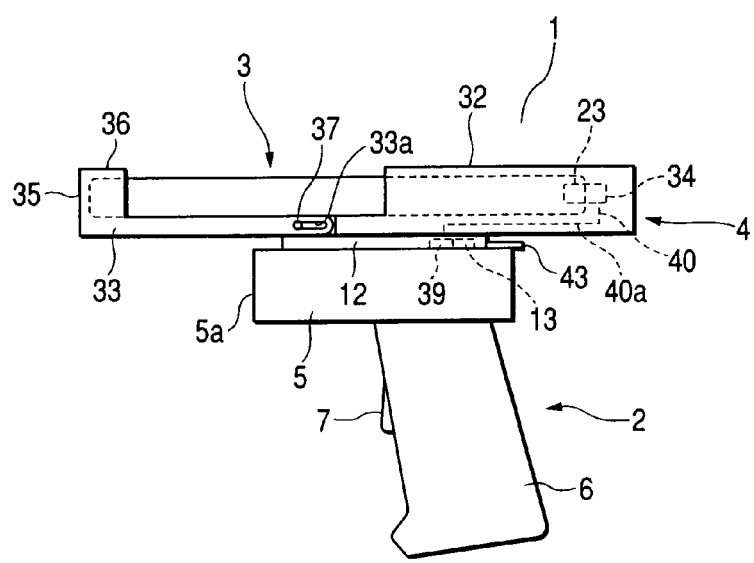
FIG. 1 is a side view which shows an optical information reading apparatus according to the first embodiment of the invention.

Referring to the drawings, wherein like reference numbers refer to like parts in several views, particularly to FIG. 1, there is shown an optical information reading apparatus 1 according to the first embodiment of the invention.

The optical information reading apparatus 1 consists essentially of a handheld barcode reader 2 (also called a gun scanner), a commercially available personal digital assistant (PDA) 3, and a holder or cradle 4 on which the PDA 3 is mounted. The handheld barcode reader 2 and the PDA 3 are assembled through the cradle 4 to form a barcode handy terminal (BHT) which works to optically read and decode a barcode.

Figure 2:
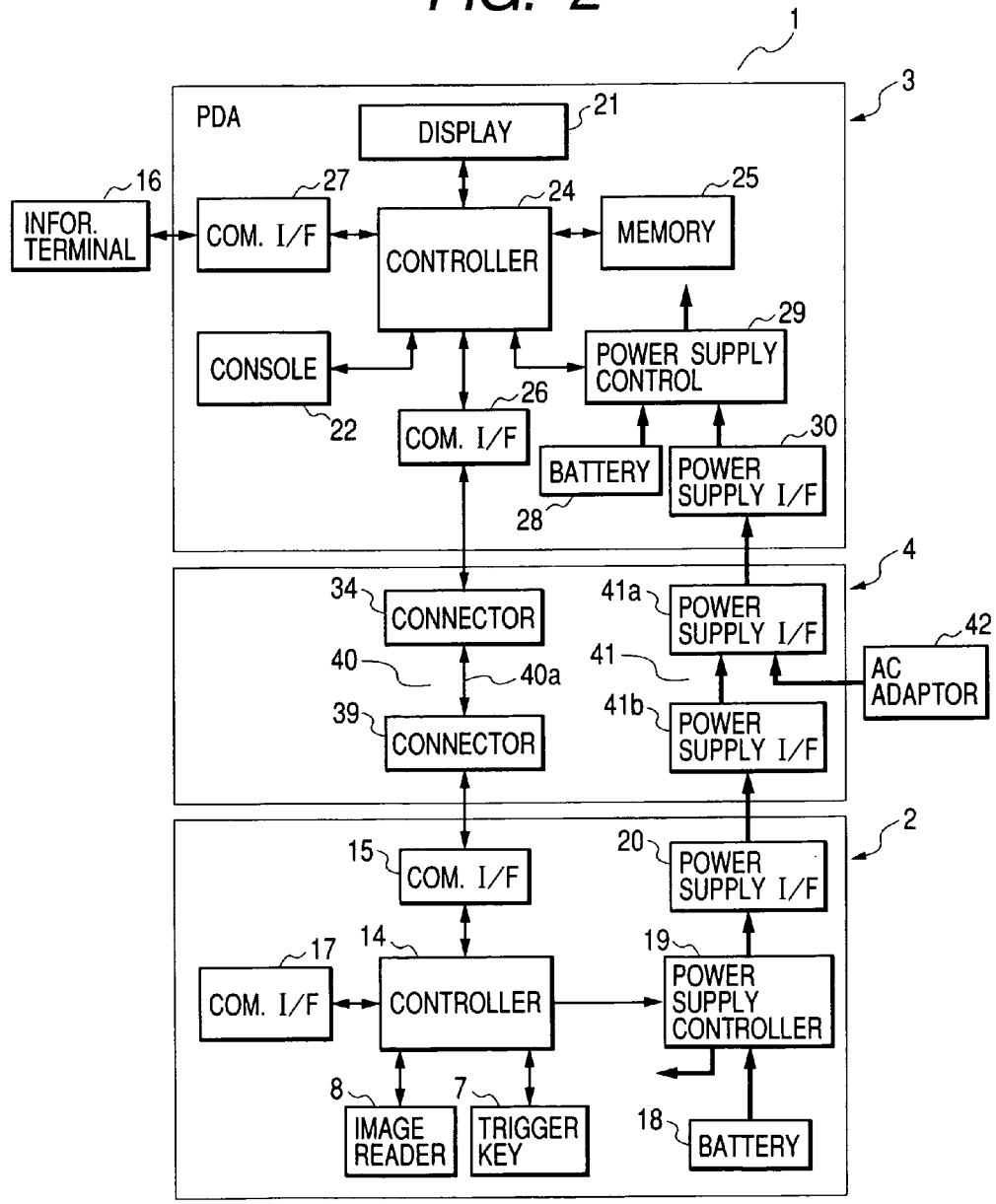
FIG. 2 is a block diagram which shows an electrical structure of the optical information reading apparatus of FIG. 1.
Figure 3:
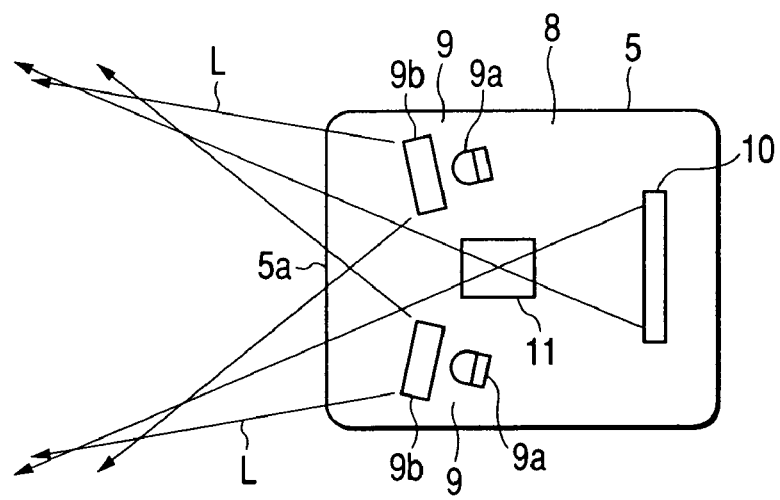
FIG. 3 is a top view which shows an optical system of a barcode reader of the optical information reading apparatus of FIG. 1.
Figure 4:
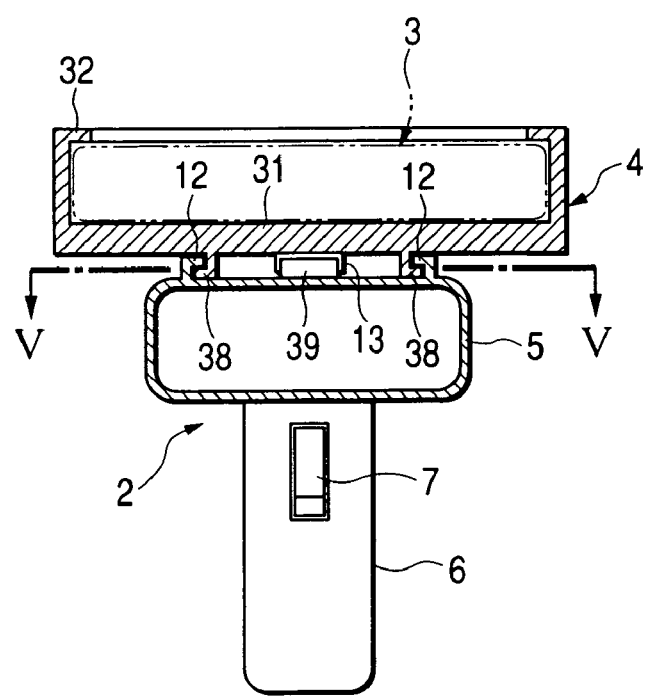
FIG. 4 is a vertically sectional view which shows a joint structure of the optical information reading apparatus of FIG. 1.
Figure 8A:
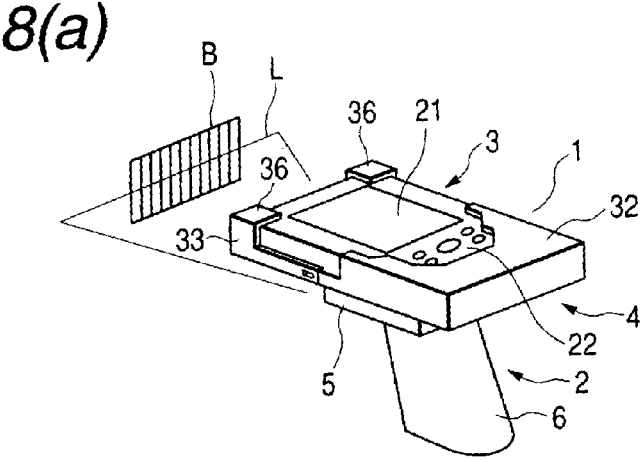
FIG. 8(a) is a perspective view which shows the optical information reading apparatus of FIG. 1 when scanning a barcode.
Figure 8B:
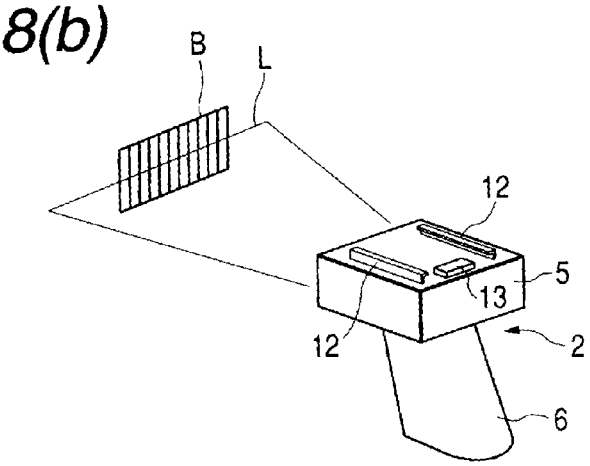
FIG. 8(b) is a perspective view which shows a barcode reader used alone to scan a barcode.
Figure 9:
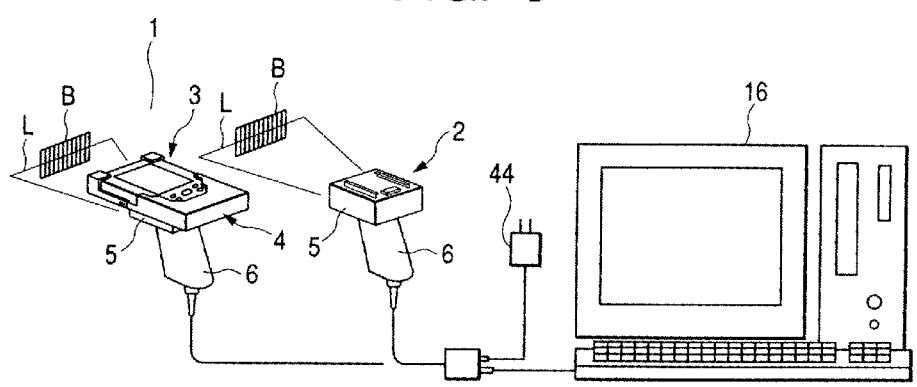
FIG. 9 is a perspective view which shows data transmission between the optical information reading apparatus of FIG. 1 and an external information processing device.

The handheld barcode reader 2 is, as shown in FIGS. 4, 8(b), and 9, made up of a rectangular box-like base body 5 and a grip 6 attached integrally to the bottom of the base body 5. The grip 6 extends downward and slightly backward, as viewed in FIG. 1, and has a trigger key 7 installed in a front wall thereof. The base body 5 has a length extending horizontally, as viewed in FIGS. 1 and 3, and a scan window 5a formed in a front wall thereof. An image reading device 8 is, as illustrated in FIGS. 2 and 3, installed within the base body 5.

The image reading device 8 has a know structure which consists, as clearly shown in FIG. 3, of right and left lighting systems 9 each made up of a light source 9a such as an LED, an image capturing device 10 including a CCD sensor, and an image-forming lens 11. When an operator or user turns, as illustrated in FIGS. 8(a) and 8(b), the scan window 5a of the base body 5 toward an optically reading target or barcode B and turns on the trigger key 7, the lighting systems 9 emit beams of light L extending laterally. Returns of the beams L enter the image-forming lens 11 to form an image of the barcode B on the image capturing device 10. The image reading device 8 is capable of reading the barcode B located more than 30 mm away and designed to optically indicates a readable range.

The base body 5, as clearly shown in FIGS. 4 and 5, has formed on an upper surface thereof L-shaped joint rails 12 which, as will be described later in detail, work to retain the base body 5 on the cradle 4 detachably. The base body 5 also has formed thereon a connector 13 for data transmission. The barcode reader 2, as shown in FIG. 2, has disposed therein a controller 14 made by a microcomputer, etc. to which the image reading device 8 is connected, and an output signal of the trigger key 7 is inputted.

The controller 14 also connects with a communication I/F 15 for outputting data acquired by the image reading device 8 to the PDA 3 through the connector 13 and with an external communication I/F 17 for establishing communication with an external information terminal 16 such as a personal computer, as illustrated in FIG. 9. The barcode reader 2 has also disposed therein a storage battery 18 which works to supply the power to each component through a power supply controller 19 controlled by the controller 14 and a power supply I/F 20 for supplying the power to the PDA 3.

The PDA 3, as clearly shown in FIGS. 8(a), 8(b), and 9, includes a rectangular thin box which has a display 21 such as a liquid crystal display installed on a front surface thereof and an operating unit or console 22 equipped with a plurality of data entry keys located adjacent the display 21. The PDA 3, as shown in FIG. 1, has a connector 23 installed in the bottom thereof for data transmission. The PDA 3 may be one of commercially available PDAs selected for an intended application.

The PDA 3, as clearly shown in FIG. 2, has disposed therein a controller 24 which is implemented by a microcomputer working to control a whole system operation and handle a variety of data sets. The controller 24 also works to control the display 21 and receives operating signals inputted at the console 22. The controller 24 has installed therein a memory 25 in which programs and data are stored.

The controller 24 also connects with a communication I/F 26 for entry of data outputted from the barcode reader 2 through the connector 23 and with an external communication I/F 27 for establishing communication with the external information terminal 16, as illustrated in FIG. 9. The PDA 3 has also disposed therein a storage battery 28 which works to supply the power to each component through a power supply controller 29 controlled by the controller 24 and a power supply I/F 30 for receiving the electrical power from the barcode reader 2. The PDA 3 works to process, store, and display input data and output processed data.

The cradle 4, as will be discussed later in detail, works as an attachment which joins the barcode reader 2 and the PDA 3 detachably and includes, as clearly shown in FIGS. 4 and 6, a holder or pocket 32 formed on a base portion of a mount plate 31 on which the PDA 3 is disposed and a retainer 33 attached to a top portion of the mount plate 31 for holding the PDA 3 tightly on the mount plate 31. The mount plate 31 is, as can be seen from FIGS. 6 and 11, made of a flat plate which has a size enough to bear a lower portion of the PDA 3. The flat plate has an upper surface working as a first attachment surface to which the PDA 3 is attached detachably and a lower surface working as a second attachment surface which is engageble with the joint rails 12 of the barcode reader 2. The first and second attachment surfaces of the cradle 4 are opposed to each other and extend substantially parallel to each other.

Figure 6:
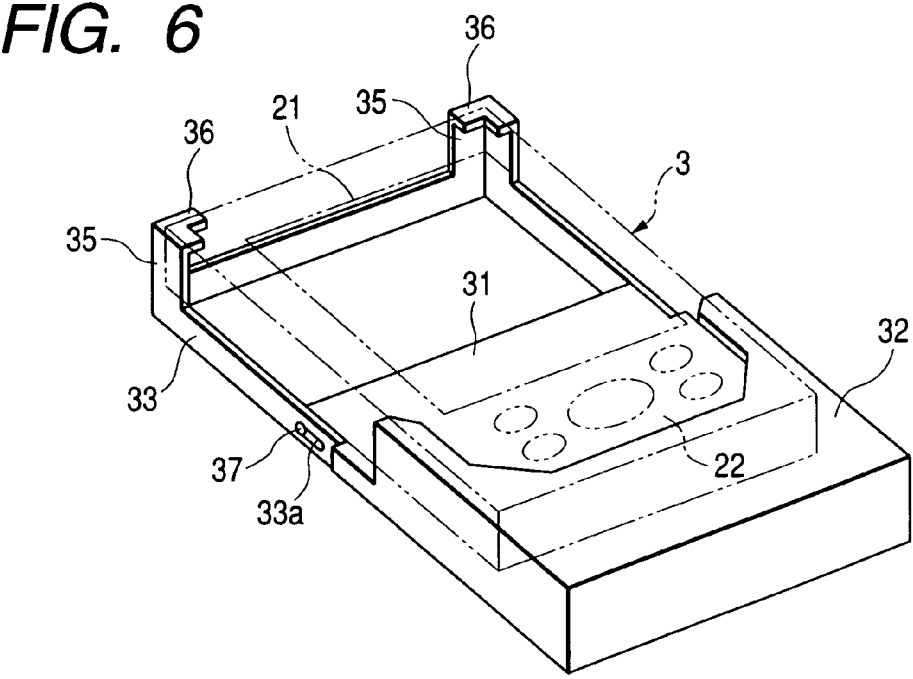
FIG. 6 is a perspective view which shows a mechanical structure of a cradle in which a PDA is held.

The pocket 32 is, as shown in FIG. 6, provided on the upper surface (i.e., the first attachment surface) of the mount plate 321 and works as a holder into which the lower portion of the PDA 3 is inserted in contact of the front surface, the back surface, the right and left side surfaces, and the bottom surface of the PDA 3 with an inner wall of the pocket 32. The pocket 32, as clearly shown in FIGS. 10(a) to 10(c), has a cut-out portion for allowing the user to gain access to the console 22. The pocket 32, as illustrated in FIGS. 1 and 2, has installed in the bottom thereof a first connector 34 for electrical joint to the connector 23 of the PDA 3.

Figure 7A:
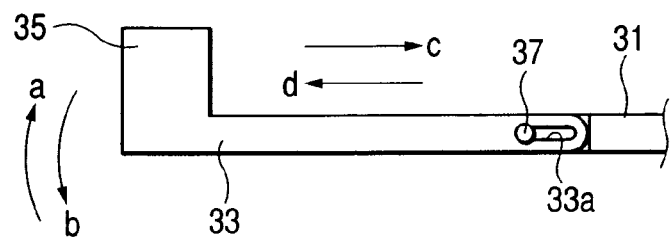
FIG. 7(a) is a side view which shows a locked position of a retainer of the cradle of FIG. 6.
Figure 7B:
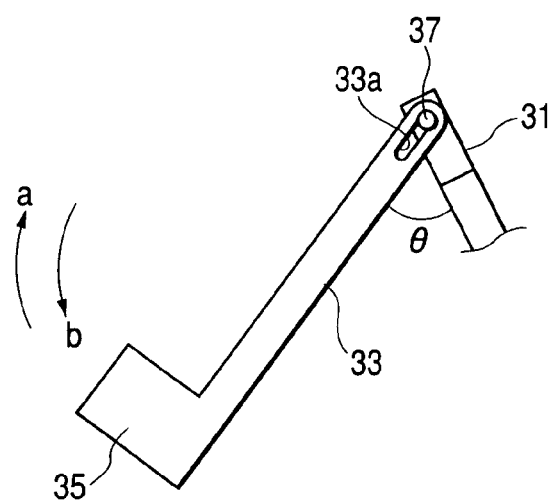
FIG. 7(b) is a side view which shows an unlocked position of a retainer of the cradle of FIG. 6.

The retainer 33 is, as clearly shown in FIGS. 6, 7(a), and 7(b), made of a C-shaped frame contoured to conform with the periphery of the upper portion of the PDA 3 projecting from the mount plate 31. The retainer 33 has two hooks 35 extending vertically from corners of the frame which work as stopper to hold the PDA 3 from slipping out of the frame in parallel to the mount plate 31. The hooks 36 have claws 36 which extend inwardly and are engageble with two upper corners of the PDA 3 to hold the PDA 3 from slipping vertically. Each of the hooks 35 may have a cushion such as a rubber film attached to an inner wall thereof.

The retainer 33, as shown in FIGS. 7(a) and 7(b), has two elongated holes 33a (only one is shown for the brevity of illustration) formed in ends of side bars thereof in which pins 37 installed on side walls of the mount plate 31 are fitted for permitting the retainer 33 to pivot about the pins 37 vertically (i.e., directions a and b) and to slide horizontally (i.e., directions b and c) within the holes 33a. Specifically, the retainer 33 is movable between two positions: a locked position, as illustrated in FIG. 7(a), and an unlocked position, as illustrated in FIG. 7(b). When the retainer 33 is pivoted downward, as viewed in FIG. 7(b), that is, it moves from the locked position to the unlocked position, the PDA 3 is permitted to be inserted into the pocket 32. In a case where the PDA 3 is already fitted within the pocket 32, upon releasing of the hooks 35 from the corners of the PDA 3, the PDA 3 is permitted to be withdrawn from the pocket 32. In the locked position, the hooks 35 and claws 36 engage the corners of the PDA 3 to lock it within the pocket 32.

Specifically, the user may install the PDA 3 on the cradle 4 in the following manners. First, the user brings the retainer 33 into the unlocked position, places the PDA 3 in parallel to the mount plate 31, and puts the lower portion of the PDA 3 in the pocket 32 to joint the connector 23 of the PDA 3 to the first connector 34. Next, the user pulls the retainer 33 away from the mount plate 31 and turns it upward in the direction a until the retainer 33 lies flush with the mount plate 31. In this position, the claws 36 are out of engagement with the PDA 3. Finally, the user pushes the retainer 33 horizontally in the direction c toward the locked position. When the retainer 33 reaches the locked position, the lower portion of the PDA 3 is, as shown in FIG. 6, fitted within the pocket 32, and the upper corners of the PDA 3 are restrained by the hook 3 and the claws 36 from moving out of the pocket 31.

The removal of the PDA 3 is accomplished by pulling the retainer 33 in the direction d, turning the retainer 33 in the direction b to move it to the unlocked position, and withdrawing the PDA 3 from the pocket 32.

Figure 11:
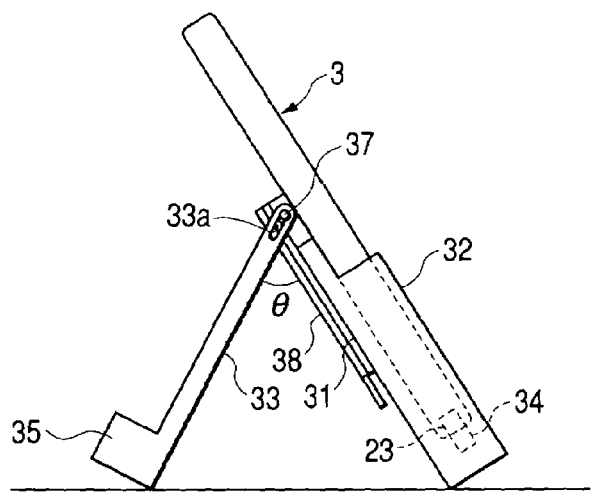
FIG. 11 is a side view which shows a cradle used as a support which holds a PDA at a tilt angle on a table.

The maximum limit of rotation of the retainer 33 about the pins 37 of the mount plate 31 in the direction b is provided at an angular position where the angle which the retainer 33 makes with the back surface (i.e., the second attachment surface) of the mount plate 31 has a given value θ (acute angle) In this position, the retainer 33 serves as a support, as clearly shown in FIGS. 7(b) and 11, which bears the cradle 4 (i.e., the mount plate 31) at a slant angle to a horizontal table or plane. Specifically, the cradle 4 may be held at an angle on the table with the lower portion of PDA 3 put in the pocket 32 to provide ease of visibility of the display 21 and handling of the console 22 to the user.

The cradle 4 has formed on the back surface (i.e., the second attachment surface) of the mount plate 31 L-shaped joint rails 38 which are engageble through sliding motion with the joint rails 12 on the base body 5 of the barcode reader 2, thereby providing a detachable physical joint of the cradle 4 to the barcode reader 2. The mount plate 31, as clearly shown in FIGS. 2 and 5, has installed on the back surface the connector 39 which is to be joined electrically to the connector 13 of the barcode reader 2. The first connector 34 and the second connector 39 are, as clearly shown in FIGS. 1 and 2, connected through a signal line 40a of a coupling cable 40 in the cradle 4.

The cradle 4, as shown in FIG. 2, has a power supply cable 41 which connects the power supply I/F 15 of the barcode reader 2 and the power supply I/F 30 of the PDA 3 together. The power supply cable 41 has installed on ends thereof power supply I/Fs 41a and 14b for electrical connections with the power supply I/Fs 30 and 20, respectively. The power supply cable 41 is also connectable with an AC adaptor 41 for supplying the power from an external source to the PDA 3. One or some of the connectors 13, 23, 34, and 39 may be used as a power supply terminal to combine the power supply cable 41 with the coupling cable 40 as a unit.

The joint of the joint rails 12 of the barcode reader 2 and the joint rails 38 of the cradle 4 will be described below in detail with reference to FIGS. 4 and 5.

The joint rails 12 on the upper surface of the base body 5 of the barcode reader 2 are each made of a strip member having an L-shape in section and extend, as can also be seen in FIG. 8(b), symmetrically or parallel to each other over an area other than end portions of the base body 5. The length of the joint rails 12 is oriented in parallel to an optical axis of the image reading device 8.

The joint rails 38 on the back surface of the mount plate 31 of the cradle 4 are, like the joint rails 12, made of an L-shaped strip member and extend symmetrically or parallel to each other so as to engage inside the joint rails 12, respectively. The engagement or disengagement of the joint rails 38 with or from the joint rails 12 is achieved by sliding the joint rails 38 or 12 in a direction e or f as indicated in FIG. 5.

Figure 5:
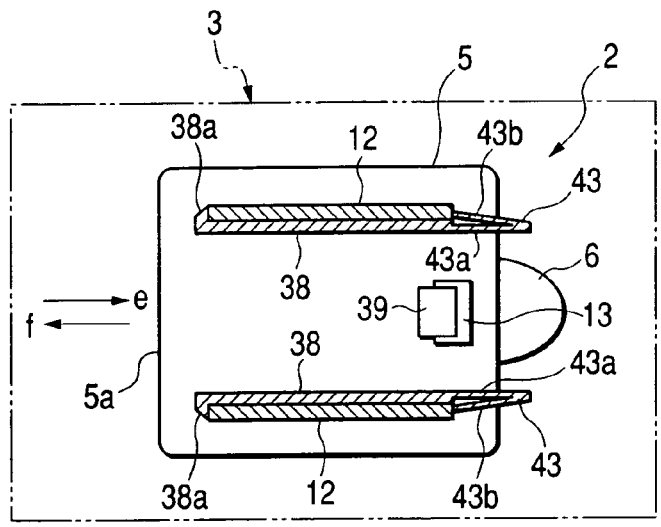
FIG. 5 is a plan view as taken along the line V—V in FIG. 4.

The joint rails 38, as shown in FIG. 5, have formed integrally on ends thereof protrusions or stoppers 38a which define a terminal at which the joint rails 12 stop. The joint rails 38 also have formed on other ends thereof release deterrents 43 which work to avoid release of the joint rails 12 therefrom. Each of the release deterrents 43 is of a V-shape and made up of a stationary strip 43a extending straight in a backward direction from the rear end of a corresponding one of the joint rails 28 and an elastic strip 43b extending from the rear end of the strip 43a outwardly in an opposite direction. Application of physical pressure to each of the elastic strip 43b in a laterally inward direction causes the elastic strip 43b to be deformed toward the stationary strip 43a. The release of such a pressure causes the elastic strip 43b to be returned to an initial position.

Specifically, the attachment of the cradle 4 to the barcode reader 2 is achieved by placing the cradle 4 in front of and above the base body 5 of the barcode reader 2 in alignment of the joint rails 38 with the joint rails 12, and sliding the cradle 4 in the direction e, as illustrated in FIG. 5, to establish engagement of the joint rails 38 with the joint rails 12. Upon abutment of the joint rails 12 of the barcode reader 2 with the joint rails 38 of the cradle 4, the elastic strips 43b of the release deterrents 43 of the joint rails 38 undergo the lateral pressure exerted by the joint rails 12, so that they are deformed inwardly, thereby permitting the joint rails 12 to advance in engagement with the joint rails 38. Upon reaching the stoppers 38a of the joint rails 38, the joint rails 12 move out of the elastic strips 43b of the release deterrents 43, thereby releasing the physical pressure from the elastic strips 43b. This causes the elastic strips 43b to be returned to the initial position and abut to the rear ends of the joint rails 12, thereby locking the joint rails 12 between the stoppers 38a and the elastic strips 43a of the joint rails 38.

When the joint rails 12 abut to the stoppers 38a of the joint rails 38, the second connector 39 of the cradle 4 is, as illustrated in FIG. 5, put in the connector 13 of the barcode reader 2. The removal of the cradle 4 from the barcode reader 2 is achieved by pressing the elastic strips 43b of the release deterrents 43 of the joint rails 38 inwardly using, for example, fingers of the user to unlock the joint rails 12 of the barcode reader 2 and pulling the cradle 4 in the forward direction f, as illustrated in FIG. 5 to disengage the joint rails 38 from the joint rails 12.

As apparent from the above discussion, the optical information reading apparatus 1 is assembled by mounting the PDA 3 on the cradle 4 and attaching the cradle 4 to the barcode reader 2. The mounting of the PDA 3 on the cradle 4, as already described, may be accomplished by putting the lower portion of the PDA 3 in the pocket 32 of the cradle 4 and turning the retainer 33 to the locked position without use of any additional parts.

The attachment of the cradle 4 to the barcode reader 2 may be accomplished only by sliding the cradle 4 on the base body 5 of the barcode reader 2 to bring the joint rails 38 into engagement with the joint rails 12 of the barcode reader 2. The stoppers 38a and the release deterrents 43 of the joint rails 38 form a lock mechanism which locks the joint rails 38 and 12 (i.e., the cradle 4 and the barcode reader 2) together. Additionally, the electrical connection between the first connector 34 and the connector 23 is automatically established by putting the PDA 3 in the pocket 32 of the cradle 4. The electrical connection between the second connector 39 and the connector 13 is also established automatically by installing the cradle 4 on the barcode reader 2. Specifically, the electrical connections are achieved simultaneously with the physical connections of the PDA 3 with the cradle 4 and the cradle 4 with the barcode reader 2.

The optical information reading apparatus 1 is, as described above, provided by an assembly of the PDA 3 and the barcode reader 2 which are joined physically by the cradle 4 and electrically by the coupling cable 40 and works as a barcode handy terminal. In operation, the optical information reading apparatus 1, as shown in FIG. 8(a), works to read the barcode B optically through the barcode reader 2 and transmit it to the PDA 3 for data storage or processing. The optical information reading apparatus 1, as shown in FIG. 9, may work to transmit the barcode data to the external information terminal 16 through the communication I/F 17 of the barcode reader 2.

A scan of the barcode B located away is achieved only by grasping the grip 6 of the barcode reader 2 by a hand of the user and sweeping the barcode reader 2. The PDA 3 which is greater in size than the base body 5 is installed above the barcode reader 2, thus making it difficult for the use to view the scan window 5a, but however, the user is allowed to use the surface of the cradle 4 as an indicator indicating a scanning direction. Additionally, the lighting systems 9 of the barcode reader 2 are designed to optically indicate an angular range within which the barcode B is to be scanned, thus facilitating ease of reading the barcode B.

Figure 10A:
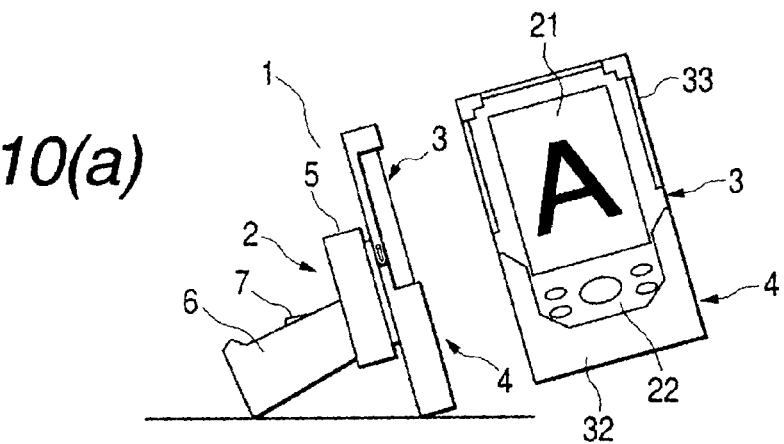
FIGS. 10(a), 10(b), and 10(c) show examples where a cradle is used as a support for keeping a PDA in different orientations.
Figure 10B:
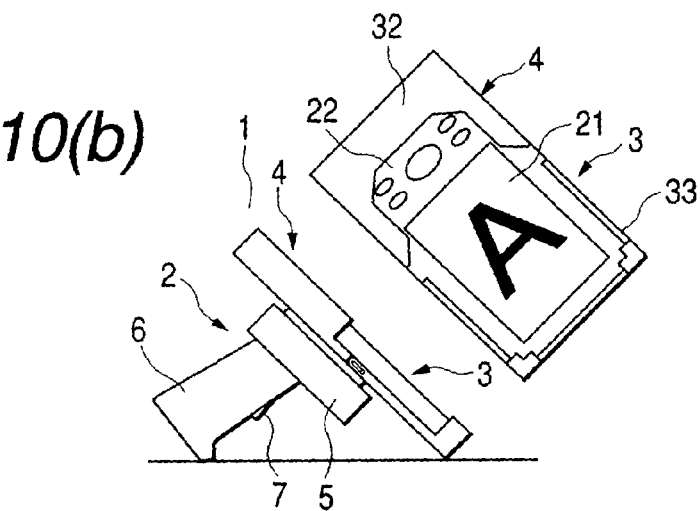
Figure 10C:
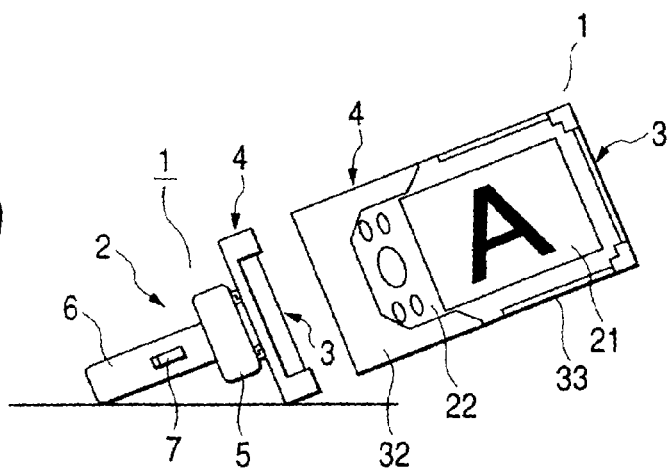

When it is not required to read the barcode B through the barcode reader 2, it is possible to keep the PDA 3 on the table at one of three different tilt angles, as indicated in FIGS. 10(a), 10(b), and 10(c), through one side or edge of the cradle 4 and the lower end of the grip 6 of the barcode reader 2. In such a position, the front surface of the PDA 3 is oriented upward obliquely, thus providing ease of visibility of the display 21 to the user. The display 21 is designed to allow the user to change orientation of characters, as indicated by "A" in the drawings, selectively. Specifically, in FIG. 10(a), the PDA 3 is borne on the table by the lower edge of the base portion of the cradle 4. The user may select the orientation of characters on the display 21 in an upward direction. In FIG. 10(b), the PDA 3 is borne on the table by the edge of the tip of the cradle 4. The user may select the orientation of characters on the display 21 in a reverse direction. In FIG. 10(c), the PDA 3 is borne on the table by one of sides of the cradle 4. The user may select sets the orientation of characters on the display 21 in a lateral direction. The user may alternatively select the reverse of the direction as illustrated in the drawing.

The barcode reader 2 and the PDA 3 of the optical information reading apparatus 1 are powered by the batteries 18 and 28 installed therein, respectively. When the battery 28 of the PDA 3 lacks in available power, the battery 18 may be used to drive both the barcode reader 2 and the PDA 3. The barcode reader 2, as shown in FIG. 9, may be joined to an external power supply through the AC adaptor 44. In this case, it is possible to operate the barcode reader 2 and the PDA 3 or charge the batteries 18 and 28 using electrical power from the external power supply.

The optical information reading apparatus 1 may be separated into the barcode reader 2 and the PDA 3 for stand-alone use thereof. The barcode reader 2 itself, as shown in FIG. 8(b), may be used to read the barcode B. In this case, the barcode reader 2 may be connected, as shown in FIG. 9, electrically to the external information terminal 16 for processing the barcode data in the external information terminal 16. A scan of the barcode B may be achieved easily by grasping the grip 6 of the barcode reader 2 and sweeping the barcode reader 2. The user may use the joint rails 12 extending in parallel to the optical axis of the image reading device 8 as an indicator indicating a scanning direction.

Figure 12:
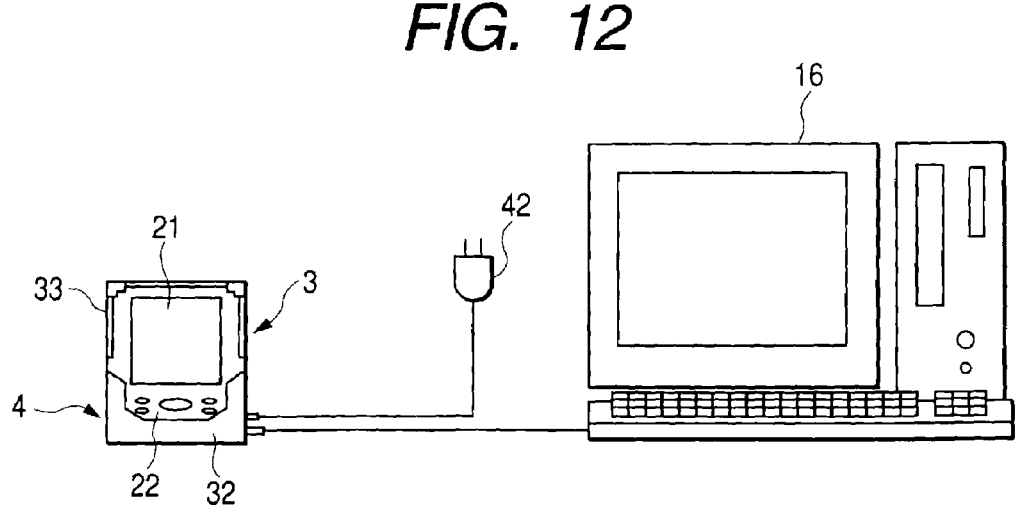
FIG. 12 is a view which shows a PDA held by a cradle in communication with an external information processing device.

The PDA 3 may be employed alone or while being mounted on the cradle 4. In the latter case, the user may pivot the retainer 33 to the angle θ, as illustrated in FIG. 11, to form the support which bears the PDA 3 on the table at the preselected tilt angle which provides the ease of visibility of the display 21 to the user. The PDA 3, as illustrated in FIG. 12, may be connected to an external power supply through the AC adaptor 42 joined to the cradle 4 to provide electrical power to the PDA 3 or charge the battery 28. The PDA 3 may also be employed in connection with the external information terminal 16.

The structure of the optical information reading apparatus 1, as described above, is designed to provide ease of detachable joining between the compact handheld barcode reader 2 and the commercially available, compact, inexpensive PDA 3 capable of performing a variety of software functions and employing peripherals, thus enabling each of the barcode reader 2 and the PDA 3 to be employed alone or in combination with each other without sacrificing ease of handling and operability thereof.

The optical information reading apparatus 1 may be modified as described below with reference to FIGS. 13(a) to 20. The same reference numbers as employed in FIGS. 1 to 12 will refer to the same parts, and explanation thereof in detail will be omitted below.

Figure 13A:
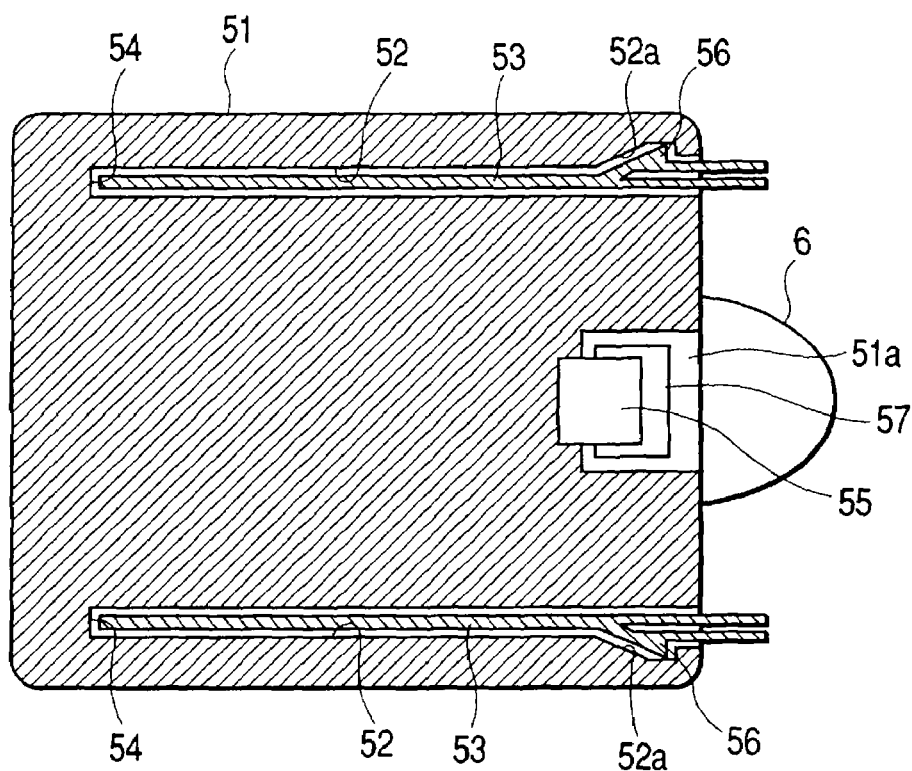
FIG. 13(a) is a sectional view which shows a joint structure of each of a barcode reader and a cradle of an optical information reading apparatus according to the second embodiment of the invention.
Figure 13B:
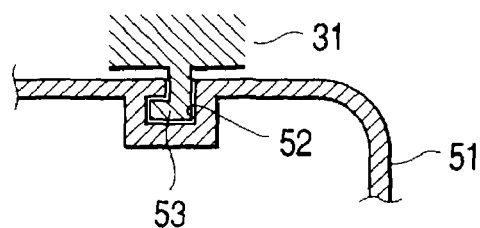
FIG. 13(b) is a partially sectional view which shows engagement of joint rails of the barcode reader and the cradle of FIG. 13(a)
Figure 14:
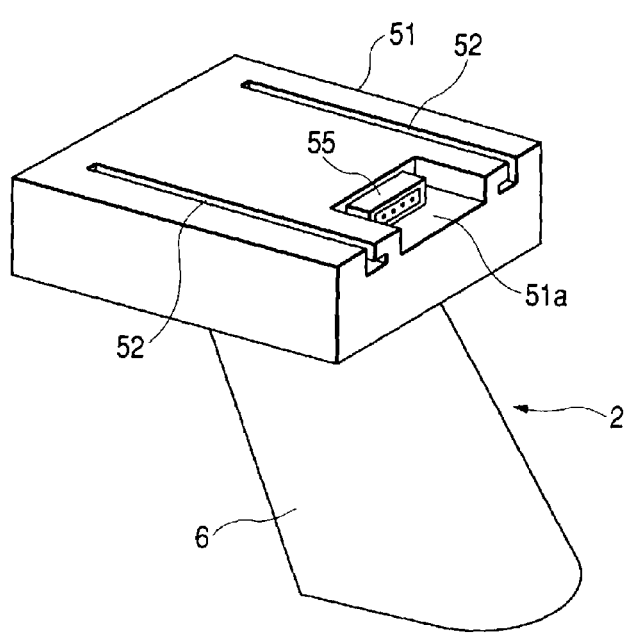
FIG. 14 is a perspective view which shows a joint structure of a barcode reader.

FIGS. 13(a), 13(b), and 14 show the second embodiment of the invention which is different from the first embodiment in a joint structure made up of a pair of joint grooves 52 formed in the upper surface of the base body 51 of the barcode reader 2 and a pair of joint rails 53 formed on the back surface of the mount plate 31 of the cradle 4. Specifically, the joint grooves 52 are, as can be seen from FIGS. 13(b) and 14, L-shaped grooves which extend parallel to and are geometrically symmetrical with respect to a longitudinal center line of the base body 51 (i.e., the optical axis of the image reading device 8).

Each of the joint grooves 52 has one end which opens at the rear end of the base body 51 and a vertical wall at the other end which serves as a stopper 54. Each of the joint grooves 52, as clearly shown in FIG. 13(a), also has a release deterrent recess 52a which extends outwardly near the rear end of the base body 51. The base body 51 has formed in the upper surface between the joint grooves 52 a rectangular recess 51a which opens at the rear end of the base body 51. The communication connector 55 is installed within the recess 51a with a receptacle facing the rear end of the base body 51.

Each of the joint rails 53 formed on the back surface of the cradle 4 is, as shown in FIG. 13(b), an L-shaped strip member which forms a mate of one of the joint grooves 52. Specifically, the joint rails 53 extend parallel to each other and are geometrically symmetrical with respect to the longitudinal center line of the cradle 4. Engagement or disengagement of the joint rails 53 with or from the joint grooves 52 is accomplished by sliding one of the cradle 4 and the base body 51 relative to the other in the longitudinal direction thereof. Each of the joint rails 53 has formed on an end portion thereof an elastically deformable barb-like protrusion 56 which engages one of the release deterrent recesses 52a of the joint grooves 52 when the joint rail 53 slides in the joint groove 52 and reaches the stopper 54, thereby locking the joint rail 53 and the joint groove 52 together. When the joint rails 53 reach the stoppers 54 of the joint grooves 52, it achieves a joint of the connector 55 of the base body 51 and the second connector 57 installed on the back surface of the mount plate 31 of the cradle 4. The removal of the cradle 4 from the base body 51 of the barcode reader 2 is accomplished by pressing the ends of the joint rails 53 inwardly to release the barb-like protrusions 56 from the recesses 52a and withdrawing the joint rails 53 from the joint grooves 52.

The base body 51, as described above, has the joint grooves 52 formed in the upper surface thereof. In other words, the base body 51 has no protrusions on the upper surface, thus providing use of the barcode reader 2 without disfigurement thereof.

FIGS. 15(a) to 17(c) show the third embodiment of the invention which is different from the first embodiment in structure of the cradle 61.

The cradle 61 has a pair of retainers 62 (only one is shown for the brevity of illustration) installed on the cradle base 63 in which the PDA 3 is to be putted. The retainers 62 extend parallel to each other to support the right and left sides of the PDA 3 and have hooks 64 with claws 65 in which corners of the PDA 3 are fitted.

Each of the retainers 62 has formed in an end thereof an elongated hole 62a within which a pin 67 installed on one of side walls of the cradle 4 is fitted. Each of the elongated holes 62a is made up of a greater circular hole formed in an end portion of the retainer 62 and a slit extending from the circular hole toward the tip of the retainer 62. Each of the pins 67 has a rectangular head with parallel side surfaces slidable within the slit of the elongated hole 62a. The circular hole of the elongated hole 62a has the diameter enough to allow insertion of the head of the pin 67. The cradle base 63, as clearly shown in FIG. 17(c), has formed on side walls thereof elastically deformable circular latches 63a each having a boss which is to be just fitted within the circular hole of one of the elongated holes 62a to lock the retainers 62 and the side walls of the cradle base 63 together.

Figure 17A:
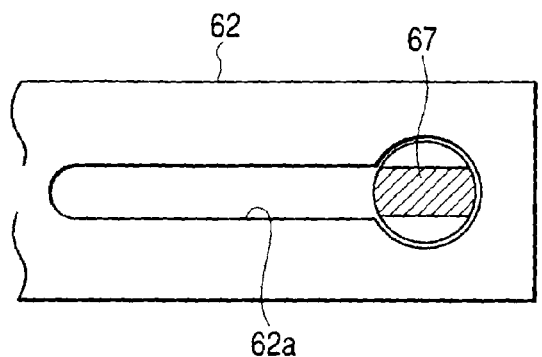
FIGS. 17(a) and 17(b) are partially enlarged views which show a pivotal mechanism of the retainer of FIGS. 15(a) and 15(b)
Figure 17B:
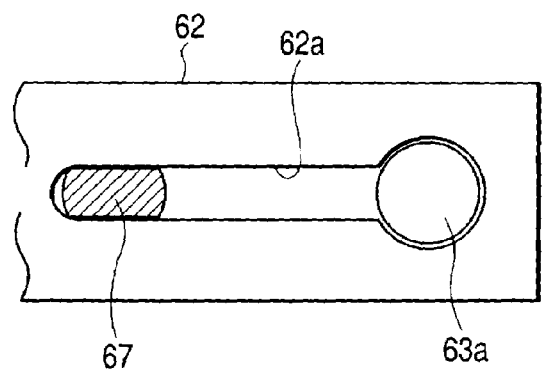
Figure 17C:
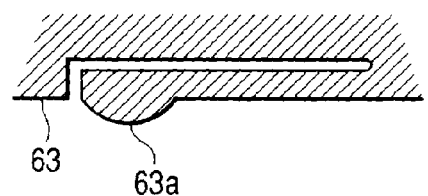
FIG. 17(c) is a partially sectional view which shows an elastically deformable latch for locking a retainer on a cradle base.

When the pins 67 are, as shown in FIG. 17(a), located within the circular holes of the elongated holes 62a, it allows the retainers 62 to pivot about the pins 67 downward from the cradle base 63. Alternatively, when the pins 67 are, as shown in FIG. 17(b), located within the left ends of the elongated holes 62a, as viewed in the drawing, while the latches 63a are fitted within the right ends of the elongated holes 62a, it results in a lock of the retainers 62 on the cradle base 63.

Figure 15A:
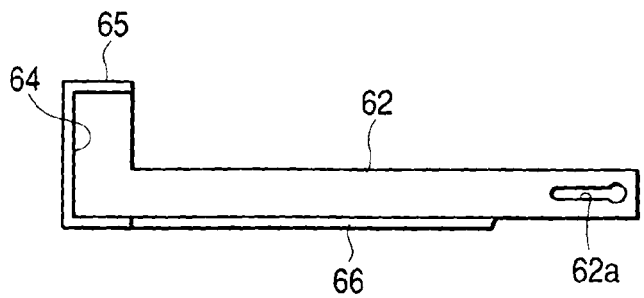
FIG. 15(a) is a side view which shows a retainer of a cradle according to the third embodiment of the invention.
Figure 15B:
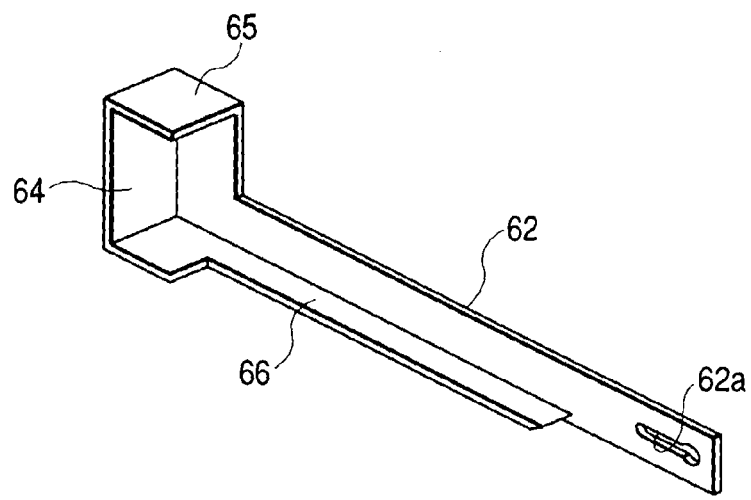
FIG. 15(b) is a perspective view which shows the retainer of FIG. 15(a)
Figure 16:
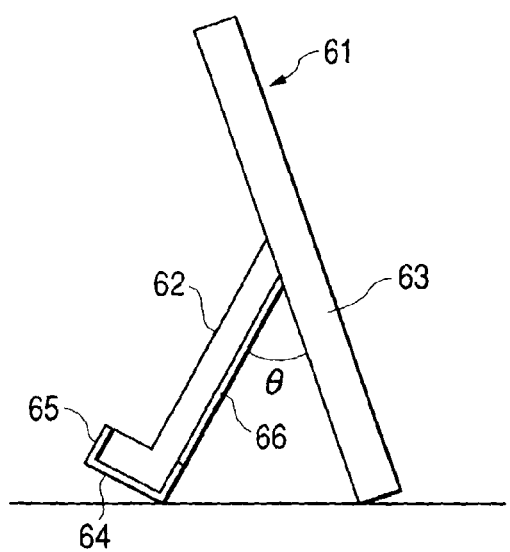
FIG. 16 is a side view which shows the retainers of FIGS. 15(a) and 15(b) used as a support.

Each of the retainers 62, as clearly shown in FIGS. 15(a) and 15(b), has a bottom wall 66 integrally formed on a lower edge thereof. Each of the bottom walls 66 has a tapered end 66a which serves as a stopper for defining the limit angle θ (acute angle) which the retainers 62 make with the back surface (i.e., the second attachment surface) of the cradle base 63 when the retainers 62 are pivoted, as illustrated in FIG. 16, to form the support working to keep the PDA 3 at a given tilt angle on the table.

Figure 18:
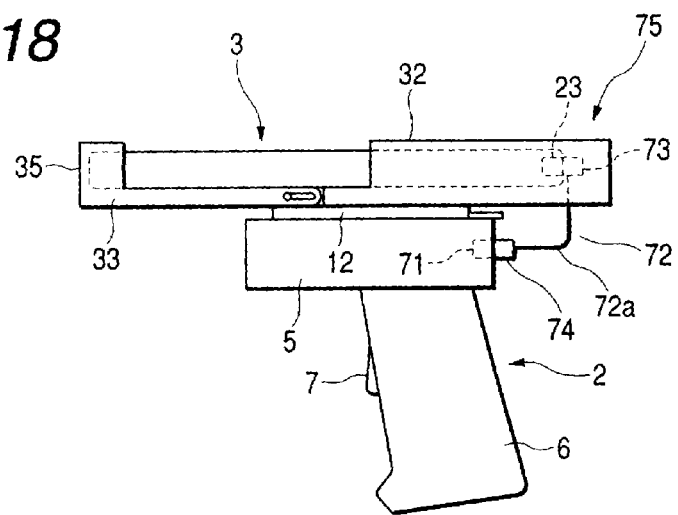
FIG. 18 is a side view which shows an optical information reading apparatus according to the fourth embodiment of the invention.

FIG. 18 shows an optical information reading apparatus according to the fourth embodiment of the invention which is different from the first embodiment in that the connector 23 of the PDA 3 and the connector 71 installed on the rear end of the base body 5 of the barcode reader 2 are joined through a coupling cable 72. The coupling cable 72 has a first connector 73 to be coupled to the connector 23 of the PDA 3 and a second connector 74 to be coupled to the connector 71 of the barcode reader 2. The joint of the connector 73 to the connector 23 is achieved by inserting the connector 73 into a hole (not shown) formed in the cradle 75. Use of the coupling cable 72 results in simplicity of the structure of the cradle 75. Other arrangements are identical with those in the first embodiment, and explanation thereof in detail will be omitted here.

Figure 19:
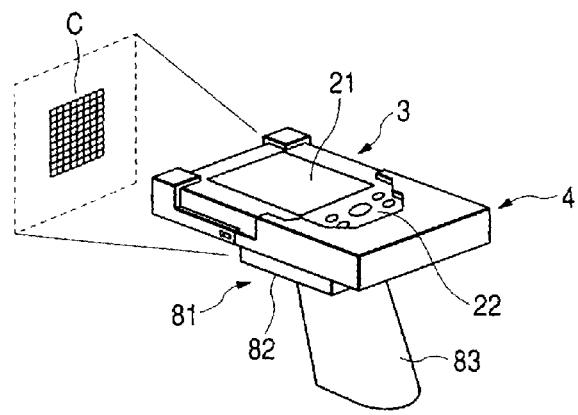
FIG. 19 is a perspective view which shows an optical information reading apparatus according to the fifth embodiment of the invention.

FIG. 19 shows an optical information reading apparatus according to the fifth embodiment of the invention which is equipped with a handheld two-dimensional code reader 81 instead of the barcode reader 2 as used in the first embodiment. The two-dimensional code reader 81 includes a base body 82 and a grip 83 installed on the back surface of the base body 82. The base body 82 has installed therein a code reading device equipped with a CCD area sensor, etc. which works to optically read a two-dimensional code C located away therefrom. It is advisable that the field of view of the two-dimensional code reader 81 be oriented downward slightly. Other arrangements are identical with those in the first embodiment, and explanation thereof in detail will be omitted here.

Figure 20:
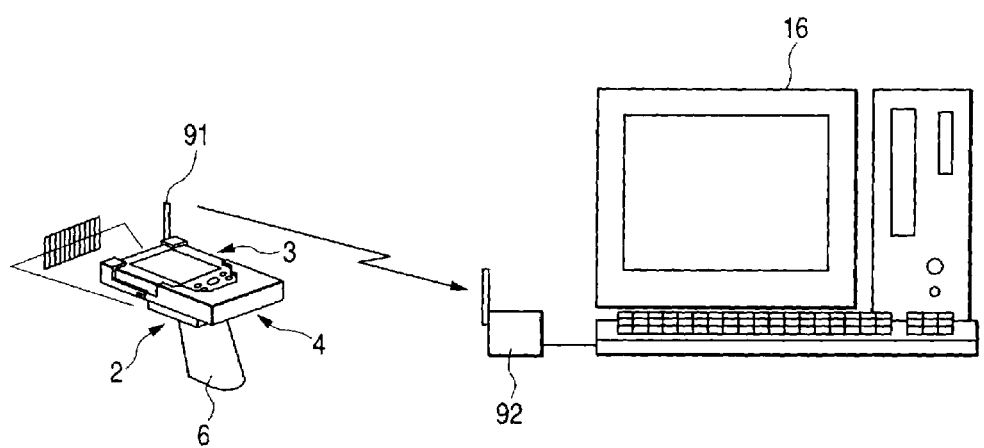
FIG. 20 is a perspective view which shows an optical information reading apparatus according to the sixth embodiment of the invention.

FIG. 20 shows an optical information reading apparatus according to the sixth embodiment of the invention.

The PDA 3 has installed therein a radio communication system (only an antenna 91 is illustrated) which establishes radio communications with the external information terminal 16 through a radio communication unit 92 coupled to the terminal 16. The radio communication system may also include a wireless LAN or a module of a cellular phone. Other arrangements are identical with those in the first embodiment, and explanation thereof in detail will be omitted here.

The PDA 3 may be selected from a variety of commercially available PDAs and combined with the barcode reader 2 to construct the optical information reading apparatus of a type of interest to the user. The cradle 4 must be so designed as to match in size with a selected one of the PDAs, but however, the same structure of a joint to the barcode reader 2 may be shared among the PDAs, thereby permitting a variety of optical information reading apparatuses to work to perform different functions to be constructed easily.

The image reading device 8 of the barcode reader 2 may be implemented by a laser scanner. Instead of the PDA 3, any compact portable information processing device may be used which is capable of entry, output, and processing of data. The cradle may be made only of a box or a frame and have installed therein a console such as a data entry keypad.

Figure 21A:
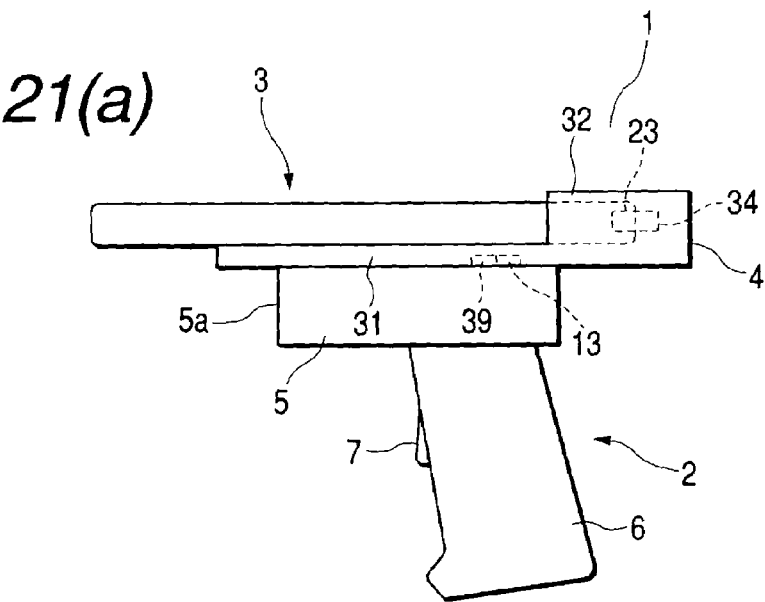
FIG. 21(a) is a side view which shows an optical information reading apparatus according to the seventh embodiment of the invention.
Figure 21B:
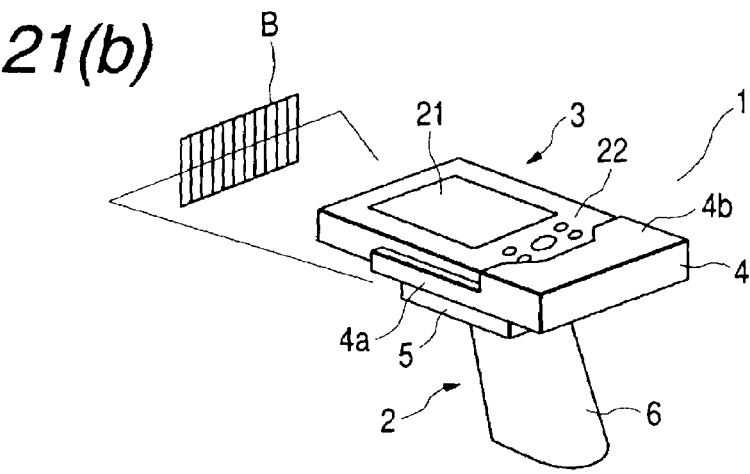
FIG. 21(b) is a perspective view which shows the optical information reading apparatus of FIG. 21(a)
Figure 22:
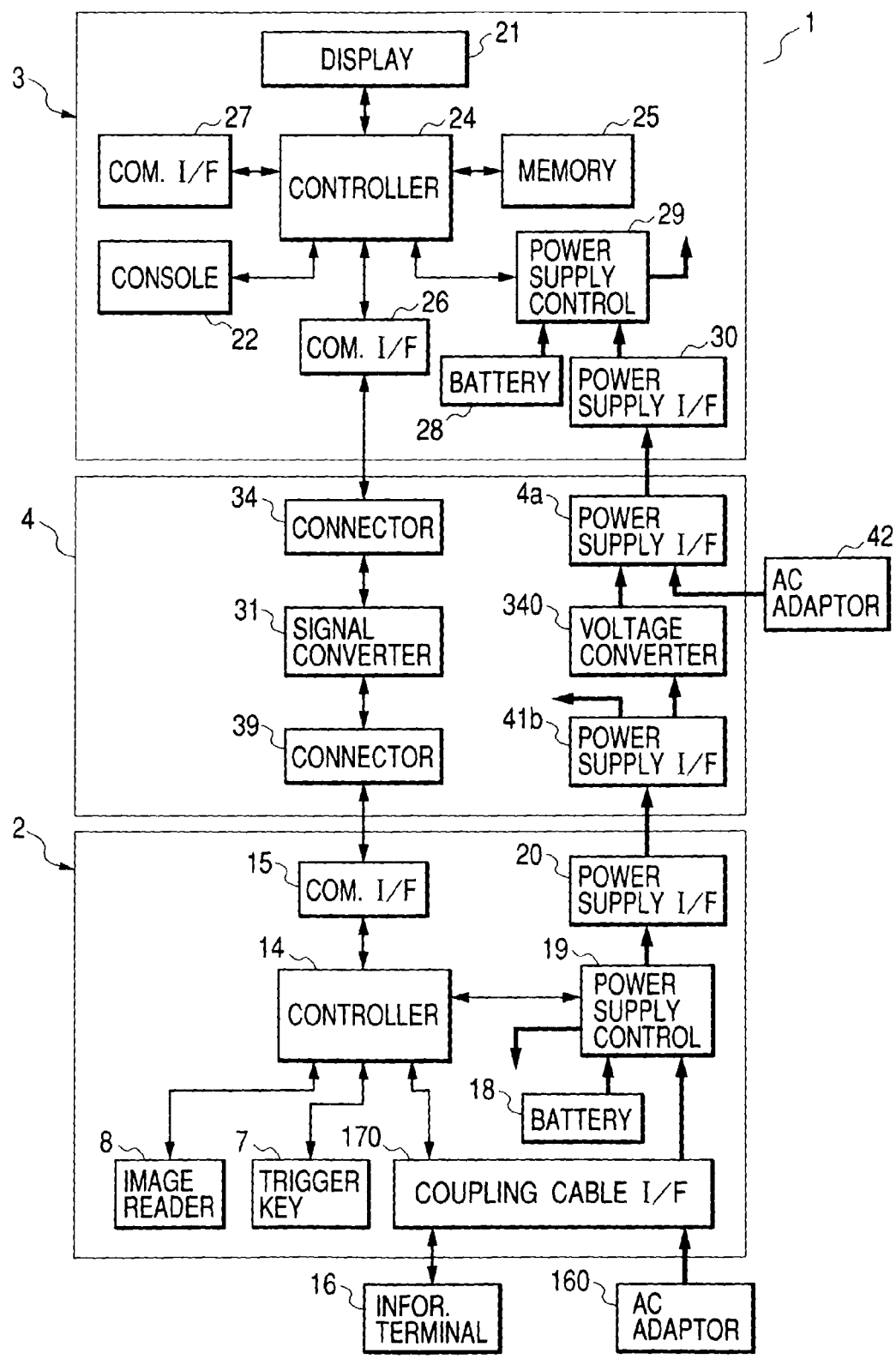
FIG. 22 is a circuit diagram which shows an internal structure of an optical information reading apparatus according to the seventh embodiment of the invention.

FIGS. 21(a) and 21(b) show the optical information reading apparatus 1 according to the seventh embodiment of the invention. FIG. 22 shows an electrical structure of the optical information reading apparatus 1. In FIG. , 22, thin lines with arrows indicate flows of signals, and heavy lines with arrows indicate flows of electricity.

The optical information reading apparatus 1, like the first embodiment, consists essentially of the handheld barcode reader 2 and commercially available personal digital assistant (PDA) 3, and the cradle 4 on which the PDA 3 is mounted. The handheld barcode reader 2, the PDA 3, and the cradle 4 may be assembled to form a barcode handy terminal (BHT) working to optically read and decode a barcode.

The handheld barcode reader 2 is made up of the rectangular box-like base body 5 and the grip 6 attached integrally to the bottom of the base body 5. The grip 6 extends downward and slightly backward and has the trigger key 7 installed in a front wall thereof. The base body 5 has a length extending horizontally, as viewed in FIGS. 21(a) and 21(b), and the reading window 5a formed in a front wall thereof. The image reading device 8 is, as illustrated in FIG. 22, installed within the base body 5.

The image reading device 8 has the same structure as illustrated in FIG. 3. When an operator or user turns the reading window 5a of the base body 5 toward an optically reading target or barcode B and turns on the trigger key 7, the lighting systems 9 emit beams of light extending laterally. Returns of the beams enter the image-forming lens 11 to form an image of the barcode B on the image capturing device 10. The image reading device 8 is capable of reading the barcode B located more than 30 mm away and designed to optically indicates a readable range.

The base body 5 has the same joint structure, as described in the above embodiments, which establishes a joint to the cradle 4 detachably. The base body 5 also has formed thereon the connector 13 for data transmission.

The barcode reader 2, as shown in FIG. 22, has disposed therein the controller 14 made by a microcomputer, etc. to which the image reading device 8 is connected, and an output signal of the trigger key 7 is inputted. The controller 14 also connects with the communication I/F 15 for outputting data read by the image reading device 8 to the PDA 3 through the connector 13 and a cable.

The barcode reader 2 has also disposed therein the storage battery 18 which works to supply the power to each component through the power supply controller 19 controlled by the controller 14 and the power supply I/F 20 for supplying the power to the PDA 3. One of terminals of the connector 13 is used as a power supply terminal for supplying electric power to the cradle 4 through the power supply I/F 20. Specifically, the connector 13 is used both for supplying the electric power and transmitting data.

Figure 23:
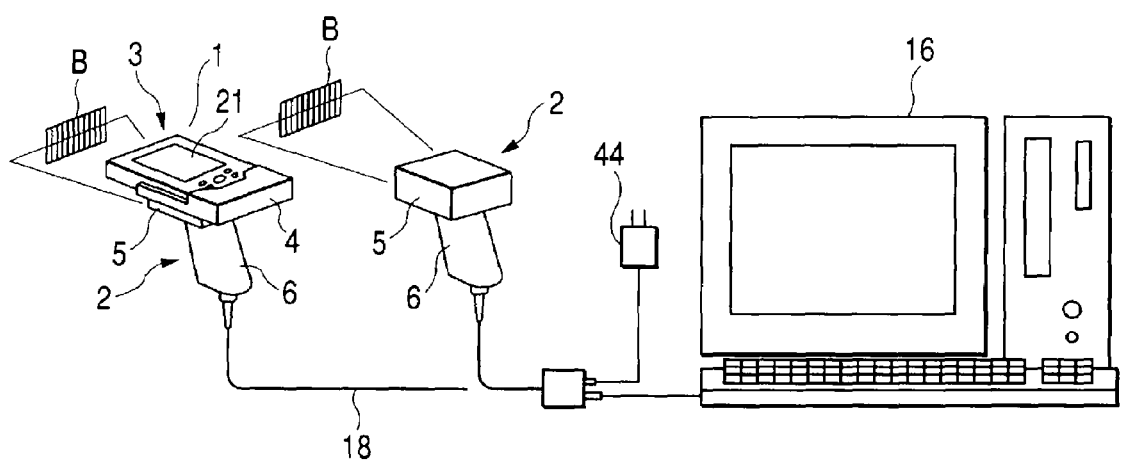
FIG. 23 is a view which shows one example of use of an optical information reading apparatus of the seventh embodiment of the invention.

The barcode reader 2 has installed therein the coupling cable I/F 170 for establishing communication with the external information terminal 16 such as a personal computer, as illustrated in FIG. 23. The coupling cable I/F 170 also works to receive the electric power from an external source through the AC adaptor 160 which is used to actuate the barcode reader or charge the battery 18. The coupling cable I/F 170 has a connector (not shown) installed in the lower end of the grip 6 for connection with the external information terminal 16 and the AC adaptor 160, as illustrated in FIG. 23, through the cable 18.

The coupling cable I/F 170 is used to transmit bar code data acquired by the barcode reader 2 to the external information terminal 16 and to establish transmission of data between the PDA 3 and the external information terminal 16. The barcode reader 2 (i.e., the controller 14) is designed to perform a function of determining whether the barcode reader 2 is joined to the PDA 3 or not and control the transmission of the barcode data based on a result of such a determination.

Figure 24:
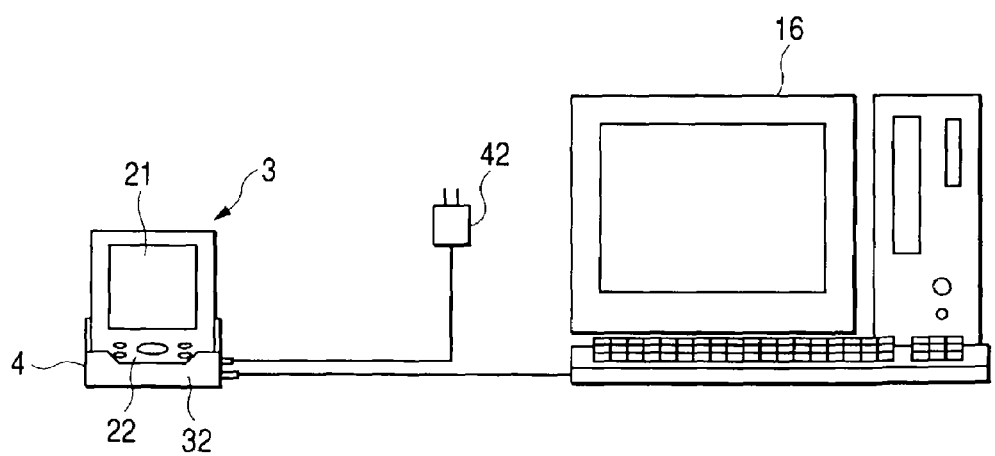
FIG. 24 is a view which shows another example of use of an optical information reading apparatus of the seventh embodiment of the invention.

The PDA 3, as clearly shown in FIGS. 23 and 24, includes a rectangular thin box which has the display 21 such as a liquid crystal display installed on a front surface thereof and the console 22 equipped with a plurality of keys located adjacent the display 21. The PDA 3, as shown in FIG. 21(a), has the connector 23 installed in the bottom thereof for data transmission to the barcode reader 2. The PDA 3 may be one of commercially available PDAs selected for an intended application.

The PDA 3, as clearly shown in FIG. 22, has disposed therein the controller 24 which is implemented by a microcomputer working to control a whole system operation and handle a variety of data sets. The controller 24 also works to control the display 21 and receives operating signals inputted at the console 22. The controller 24 has installed therein the memory 25 in which programs and data are stored.

The controller 24 also connects with the communication I/F 26 for entry of data outputted from the barcode reader 2 through the connector 23 and with the external communication I/F 27 for establishing communication with the external information terminal 16, as illustrated in FIG. 24.

The PDA 3 has also disposed therein the storage battery 28 which works to supply the power to each component through a power supply controller 29 controlled by the controller 24 and a power supply I/F 30 for receiving the electric power from an external source. The PDA 3 works to process, store, and display input data and output processed data. The power supply I/F 30 is, like the connector 13, designed to receive the electric power through the connector 23. The connector 23 is used for transmission of the electric power and data.

The cradle 4, as clearly shown in FIGS. 21(*a*) and 21(*b*), includes the pocket 32 formed on a base portion (i.e., a right portion in the drawings) of the mount plate 31 on which the PDA 3 is disposed. The pocket 32 is so sized as to receive the PDA 3 partially in contact with the back surface, the side surfaces, and the bottom surface of a power portion of the PDA 3 and provide the visibility of the display 21 and the console 22 to the user. The cradle 4 also has a retainer (not shown) which may be identical in structure with the retainer 33, as described in the first embodiment, for holding the PDA 3 tightly on the mount plate 31. The mount plate 31 is made of a flat plate which has a size enough to bear the lower portion of the PDA 3.

The retainer is, as in the first embodiment, made of a frame contoured to conform with the periphery of the upper portion of the PDA 3. The retainer is povitably supported by the mount plate 31 so that it is movable between two positions: a locked position and an unlocked position. When the retainer is pivoted downward, that is, it moves from the locked position to the unlocked position, the PDA 3 is permitted to be inserted into the pocket 32. When the PDA 3 is already fitted within the pocket 32, the retainer is released from the PDA 3 to permit the PDA 3 to be withdrawn from the pocket 32. In the locked position, the retainer engages the corners of the PDA 3 to lock it within the pocket 32.

When the retainer is in a fully pivoted position (i.e., the unlocked position), it serves, like the first embodiment, as a support which stands the cradle and the PDA 3 on a table at a tilt angle. The pocket 32, as shown in FIG. 21(*a*), has installed on the bottom wall thereof the first connector 34 which makes a joint to the connector 23 of the PDA 3 when the lower portion of the PDA 3 is fitted in the pocket 32 completely.

The cradle 4, as clearly shown in FIG. 21(*a*), has installed on the back surface of the mount plate 31 the connector 39 which is to be joined electrically to the connector 13 of the barcode reader 2. The cradle 4 also has the joint structure, as described in the above embodiments, which establishes a joint to the barcode reader 2 detachably. The joint or removal of the cradle 4 (i.e., the PDA 3) to or from the barcode reader 2 is accomplished by sliding the cradle 4 and the barcode reader 2 relative to each other to release the joint therebetween. Upon completion of the joint, the second connector 39 of the cradle 4 is coupled to the connector 13 of the barcode reader 2.

The cradle 4, as clearly shown in FIG. 22, has the first connector 34 and the second connector 39 and a signal line connecting them for establishing communication between the barcode reader 2 and the PDA 3 when jointed together. The cradle 4 also has a signal converter 31 installed between the connectors 34 and 38 which enables the communication between the barcode reader 2 and the PDA 3 if they are different in communication protocol.

The cradle 4, as shown in FIG. 22, has disposed therein the power supply I/F 41*b* for electrical connection with the power supply I/F 20 of the barcode reader 2 and the power supply I/F 41*a* for electrical connection with the power supply I/F 30 of the PDA 3. The power supply I/Fs 41*a* and 41*b* are coupled through a voltage converter 340 such as a DC-DC converter. The power supply I/F 41*a* is designed to be connectable with the AC adaptor 42, as shown in FIGS. 22 and 24, to receive the electric power from an external source for the PDA 3.

The cradle 4 may receive the electric power used to drive circuit components installed in the cradle 4 from the barcode reader 2 through the power supply I/F 41 b and also convert the electric power into the rated voltage of the PDA 3 through the voltage converter 340 and supply it to the PDA 3 through the power supply I/F 41*a*. Although not illustrated in FIG. 22 in detail, the power supply from the barcode reader 2 to the cradle 4 is achieved using the connectors 13 and 39. The power supply from the cradle 4 to the PDA 3 is achieved through the connectors 34 and 23.

Figure 25:
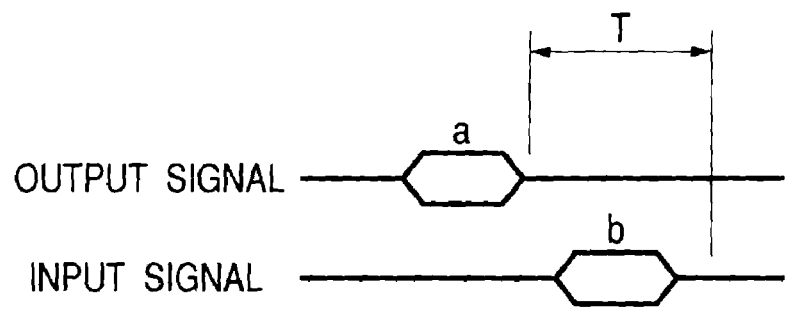
FIG. 25 is a view which shows a relation between a test signal and an answer signal used to detect a joint between a barcode reader and a PDA.

The controller 14 of the barcode reader 2 is, as described above, designed to detect the joint between the barcode reader 2 and the PDA 3. Specifically, when turned on, the controller 14 outputs a test signal a, as indicated in FIG. 25, from the communication I/F 15 to the PDA 3 through the cradle 4. Upon input of the test signal a through the communication I/F 26, the controller 24 of the PDA 3 outputs an answer signal b from the communication I/F 26 to the barcode reader 2. When the answer signal b is inputted to the barcode reader 2 within a given period of time T from the output of the test signal a, the controller 14 of the barcode reader 2 concludes that the PDA 3 is now joined to the barcode reader 2 through the cradle 4.

When it is determined that the PDA 3 is now coupled to the barcode reader 2, the controller 14 outputs the bar code data acquired by the image reading device 8 to the PDA 3 through the communication I/F 15. Alternatively, when it is determined that the PDA 3 is separate from the barcode reader 2, the controller 14 outputs the bar code data to the external information terminal 16 through the coupling cable I/F 170 and the cable 18. The controller 14 is also responsive to input of an information transmission request signal from the PDA 3 to transmit data contained in the information transmission request signal to the external information terminal 16 through the coupling cable I/F 170.

Alternatively, the controller 24 of the PDA 3 may output the test signal a from the communication I/F 26 to the controller 14 of the barcode reader 2 through the cradle 4. Upon input of the test signal a, controller 14 of the barcode reader 2 may determine that the PDA 3 is now joined to the barcode reader 2.

As apparent from the above discussion, the optical information reading apparatus 1 is assembled by mounting the PDA 3 on the cradle 4 and attaching the cradle 4 to the barcode reader 2. The mounting of the PDA 3 on the cradle 4, as already described, is accomplished by putting the lower portion of the PDA 3 in the pocket 32 of the cradle 4 and turning the retainer of the cradle 4 to the locked position without use of any additional parts. The attachment of the cradle 4 to the barcode reader 2 is accomplished only by sliding the cradle 4 on the base body 5 of the barcode reader 2 to bring the joint rails of the cradle 4 into engagement with the joint rails of the barcode reader 2. Additionally, the electrical connection between the first connector 34 and the connector 23 is automatically established by putting the PDA 3 in the pocket 32 of the cradle 4. The electrical connection between the second connector 39 and the connector 13 is also established automatically by installing the cradle 4 on the barcode reader 2. Specifically, the electrical connections are achieved simultaneously with the physical connections of the PDA 3 with the cradle 4 and the cradle 4 with the barcode reader 2.

The optical information reading apparatus 1 is, as described above, provided by an assembly of the PDA 3 and the barcode reader 2 which are joined physically by the cradle 4 and electrically by a transmission system made up of the communication I/F 15, the connector 13, the second connector 39, the first connector 34, the connector 23, and the communication I/F 26 and works as a barcode handy terminal. In operation, the optical information reading apparatus 1, as shown in FIG. 21(b), works to read the barcode B optically through the barcode reader 2 and transmit it to the PDA 3 for data storage or processing. A scan of the barcode B located away is achieved only by grasping the grip 6 of the barcode reader 2 by a hand of the user and sweeping the barcode reader 2.

The controller 14 of the barcode reader 2 woks to detect the joint between the barcode reader 2 and the PDA 3 using the test signal a and the answer signal b. Specifically, when the answer signal b is inputted to the barcode reader 2 within the period of time T from the output of the test signal a, the controller 14 concludes that the PDA 3 is now joined to the barcode reader 2 through the cradle 4 and outputs the barcode data to the PDA 3, thereby eliminating errors in transmission of the barcode data to the PDA 3.

The optical information reading apparatus 1 may be employed in combination with the external information terminal 16 through the coupling cable I/F 170 of the barcode reader 2. Upon input of the information transmission request signal from the PDA 3, the controller 14 transmits data produced by the PDA 3 to the external information terminal 16 through the barcode reader 2. The data produced by the external information terminal 16 may also be transmitted to the PDA 3 through the barcode reader 2.

The barcode reader 2 and the PDA 3 of the optical information reading apparatus 1 are powered by the batteries 18 and 28 installed therein, respectively. When the battery 28 of the PDA 3 lacks in available power, the battery 18 may be used to supply the electric power to the PDA 3.

The barcode reader 2, as shown in FIG. 23, may be joined to an external power supply through the AC adaptor 44. In this case, it is possible to operate the barcode reader 2 and the PDA 3 or charge the batteries 18 and 28 using electrical power from the external power supply. The voltage converter 340 of the cradle 4 works to convert the electric power into the rated voltage of the PDA 3.

It is possible to separate the optical information reading apparatus 1 into the barcode reader 2 and the PDA 3 easily. The barcode reader 2 itself, as shown in FIG. 23, may be used to read the barcode B. In this case, the barcode reader 2 may be connected electrically to the external information terminal 16. When the controller 14 of the barcode reader 2 concludes that the barcode reader 2 is not joined to the PDA 3, the barcode reader 2 transmits the barcode data to the external information terminal 16 through the coupling cable I/F 170 for processing it. A scan of the barcode B may be achieved easily by grasping the grip 6 of the barcode reader 2 and sweeping the barcode reader 2.

The PDA 3 may be employed alone or while being mounted on the cradle 4. In the latter case, the user may pivot the retainer of the cradle 4 to form the support which bears, as shown in FIG. 24, the PDA 3 on the table at the preselected tilt angle which provides the ease of visibility of the display 21 to the user. The PDA 3 may be connected to an external power supply through the AC adaptor 42 joined to the cradle 4 to provide electrical power to the PDA 3 or charge the battery 28. The PDA 3 may also be employed in connection with the external information terminal 16 through the communication I/F 27.

Figure 26:
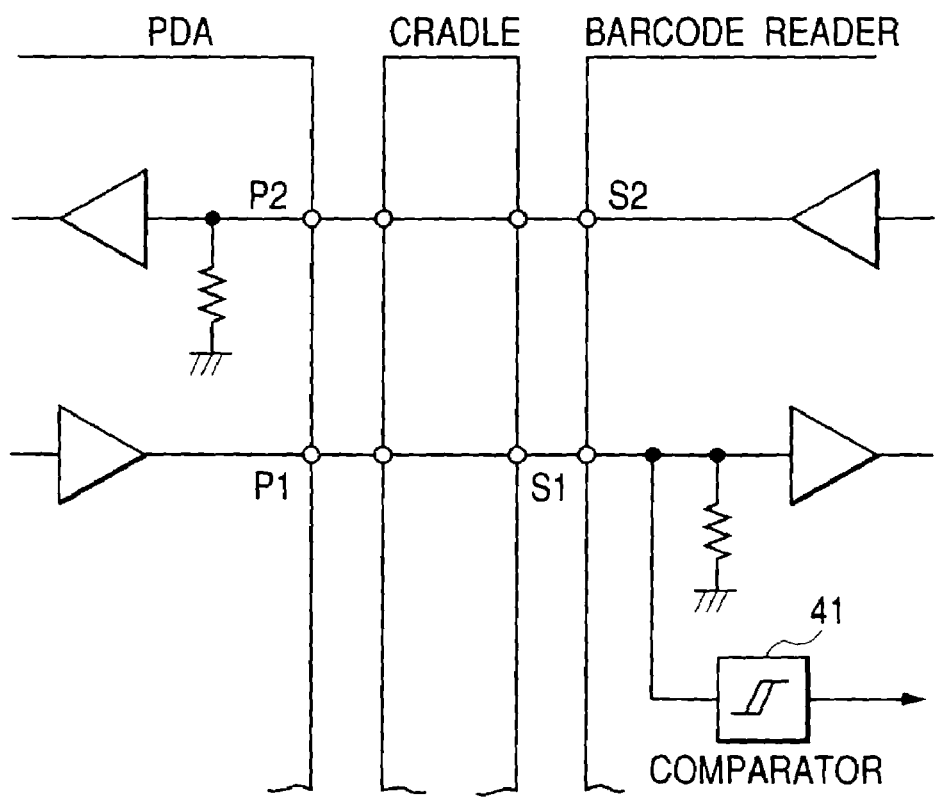
FIG. 26 is a circuit diagram which shows an internal structure of a barcode reader according to the eighth embodiment of the invention.
Figure 27:
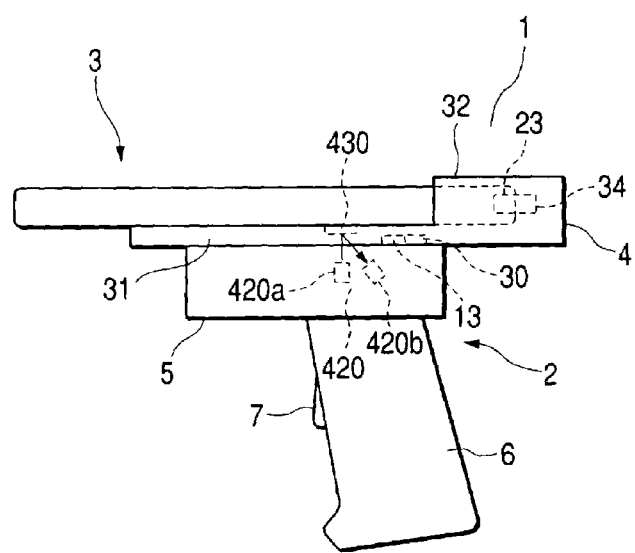
FIG. 27 is a side view which shows an optical information reading apparatus according to the ninth embodiment of the invention.

FIGS. 26 and 27 show the eighth and ninth embodiments of the invention which are different from the seventh embodiment only in a manner to detect the joint between the barcode reader 2 and the cradle 4 (i.e., the PDA 3). Other arrangements are identical, and explanation thereof in detail will be omitted here.

The barcode reader 2 in the eighth embodiment of FIG. 26 has installed therein the comparator 41 which works to measure a preselected electrical characteristic (e.g., voltage) appearing at at least one of signal terminals (only two are illustrated) of the connector 13, e.g., the terminal S1 to which a given current signal is inputted from the signal terminal P1 of the PDA 3 and output a signal indicative thereof to the controller 14. The controller 14 monitors the signal inputted from the comparator 41 and determines whether the barcode reader 2 is now coupled to the PDA 3 or not.

Specifically, when each terminal of the connector 23 of the PDA 3 is joined to one of terminals of the connector 13 of the barcode reader 2 through the cradle 4 (i.e., the connectors 34 and 39), the voltage at the signal terminal S1 has a higher level. Alternatively, when such a condition is not encountered, the voltage at the signal terminal S1 has a lower level. Specifically, when the level of the voltage appearing at the signal terminal S1 is greater than a given value, the controller 14 determines that the barcode reader 2 is not coupled to the PDA 3 completely. This determination may be made using the impedance instead of the voltage at the signal terminal S1.

The barcode reader 2 in the ninth embodiment of FIG. 27 has the joint monitor sensor 420 such as a reflective photoelectric detector installed in the upper surface of the base body 5 thereof. The PDA 3 has a reflective area 430 formed by silver tape adhered to a portion of the back surface thereof facing the joint monitor sensor 420. The cradle 4 has formed in the mount plate 31 holes (not shown) for passage of beams of light therethrough.

The joint monitor sensor 420 consists of a light emitter 420a and a light receiver 420b. The light emitter 420a outputs a beam of light upward, as viewed in the drawing. When the PDA 3 is in place on the barcode reader 2 through the cradle 4, the joint monitor sensor 420 (i.e., the light emitter 420a and the light receiver 420b) faces the reflective area 430 vertically. A return of the light from the reflective area 430, thus, falls on the light receiver 420b. The light receiver 420b is sensitive to the light and outputs to the controller 14 a joint signal indicating that the PDA 3 is now joined to the barcode reader 2 through the cradle 4 correctly.

The joint monitor sensor 420 may be implemented by a contactless magnetometric sensor such as a proximity sensor or a microswitch. The joint between the PDA 3 and the barcode reader 2 may alternatively be monitored by outputting a test signal from the PDA 3 when turned on and receiving it in the barcode reader 2.

FIG. 28 shows the optical information reading apparatus 1 according to the tenth embodiment of the invention which is different from the seventh embodiment in electrical structure of the barcode reader 2 which establishes signal transmission. Specifically, the communication system of the barcode reader 2 connects with the PDA 3 through a common bus.

The barcode reader 2 has installed therein the first communication I/F 51 for establishing communication with the PDA 3 through the cradle 4 and the second communication I/F 52 for establishing communication with the external information terminal 16. The first and second communication I/Fs 51 and 52 are joined through the first bus line 53. The barcode reader 2 may receive electric power through the AC adaptor 160 connected to the power supply I/F 54.

Figures 29A, 29B:
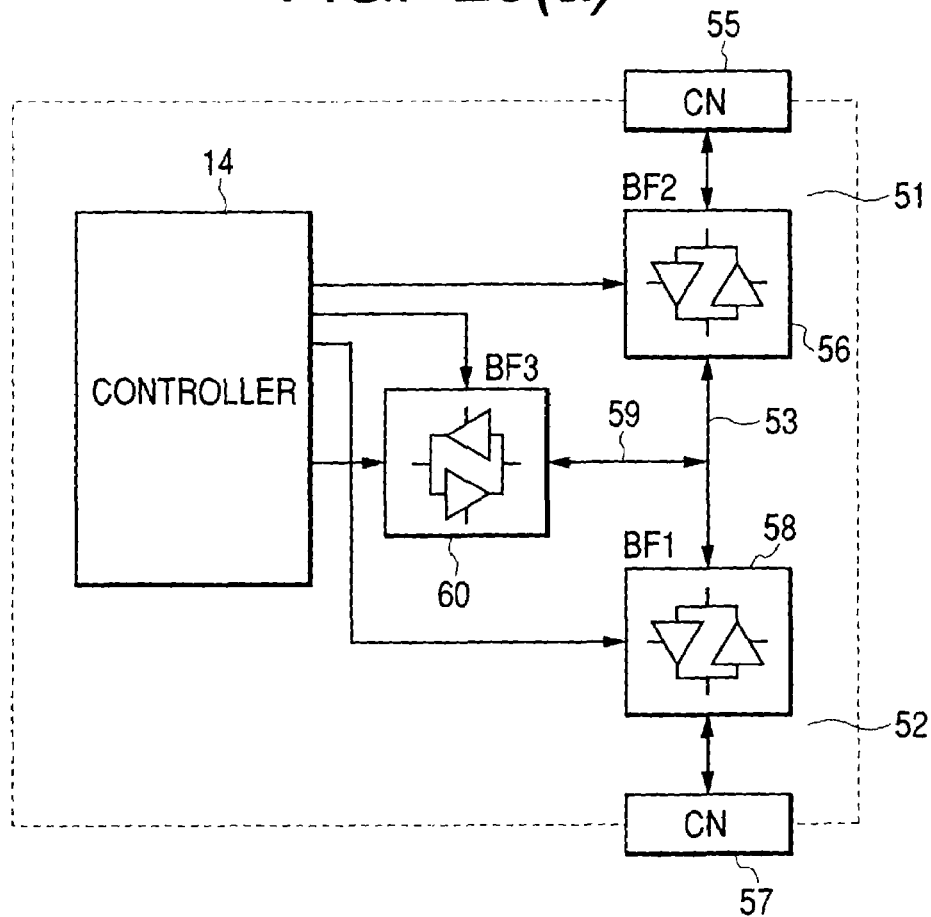
FIG. 29(a) is a circuit diagram which shows a part of an internal structure of a barcode reader of the optical information reading apparatus of FIG. 28.
FIG. 29(b) is a table listing relations among on- and off-status of first, second, and third buffers installed in the barcode reader as illustrated in FIG. 29(a)

The first communication I/F 51, as clearly shown in FIG. 29(*a*), includes the connector 55 and the second buffer 56 (as labeled BF2 in FIG. 29(*b*)). The second communication I/F 52 includes the connector 57 and the first buffer 58 (as labeled BF1 in FIG. 29(*b*)). The controller 14 and the first bus line 53 (i.e., a junction between the first and second buffers 58 and 56) are joined by the second bus line 59. The signal line controller 60 is installed in the second bus line 59. The signal line controller 60 is made by a bidirectional buffer and will be referred to below as the third buffer 60 (as labeled BF3 in FIG. 29(*b*)).

The first, second, and third buffers 58, 56, and 60 are turned on or off by the controller 14 to selectively establish one of two modes: a normal mode in which the controller 14 uses the first and second bus lines 53 and 59 in communicating with the PDA 3 or the external information terminal 16 and a bus use mode in which the PDA 3 uses the first bus line 53 in communicating with the external information terminal 16. The controller 14, thus, functions as a selector for selecting one of the normal mode and the bus use mode.

Specifically, when the joint of the PDA 3 to the barcode reader 2 is detected, and it is required to establish communication (e.g., transmission of the barcode data) between the barcode reader 2 and the PDA 3, the controller 14 turns off the first buffer 58 and on the second and third buffers 56 and 60 to allow the communication between the barcode reader 2 and the PDA 3.

When the barcode reader 2 is not connected to the PDA 3, but to the external information terminal 16, and it is required to establish communication (e.g., transmission of the barcode data) between the barcode reader 2 and the external information terminal 16, the controller 14 turns off the second buffer 56 and on the first and third buffers 58 and 60 to allow the communication between the barcode reader 2 and the external information terminal 16.

When the controller 14 receives the information transmission request signal from the PDA 3 which requests transmission of data to the external information terminal 16, it turns on the first and second buffers 58 and 56 to establish the bus use mode in which the PDA 3 is allowed to use the first bus line 53, thereby enabling direct communication between the PDA 3 and the external information terminal 16. In the bus use mode, the controller 14, as indicated by "X" in FIG. 29(*b*), turns on only a reception side of the third buffer 60 to monitor the use of the first bus line 53 (i.e., data transmission in the first bus line 53). If the first bus line 53 is not used for a given period of time or more, the controller 14 concludes that the data transmission between the PDA 3 and the external information terminal 16 has been completed and switches the bus use mode to the normal mode.

As apparent from the above discussion, the optical information reading apparatus 1 of this embodiment is designed to selectively allow the first bus line 53 of the barcode reader 2 to be used for direct communication between the PDA 3 and the external information terminal 16, that is, to select one of the normal mode and the bus use mode as needed.

Figure 30:
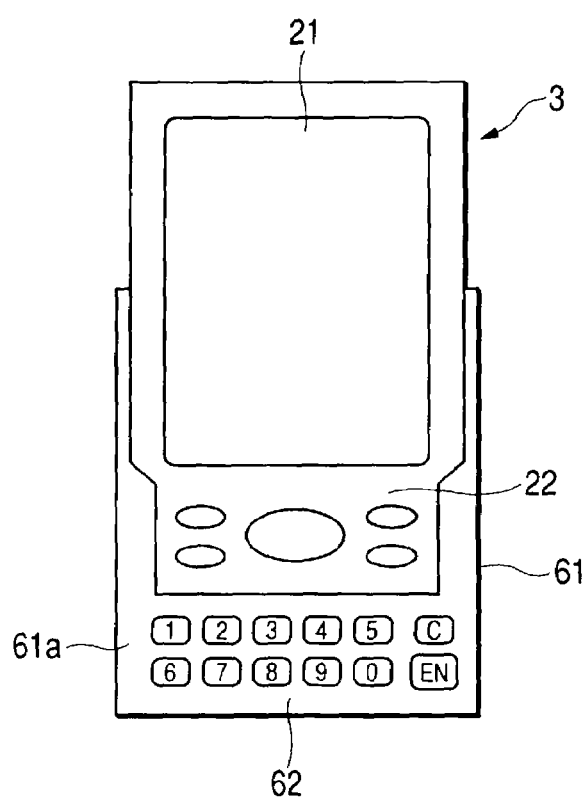
FIG. 30 is a front view which shows a cradle on which a PDA is mounted according to the eleventh embodiment of the invention.
Figure 31:
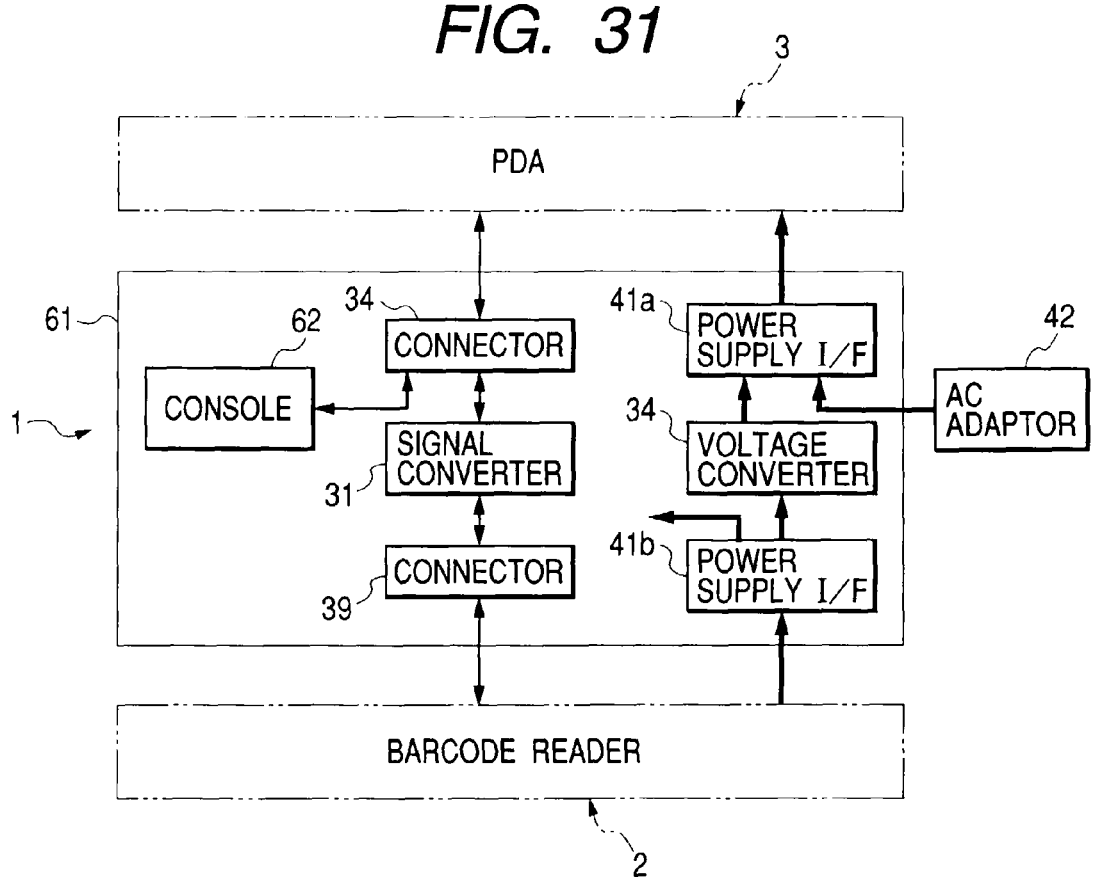
FIG. 31 is a block diagram which shows a structure of the cradle as illustrated in FIG. 30.

FIG. 30 shows the eleventh embodiment of the invention which is different from the seventh embodiment in that the cradle 61 has installed on the upper wall of the pocket 61*a* the console 62 equipped with ten-key switches. Upon insertion of the PDA 3 into the pocket 61*a* of the cradle 61, an electrical joint between the PDA 3 and the console 62 of the cradle 61 is established, thereby enabling numerical data inputted at the console 62 to be transmitted, as shown in FIG. 31, to the PDA 3 through the first connector 34.

The structure of this embodiment enables input of data entered manually by the user at the console 62 of the cradle 61 to the PDA 3 even if the PDA 3 is of the type not having ten-key switches on the console 22.

The optical information reading apparatus 1 of the above described seventh to eleventh embodiments may be equipped with the handheld two-dimensional code reader 81, as illustrated in FIG. 19, instead of the barcode reader 2. The two-dimensional code reader 81 includes the base body 82 and the grip 83 installed on the back surface of the base body 82. The base body 82 has installed therein a code reading device equipped with a CCD area sensor, etc. which works to optically read the two-dimensional code C located away therefrom. It is advisable that the field of view of the two-dimensional code reader 81 be oriented downward slightly.

The optical information reading apparatus 1 of the seventh to eleventh embodiments may also have, as shown in FIG. 20, the antenna 91 for establishing radio communications with the external information terminal 16 through the radio communication unit 92 coupled to the terminal 16. The radio communication system may also include a wireless LAN or a module of a cellular phone.

The image reading device 8 of the barcode reader 2 may be implemented by a laser scanner. Instead of the PDA 3, any compact portable information processing device may be used which is capable of entry, output, and processing of data. The cradle may be made only of a box or a frame and have installed therein a console section such as a data entry keypad.

The PDA 3 may be selected from a variety of commercially available PDAs and combined with the barcode reader 2 to construct the optical information reading apparatus of a type of interest to the user. The cradle 4 must be so designed as to match in size with a selected one of the PDAs, but however, the same structure of a joint to the barcode reader 2 may be shared among the PDAs, thereby permitting a variety of optical information reading apparatuses to work to perform different functions to be constructed easily.

Figure 32:
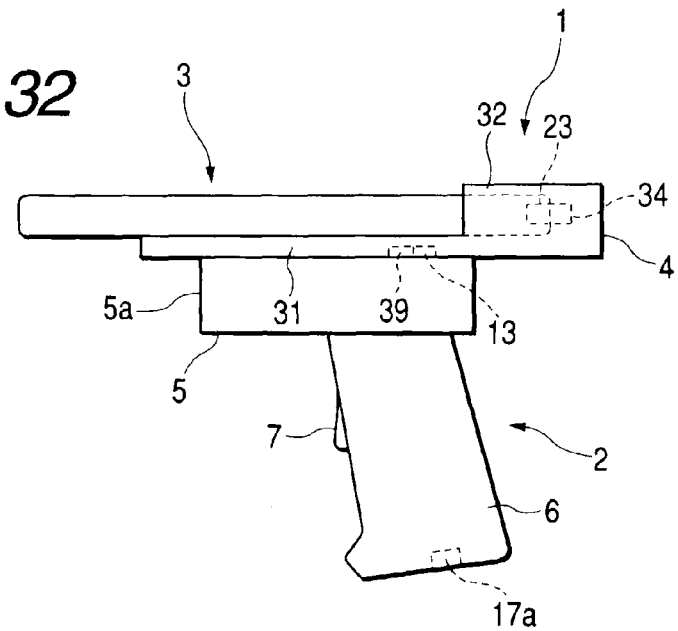
FIG. 32 is a side view which shows an optical information reading apparatus according to the twelfth embodiment of the invention.

FIG. 32 shows an optical information reading apparatus 1 according to the twelfth embodiment of the invention which is substantially identical in mechanical and electrical structure with the one of the seventh embodiment as illustrated in FIGS. 21(*a*) to 22. Explanation thereof in detail will, thus, be omitted here.

The barcode reader 2 has installed in the bottom of the grip 6 the connector 17a which connects the coupling cable I/F 170 and the external information terminal 16 through the AC adaptor 160.

The barcode reader 2 is designed to determine whether the PDA 3 is now joined to the barcode reader 2 or not in the same manner as in the seventh embodiment and also perform a function of determining whether the coupling cable I/F 170 is now joined to an external power supply or not to determine whether electric power required to drive the barcode reader 2 itself should be provided from the battery 18, as illustrated in FIG. 22, or the external power supply. The barcode reader 2 is also designed to monitor the available power remaining in the battery 18 to predict the available reserve time remaining to a preselected end power level of the battery 18 need to drive the barcode reader 2 itself normally.

The PDA 3, like the above embodiments, may be one of commercially available PDAs selected for an intended application and is equipped with a charging system working to charge the battery 28 using electrical energy supplied from an external source. The PDA 3 is, like the barcode reader 2, designed to perform a function of monitoring the available power remaining in the battery 28 to predict the available reserve time of the battery 28.

The cradle 4 has substantially the same physical structure as described in the first to sixth embodiments and the same electrical structure as illustrated in FIG. 22. Specifically, the cradle 4, as clearly shown in FIG. 21(a), has installed on the back surface of the mount plate 31 the connector 39 which is to be joined electrically to the connector 13 of the barcode reader 2. The cradle 4 also has the joint structure, as described in the above embodiments, which establishes a joint to the barcode reader 2 detachably. The joint or removal of the cradle 4 (i.e., the PDA 3) to or from the barcode reader 2 is accomplished by sliding the cradle 4 and the barcode reader 2 relative to each other to release the joint therebetween. Upon completion of the joint, the second connector 39 of the cradle 4 is coupled to the connector 13 of the barcode reader 2.

The cradle 4, as clearly shown in FIG. 22, has the first connector 34 and the second connector 39 and a signal line connecting them for establishing communication between the barcode reader 2 and the PDA 3 when jointed together. The cradle 4 also has a signal converter 31 installed between the connectors 34 and 38 which enables the communication between the barcode reader 2 and the PDA 3 if they are different in communication protocol.

The cradle 4, as shown in FIG. 22, has disposed therein the power supply I/F 41b for electrical connection with the power supply I/F 20 of the barcode reader 2 and the power supply I/F 41a for electrical connection with the power supply I/F 30 of the PDA 3. The power supply I/F 41a has a first power supply terminal that is a part of terminals of the first connector 34. The power supply I/F 41b has a second power supply terminal that is a part of terminals of the second connector 39. The first and second connectors 34 and 39 are joined through a power supply line connecting the first and second power supply terminals thereof and a signal transmission line connecting signal terminals thereof. Specifically, the first and second connectors 34 and 39 are used for transmission of a data signal and supply of electrical power.

The power supply I/Fs 41a and 41b are coupled through the voltage converter 340 such as a switching regulator. The power supply I/F 41a is designed to be connectable with the AC adaptor 42, as shown in FIGS. 22 and 24, to receive the electric power from an external source for the PDA 3. The voltage converter 340 and the signal converter 31 are designed to receive the electric power required to drive them from a power supply terminal of the connector 13 of the barcode reader 2 through the connector 39. The voltage converter 340 works to convert the electric power into the rated voltage of the PDA 3 and supply it to the PDA 3 through the power supply I/F 41a.

The controller 14 of the barcode reader 2 is, as will be described below in detail, designed to perform a software function to select a power source from which electrical power need to drive the barcode reader 2 itself is to be received and control a supply of electric power to drive the PDA 3, that is, an output of electric power from a power output terminal of the power supply I/F 20.

Specifically, when the barcode reader 2 is not joined to an external power supply, it uses the power of the battery 18 to drive itself. Alternatively, when the barcode reader 2 is joined to the external power supply through the AC adaptor 160, it uses the power from the external power supply without using the battery 18. Further, when the barcode reader 2 is joined both to the external power supply and to the PDA 3, it provides the part of the power from the external power supply to the PDA 3 through the power supply I/F 20. When the barcode reader 2 is at rest in connection with the external power supply, it uses the power from the external power supply to charge the battery 18.

A determination of whether the coupling cable I/F 170 of the barcode reader 2 is joined to the external power supply or not is made by measuring the voltage appearing at a feed terminal of the connector 17a through a voltage detector installed in the barcode reader 2. Additionally, a determination of whether the barcode reader 2 is now joined to the PDA 3 is made in the same manner as described in the seventh to eleventh embodiments.

Specifically, when turned on, the controller 14 outputs the test signal a, as indicated in FIG. 25, from the communication I/F 15 to the PDA 3 through the cradle 4. Upon input of the test signal a through the communication I/F 26, the controller 24 of the PDA 3 outputs the answer signal b from the communication I/F 26 to the barcode reader 2. When the answer signal b is inputted to the barcode reader 2 within the given period of time T from the output of the test signal a, the controller 14 of the barcode reader 2 concludes that the PDA 3 is now joined to the barcode reader 2 through the cradle 4.

Further, when it is determined that the barcode reader 2 is not joined to the external power supply meaning that the barcode reader 2 is powered by the battery 18, but to the PDA 3, the barcode reader 2 estimates the available reserve time of the battery 18 to determine the operable time t1 for which the barcode reader 2 is allowed to operate normally and compares it with the operable time t2 of the PDA 3 which is determined as a function of the available reserve time of the battery 28 of the PDA 3, as derived through communications with the PDA 3. When it is determined that the operable time t1 of the PDA 3 is shorter than the operable time t2 of the barcode reader 2, the barcode reader 2 outputs the part of the available power of the battery 18 to the PDA 3 through the power supply I/F 20.

Therefore, when the PDA 3 is joined to the barcode reader 2, and the electric power is inputted through the power supply I/F 30, the PDA 3 employs it to drive itself without use of the battery 28 installed therein. When such a condition is not met, the PDA 3 uses the battery 28 to drive itself. When the PDA 3 is separate from the barcode reader 2, the PDA 3 is, as described above, designed to receive the electrical power from an external source through the cradle 4 (i.e., the AC adaptor 42). When the PDA 3 is at rest, the received power is used to charge the battery 28.

The optical information reading apparatus 1 is, like the above embodiments, assembled by mounting the PDA 3 on the cradle 4 and attaching the cradle 4 to the barcode reader 2. The mounting of the PDA 3 on the cradle 4 is, as already described, accomplished by putting the lower portion of the PDA 3 in the pocket 32 of the cradle 4 and turning the retainer of the cradle 4 to the locked position without use of any additional parts. The attachment of the cradle 4 to the barcode reader 2 is accomplished only by sliding the cradle 4 on the base body 5 of the barcode reader 2 to bring the joint rails of the cradle 4 into engagement with the joint rails of the barcode reader 2. Additionally, the electrical connection between the first connector 34 and the connector 23 is automatically established by putting the PDA 3 in the pocket 32 of the cradle 4. The electrical connection between the second connector 39 and the connector 13 is also established automatically by installing the cradle 4 on the barcode reader 2. Specifically, the electrical connections are achieved simultaneously with the physical connections of the PDA 3 with the cradle 4 and the cradle 4 with the barcode reader 2.

The electrical connection between the PDA 3 and the barcode reader 2 is established through a transmission system made up of the communication I/F 15, the connector 13, the second connector 39, the first connector 34, the connector 23, and the communication I/F 26, thereby permitting the optical information reading apparatus 1 to function as a barcode handy terminal. In operation, the optical information reading apparatus 1, as shown in FIG. 21(b), works to read the barcode B optically through the barcode reader 2 and transmit it to the PDA 3 for data storage or processing. A scan of the barcode B located away is achieved only by grasping the grip 6 of the barcode reader 2 by a hand of the user and sweeping the barcode reader 2.

The optical information reading apparatus 1 may be employed in combination with the external information terminal 16 through the coupling cable I/F 170 of the barcode reader 2. Upon input of the information transmission request signal from the PDA 3, the controller 14 transmits data produced by the PDA 3 to the external information terminal 16 through the barcode reader 2. The data produced by the external information terminal 16 may also be transmitted to the PDA 3 through the barcode reader 2.

It is possible to separate the optical information reading apparatus 1 into the barcode reader 2 and the PDA 3 easily. The barcode reader 2 itself, as shown in FIG. 23, can be used to read the barcode B. In this case, the barcode reader 2 may be connected electrically to the external information terminal 16. When the controller 14 of the barcode reader 2 concludes that the barcode reader 2 is not joined to the PDA 3, the barcode reader 2 transmits the barcode data to the external information terminal 16 through the coupling cable I/F 170 for processing it. A scan of the barcode B may be achieved easily by grasping the grip 6 of the barcode reader 2 and sweeping the barcode reader 2.

The PDA 3 may be employed alone or while being mounted on the cradle 4. In the latter case, the user may pivot the retainer of the cradle 4 to form the support which bears, as shown in FIG. 24, the PDA 3 on the table at the preselected tilt angle which provides the ease of visibility of the display 21 to the user. The PDA 3 may be employed in connection with the external information terminal 16 through the communication I/F 27.

Figure 33:
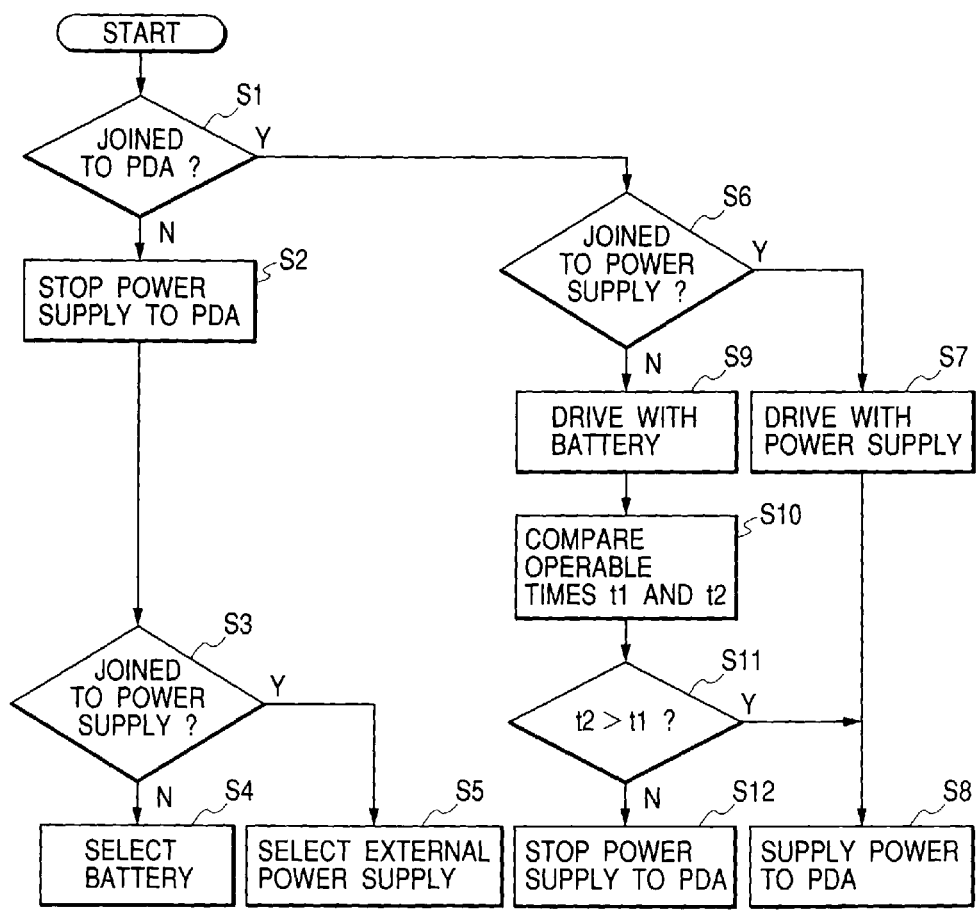
FIG. 33 is a flowchart of a program executed by the optical information reading apparatus of FIG. 32.

FIG. 33 shows a flowchart of a program executed by the controller 14 of the barcode reader to select a power supply to be used to drive itself.

After entering the program, the routine proceeds to step 1 wherein it is determined whether the barcode reader 2 is now joined to the PDA 3 or not. This determination is made, as described above, by monitoring whether the answer signal b has been received within the period of time T from output of the test signal a or not. If a NO answer is obtained meaning that the barcode reader 2 is not joined to the PDA 3, then the routine proceeds to step 2 wherein a supply of electrical power to the PDA 3 is stopped.

The routine proceeds to step 3 wherein it is determined whether an external power supply is joined to the coupling cable I/F 170 of the barcode reader 2 through the AC adaptor 160 or not. If a NO answer is obtained, then the routine proceeds to step 4 wherein the battery 18 is selected as a power supply for the barcode reader 2 itself. Alternatively, if a YES answer is obtained meaning that the barcode reader 2 is jointed to the external power supply, then the routine proceeds to step 5 wherein the external power supply is selected to drive the barcode reader 2 itself.

Specifically, when the barcode reader 2 is used alone in connection with the external power supply, the barcode reader 2 receive electrical power from the external power supply to drive itself and charge the battery 18. When not joined to the external power supply, the barcode reader 2 employs the battery 18 to drive itself. In this case, the power is not supplied to the power output terminal of the connector 13.

The PDA 3 may also be employed alone. In this case, the PDA 3 employs the battery 28 installed therein to drive itself. The user may use the cradle 4 as a support which bears, as shown in FIG. 24, the PDA 3 on the table at the preselected tilt angle. The PDA 3 may also receive the electrical power from an external source through the AC adaptor 42, as illustrated in FIG. 24, to drive itself or charge the battery 28.

When the PDA 3 is joined to the barcode reader 2, a YES answer is obtained in step 1. The routine, thus, proceeds to step 6 wherein it is determined whether an external power supply is joined to the coupling cable I/F 170 of the barcode reader 2 through the AC adaptor 160 or not. If a YES answer is obtained meaning that the barcode reader 2 is jointed to the external power supply, then the routine proceeds to step 7 wherein the external power supply is selected to drive the barcode reader 2. The routine proceeds to step 8 wherein the barcode reader 2 supplies the part of the electrical power received from the external power supply to the PDA 3 through the power output terminal of the connector 13.

Therefore, the barcode reader 2 employs the external power supply to drive itself and supplies the part thereof to the PDA 3 through the cradle 4 (i.e., the power supply I/Fs 41b and 41a) and the connector 21 of the PDA 3 for driving the PDA 3 itself or charging the battery 28 of the PDA 3. The voltage converter 340 of the cradle 4 works to convert the received electrical power into the rated voltage of the PDA 3 and supplies it to the PDA 3. The voltage converter 340 also employs the received electrical power to drive itself.

Specifically, when the external power supply is joined to the coupling cable I/F 170 of the barcode reader 2, it enables actuation of all the barcode reader 2, the PDA 3, and the cradle 4 constituting the optical information reading apparatus 1 (or charging of the batteries 18 and 28) using the single external power supply. Installation of the voltage converter 340 in the cradle 4 permits the barcode reader 2 to be employed in combination with any of commercially available PDAs When not joined to the external power supply, a NO answer is obtained in step 6. The routine, thus, proceeds to step 9 wherein the battery 18 is selected as a power supply for the barcode reader 2 itself.

The routine proceeds to step 10 wherein the operable time t2 as calculated as a function of the available reserve time of the battery 18 of the barcode reader 2 is compared with the operable time t2 as calculated as a function of the available reserve time of the battery 28 of the PDA 3.

The routine proceeds to step 11 wherein it is determine whether the operable time t2 is greater than the operable time t1 or not. If a NO answer is obtained (t1>t2), then the routine proceeds to step 12 wherein a supply of electrical power from the connector 13 to the PDA 3 is stopped. The barcode reader 2 and the PDA 3, thus, employ the batteries 18 and 28 installed therein, respectively.

Alternatively, if a YES answer is obtained in step 11 meaning that the operable time t2 of the PDA 3 is longer than the operable time t1 of the barcode reader 2, then the routine proceeds to step 8 wherein the barcode reader 2 supplies the electrical power to the PDA 3. Specifically, the barcode reader 2 outputs the part of available power derived from the battery 18 to the PDA 3 from the power supply I/F 20. This results in an increased operable time to be consumed by the whole of the optical information reading apparatus 1.

Figure 34:
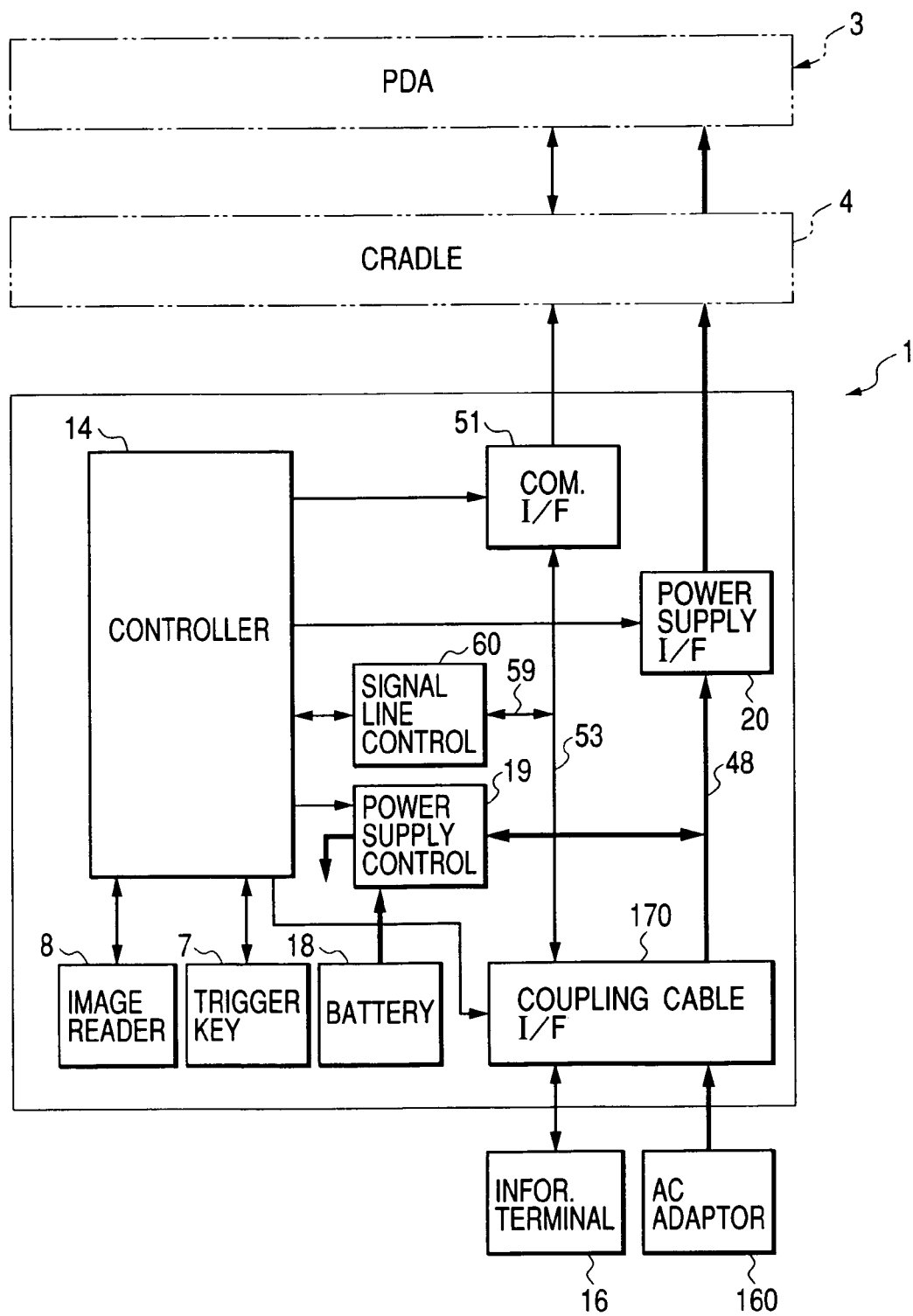
FIG. 34 is a block diagram which shows an optical information reading apparatus according to the thirteenth embodiment of the invention.

FIG. 34 shows an optical information reading apparatus 1 according to the thirteenth embodiment of the invention that is a modification of the tenth embodiment as illustrated in FIG. 28. The same reference numbers as employed in the above embodiments will refer to the same parts, and explanation thereof in detail will be omitted here.

The barcode reader 2 of this embodiment has busses installed in the power supply and communications systems thereof which are shared with the PDA 3. The barcode reader 2 also has the joint monitor sensor 420, as illustrated in FIG. 27, installed in the upper surface of the base body 5 thereof. The PDA 3 has the reflective area 430 formed by silver tape adhered to a portion of the back surface thereof facing the joint monitor sensor 420. The cradle 4 has formed in the mount plate 31 holes (not shown) for passage of beams of light therethrough.

The joint monitor sensor 420, as already described with reference to FIG. 27, consists of the light emitter 420a and the light receiver 420b. The light emitter 420a outputs a beam of light toward the cradle 4. When the PDA 3 is in place on the barcode reader 2 through the cradle 4, the joint monitor sensor 420 (i.e., the light emitter 420a and the light receiver 420b) faces the reflective area 430 vertically. This causes a return of the light from the reflective area 430 to fall on the light receiver 420b. The light receiver 420b is sensitive to the light and outputs to the controller 14 a joint signal indicating that the PDA 3 is now joined to the barcode reader 2 through the cradle 4 correctly.

The barcode reader 2 has installed therein the communication I/F 51 for establishing communication with the PDA 3 through the cradle 4 and the coupling cable I/F 170 for establishing communication with the external information terminal 16. The communication I/F 51 and the coupling cable I/F 170 are joined through the first bus line 53. The controller 14 and the first bus line 53 (i.e., a junction between the communication I/F 51 and the coupling cable I/F 170) are joined by the second bus line 59. The signal line controller 60 is installed in the second bus line 59.

The signal line controller 60 is controlled by the controller 14 to select one of a first mode in which the barcode reader 2 establishes communication with the external information terminal 16 using the first and second bus lines 53 and 59 and a second mode in which the PDA 3 establishes communication with the external information terminal 16 using only the first bus line 53.

Figure 35:
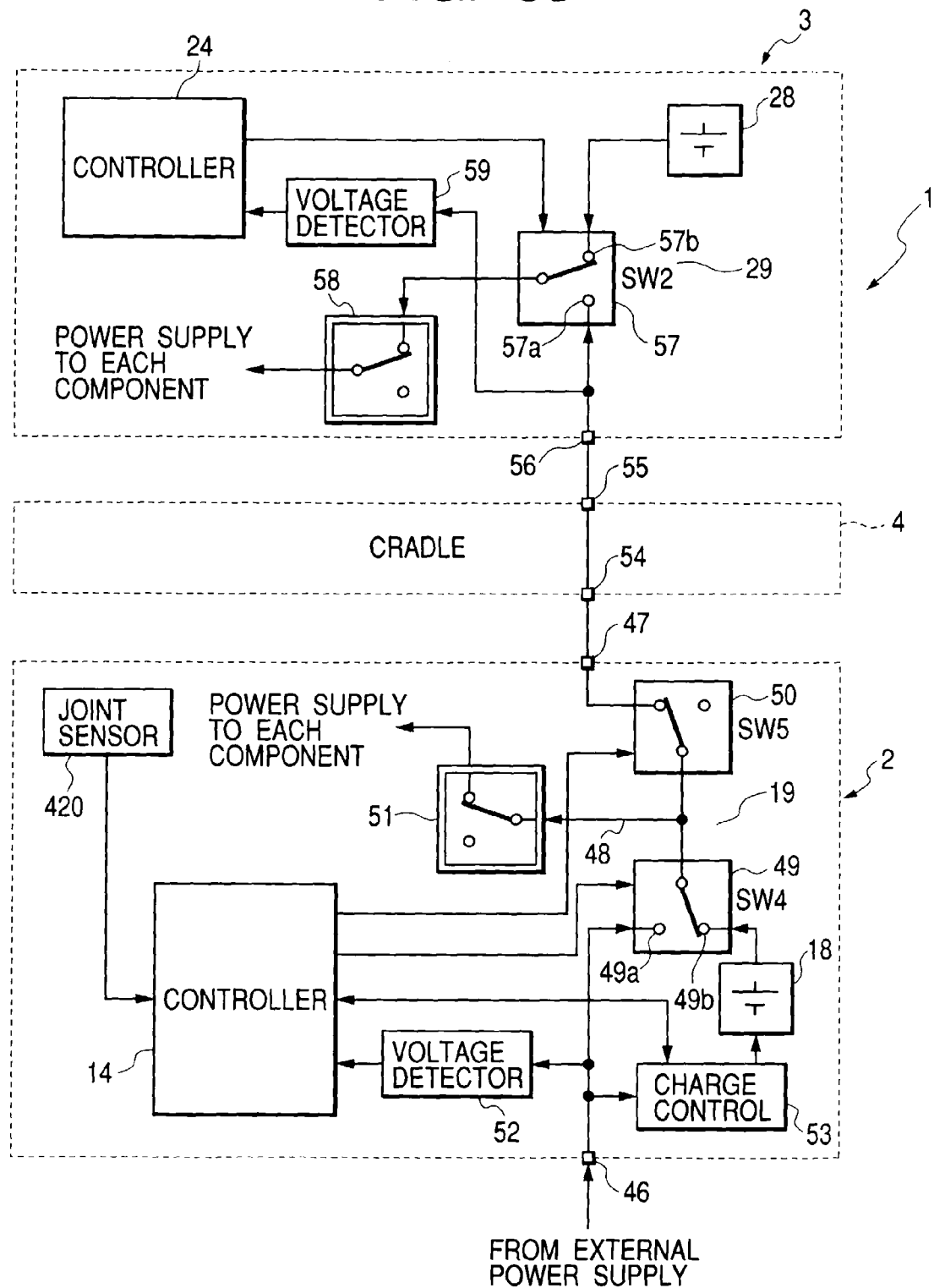
FIG. 35 is a block diagram which shows internal structures of a barcode reader and a PDA in the thirteenth embodiment.

FIG. 35 shows circuit structures of the power supply controllers 19 and 29 of the barcode reader 2 and the PDA 3.

In the barcode reader 2, the feed terminal 46 of the coupling cable I/F 170 (i.e., the connector 17a) and the power output terminal 47 of the power supply I/F 20 (i.e., the connector 13) are, as shown in FIG. 34, coupled by the power supply line 48. The selector switch 49 and the on/off switch 50 are, as shown in FIG. 35, disposed in the power supply line 48 in series.

A junction between the selector switch 49 and the on/off switch 50 is connected to the power supply switch 51. The power supply switch 51 is designed to be turned on or off manually by the user. In the on-state, the power supply switch 51 works to supply the electric power to each part of the barcode reader 2. FIG. 35 illustrates the on-state of each switch.

The selector switch 49 has the outer power supply terminal 49a leading to the feed terminal 46 and the battery terminal 49b leading to the battery 18. The selector switch 49 is responsive to a selection signal from the controller 14 to be switched between an on-state which establishes a connection of the power supply line 48 to the feed terminal 46 and an off-state which establishes a disconnection of the power supply line 48 from the feed terminal 46. The on/off switch 50 is also responsive to a selection signal from the controller 14 to be switched between an on-state which establishes a connection of the power supply line 48 to the power output terminal 47 and an off-state which establishes a disconnection of the power supply line 48 from the power output terminal 47.

The feed terminal 46 also connects with the voltage detector 52 which works to measure the voltage developed at the feed terminal 46 and provide a signal indicative thereof to the controller 14 for detection of a joint to an external power supply. The controller 14 receives an output from the joint monitor sensor 420. The barcode reader 2 has installed therein the charge control circuit 53 which works to charge the battery 18 under control of the controller 14.

When the barcode reader 2 is joined to the PDA 3, the power output terminal 47 is connected to the power input terminal 56 of the power supply I/F 30 (i.e., the connector 23) of the PDA 3 through the second power supply terminal 54 and the first power supply terminal 55 of the cradle 4. The power input terminal 56 of the PDA 3 leads to the external power supply terminal 57a of the selector switch 57. The selector switch 57 has the battery terminal 57b leading to the battery 28 and is actuated by the controller 24.

The selector switch 57 also connects with the power supply switch 58. The power supply switch 58 is turned on or off manually by the user. In the on-state, the power supply switch 58 works to supply the electric power to each part of the PDA 3. The power supply switch 58 also connects with the voltage detector 59 which works to measure the voltage developed at the power input terminal 56 and provide a signal indicative thereof to the controller 24 for detection of a supply of the electric power to the power input terminal 56. The PDA 3 also has a charge control circuit (not shown) which works to charge the battery 28 under control of the controller 24.

When the voltage detector 52 of the barcode reader 2 has detected the joint to an external power supply in the on-state of the power supply switch 51, the controller 14 establishes the connection to the external power supply terminal 49a through the selector switch 49 to feed the electric power from the external power supply to each part of the barcode reader 2. The controller 14 also controls the charge control circuit 53 to charge the battery 18. Further, when the joint to the PDA 3 has been detected through the joint monitor sensor 420, the controller 14 brings the on/off switch 50 to the on-state to feed the part of the electric power from the external power supply to the PDA 3 through the power output terminal 47.

Alternatively, when the barcode reader 2 is not coupled to the external power supply, the controller 14 establishes the connection to the battery terminal 49b through the selector switch 49 to feed the electric power from the battery 18 to each part of the barcode reader 2. Additionally, when the joint to the PDA 3 is detected through the joint monitor sensor 420, and an estimated value of the operable time t1 of the PDA 3 is smaller than that of the operable time t2 of the barcode reader 2, the controller 14 turns on the on/off switch 50 to feed the part of the electric power of the battery 18 to the PDA 3. When the estimated value of the operable time t1 of the PDA 3 is greater than that of the operable time t2 of the barcode reader 2, the controller 14 turns off the on/off switch 50. When the joint monitor sensor 420 does not detect the joint to the PDA 3, the controller 14 keeps the on/off switch 50 off.

When the voltage detector 59 of the PDA 3 has detected a supply of the electric power to the power input terminal 56, the controller 24 establishes the connection of the power supply switch 58 to the external power supply terminal 57a through the selector switch 57 to feed the electric power inputted from the barcode reader 2 through the cradle 4 to each part of the PDA 3. The controller 24 also controls the charge control circuit (not shown) to charge the battery 28. Alternatively, when the supply of the electric power is not detected, the controller 24 establishes the connection of the power supply switch 58 to the battery 28 through the selector switch 57 to feed the electric power of the battery 28 to each part of the PDA 3.

The optical information reading apparatus 1 of each of the twelfth and thirteenth embodiments may be modified as illustrated in FIGS. 30, 31, 19, and 20.

Specifically, the cradle 4 may be replaced with the cradle 61 of the FIG. 30 which has installed on the upper wall of the pocket 61a the console 62 equipped with ten-key switches. Upon insertion of the PDA 3 into the pocket 61a of the cradle 61, an electrical joint between the PDA 3 and the console 62 of the cradle 61 is established, thereby enabling numerical data inputted at the console 62 to be transmitted, as shown in FIG. 31, to the PDA 3 through the first connector 34.

The structure of the cradle 61 enables input of data entered manually by the user at the console 62 of the cradle 61 to the PDA 3 even if the PDA 3 is of the type not having ten-key switches on the console 22.

The barcode reader 2 may be replaced with the handheld two-dimensional code reader 81, as illustrated in FIG. 19. The two-dimensional code reader 81 includes the base body 82 and the grip 83 installed on the back surface of the base body 82. The base body 82 has installed therein a code reading device equipped with a CCD area sensor, etc. which works to optically read the two-dimensional code C located away therefrom. It is advisable that the field of view of the two-dimensional code reader 81 be oriented downward slightly.

The joint monitor sensor 420 may be implemented by a contactless magnetometric sensor such as a proximity sensor or a microswitch.

The image reading device 8 of the barcode reader 2 may be implemented by a laser scanner. Instead of the PDA 3, any compact portable information processing device may be used which is capable of entry, output, and processing of data. The cradle 4 may be made only of a box or a frame and have installed therein a console section such as a data entry keypad.

The PDA 3 may be selected from a variety of commercially available PDAs and combined with the barcode reader 2 to construct the optical information reading apparatus of a type of interest to the user. The cradle 4 must be so designed as to match in size with a selected one of the PDAs, but however, the same structure of a joint to the barcode reader 2 may be shared among the PDAs, thereby permitting a variety of optical information reading apparatuses to work to perform different functions to be constructed easily.

Figure 36:
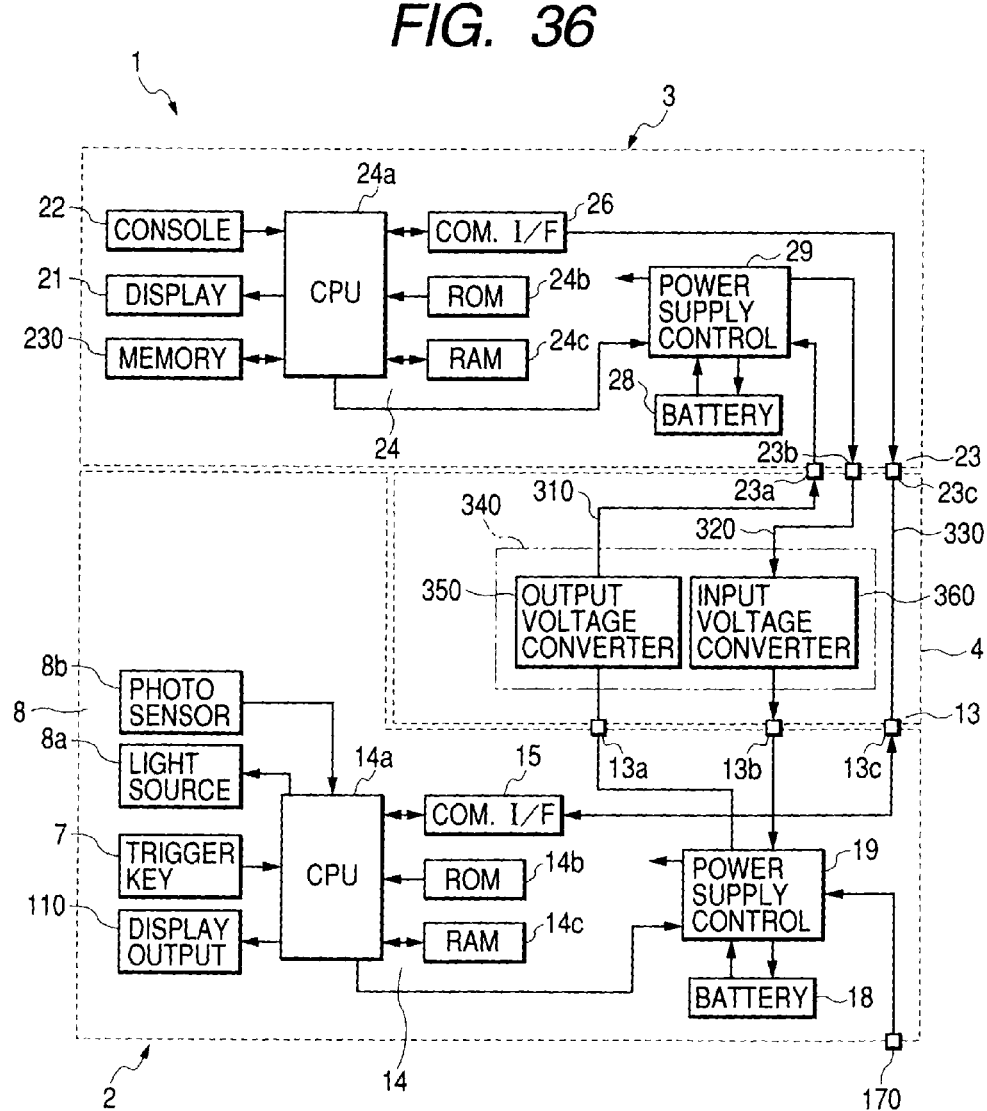
FIG. 36 is a block diagram which shows an optical information reading apparatus according to the fourteenth embodiment of the invention.

FIG. 36 shows the optical information reading apparatus 1 according to the fourteenth embodiment of the invention. The physical or mechanical structure of the optical information reading apparatus 1 is identical with that of the one illustrated FIGS. 21(a) and 21(b) of the seventh embodiment, and explanation thereof in detail will be omitted here.

The barcode reader 2 has the image reading device 8 which may be of a know type consisting of a light source 8a and a light sensitive sensor 8b. The light source 8a is designed to emit a beam of light elongated in a lengthwise direction of the barcode B, as illustrated in FIGS. 8(a) and 8(b). The light sensitive sensor 8b is made of, for example a CCD sensor and works to receive a return of the beam from the barcode B to provide a signal indicative of a barcode data to the controller 14.

The controller 14 consists of the CPU 14a, the ROM 14b, the RAM 14c, etc. The controller 14 receives an output of the trigger key 7 and controls an indication on the indication output device 110.

The connector 13 installed on the base body 5 of the barcode reader 2 includes the power output terminal 9a and the power input terminal 9b for establishing, as will be described later in detail, transmission of electrical power between the barcode reader 2 and the PDA 3. The connector 13 also has the signal terminal 13c for establishing transmission of a data signal. The signal terminal 13c leads to the communication I/F 15 for transmitting the barcode data as acquired by the image reading device 8 to the PDA 3 through the cradle 4.

The PDA 3 includes the controller 24 which is equipped with a microcomputer made up of the CPU 24a, the ROM 24b, the RAM 24c, etc. The controller 24 controls the display 21 and receives inputs to the console 22. The CPU 24a connects with an auxiliary memory 230.

The controller 24 also connects with the communication I/F 26 for input of data outputted from the barcode reader 2 through the connector 23. The connector 23 has the signal terminal 23c for input and output of data to and from the PDA 3. The connector 23 also has the power input terminal 23a and the power output terminal 23b for transmission of electrical power, as described later in detail, between the PDA 3 and the barcode reader 2.

Figure 37:
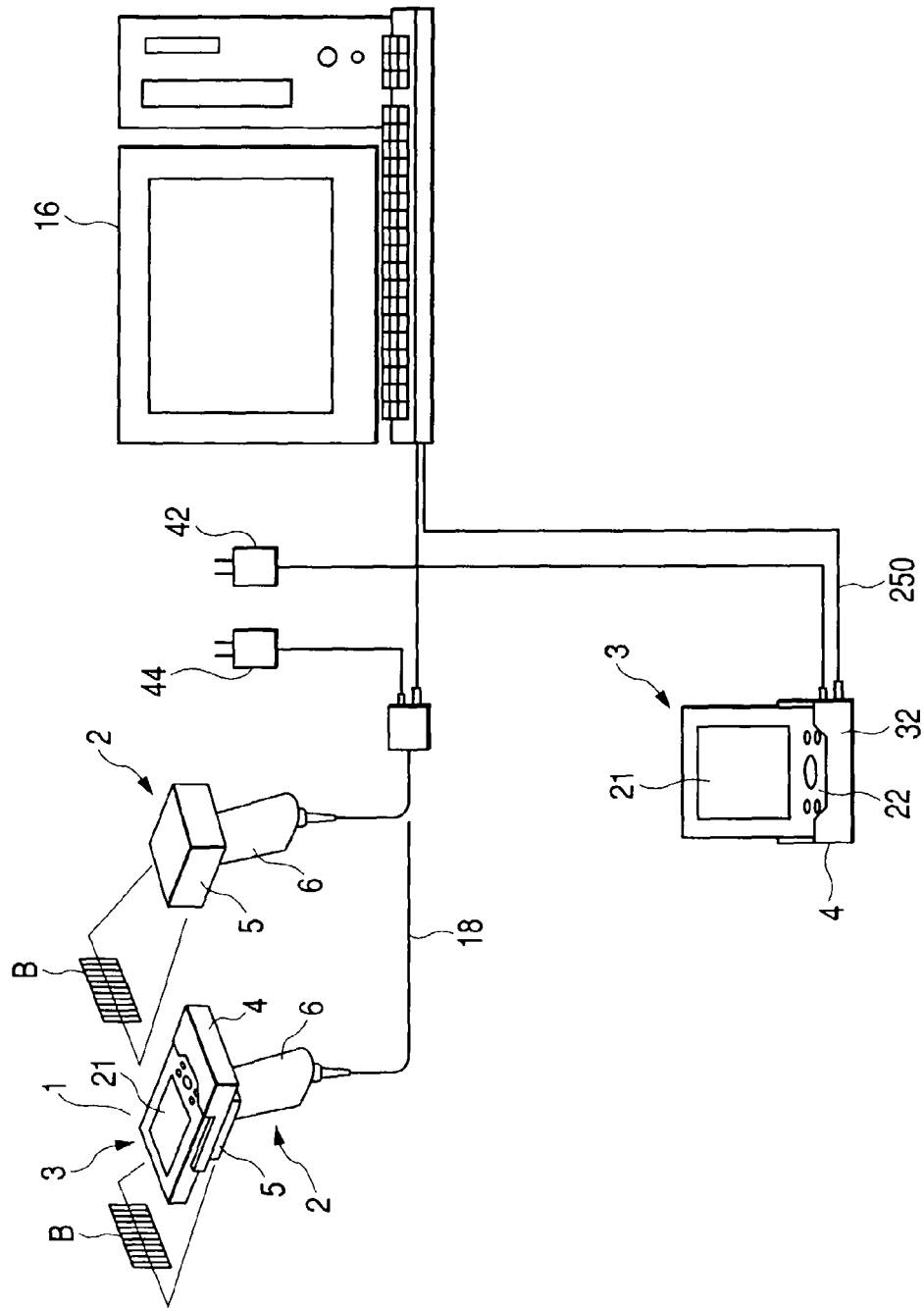
FIG. 37 is a view which shows an example of use of an optical information reading apparatus of the fourteenth embodiment.

The PDA 3 may be coupled, as illustrated in FIG. 37, to the external information terminal 16 and the AC adaptor 42 using the cable 250 through the connector 23, thereby enabling transmission of data between the PDA 3 and the external information terminal 16 and reception of electrical power from external power supply. The joints of the PDA 3 to the external information terminal 16 and the AC adaptor 42 may be achieved either with or without the cradle 4.

The cradle 4 is substantially identical in a joint structure establishing a joint to the barcode reader 2 and a holder structure holding the PDA 3 within the cradle 4 with the one as described in the above embodiments. The cradle 4 has power supply lines 310, 320, and 330 connecting between the first and second connectors 34 and 39, as illustrated in FIG. 21(*a*). When the PDA 3 is joined to the barcode reader 2, the signal line 330 establishes a connection between the signal terminal 13*c* (i.e. the communication I/F 15) of the barcode reader 2 and the signal terminal 23*c* (i.e., the communication I/F 26 of the PDA 3. The signal line 330 may have disposed therein a signal converter for matching input and output signals in communication protocol between the PDA 3 and the barcode reader 2.

The power supply line 310 connects the power output terminal 13*a* of the barcode reader 2 and the power input terminal 23*a* of the PDA 3. The power supply line 320 connects the power input terminal 13*b* of the barcode reader 2 and the power output terminal 23*b* of the PDA 3. This permits the electrical power of the batteries 18 and 28 to be transmitted between the barcode reader 2 and the PDA 3 through the cradle 4. The battery 18 of the barcode reader 2 is greater in available capacity than the battery 28 of the PDA 3 to provide a longer operable time to the barcode reader 2.

The cradle 4 also has installed therein the voltage converter 340 which consists of the output voltage converting circuit 350 and the input voltage converting circuit 360. The output voltage converting circuit 350 is disposed in the power supply line 310 and works to convert the electrical power from the barcode reader 2 into the rated voltage of the PDA 3. Similarly, the input voltage converting circuit 360 is disposed in the power supply line 320 and works to convert the electrical power from the PDA 3 into the rated voltage of the barcode reader 2. Each of the output voltage converting circuit 350 and the input voltage converting circuit 360 is made of a known DC-DC converter (i.e., a switching regulator) which changes the level of an input dc voltage to a desired level through PWM (pulse width modulation).

The voltage converter 340 is controlled by the CPU 14*a* of the controller 14 of the barcode reader 2. When the barcode reader 2 is joined to the PDA 3, the controller 14 works to perform a software function to receive power information about the available reserve power of the battery 28 and the operating voltage from the PDA 3 through the communication I/Fs 15 and 26 and estimates the available reserve time of the battery 28 to determine the operable time t2 for which the PDA 3 is allowed to operate normally. The controller 14 compares the operable time t2 with the operable time t1 of the barcode reader 2 which is determined as a function of the available reserve time of the battery 18 of the barcode reader 2 and feeds the electrical power of one of the barcode reader 2 and the PDA 3 that is longer in the operable time to the other. The controller 14 uses the power information about the operating voltage of the PDA 3 and determines the width of pulses for driving the output voltage converting circuit 350 and the input voltage converting circuit 360.

When it is required to receive the above power information, the controller 14 of the barcode reader 2 first outputs a power information request signal at a given time interval to the PDA 3. Upon reception of the power information request signal, the controller 24 performs a software function to transmit the power information to the barcode reader 2. The controller 14 also determines the time interval at which the power information request signal is outputted to the PDA 3 as a function of the available reserve power of the battery 28 of the PDA 3.

Specifically, the controller 14 predetermines two threshold values V1 and V2 use to determine the time interval of output of the power information request signal as a function of the available reserve power E of the battery 28 of the PDA 3. The threshold value V1 is set to a value close to a fully charged power of the battery 28. The threshold value V2 is set to a value of the available reserve power of the battery 28 which enables the PDA 3 to operate for approximately one hour. When the available reserve power E is smaller than the threshold value V1 and greater than the threshold value V2, the controller 14 sets the time interval of output of the power information request signal to an intermediate value (e.g., 20 minutes). When the available reserve power E is greater than the threshold value V1, the controller 14 sets the time interval of output of the power information request signal to a greater value (e.g., 30 minutes). When the available reserve power E is smaller than the threshold value V2, the controller 14 sets the time interval of output of the power information request signal to a smaller value (e.g., 5 minutes).

The controller 14 of the barcode reader 2 is, as described above, designed to detect the joint between the barcode reader 2 and the PDA 3. Specifically, when turned on, the controller 14 outputs the test signal a, as indicated in FIG. 25, from the communication I/F 15 to the PDA 3 through the cradle 4. Upon input of the test signal a through the communication I/F 26, the controller 24 of the PDA 3 outputs the answer signal b from the communication I/F 26 to the barcode reader 2. When the answer signal b is inputted to the barcode reader 2 within the given period of time T from the output of the test signal a, the controller 14 of the barcode reader 2 concludes that the PDA 3 is now joined to the barcode reader 2 through the cradle 4.

When joined to an external power supply through the AC adaptor 160, the barcode reader 2 uses the electrical power therefrom to drive itself or charge the battery 18. When joined to the PDA 3 as well as to the external power supply, the barcode reader 2 feeds the part of the electrical power from the external power supply to the PDA 3. When the PDA 3 is separate from the barcode reader 2 and joined to an external power supply through the AC adaptor 42, the PDA 3 receives the electrical power from the external power supply and charges the battery 28.

The optical information reading apparatus 1 is, like the above embodiments, assembled by mounting the PDA 3 on the cradle 4 and attaching the cradle 4 to the barcode reader 2. The mounting of the PDA 3 on the cradle 4, as already described, is accomplished by putting the lower portion of the PDA 3 in the pocket 32 of the cradle 4 and turning the retainer of the cradle 4 to the locked position without use of any additional parts. The attachment of the cradle 4 to the barcode reader 2 is accomplished only by sliding the cradle 4 on the base body 5 of the barcode reader 2 to bring the joint rails of the cradle 4 into engagement with the joint rails of the barcode reader 2. Additionally, the electrical connection between the first connector 34 and the connector 23 is automatically established by putting the PDA 3 in the pocket 32 of the cradle 4. The electrical connection between the second connector 39 and the connector 13 is also established automatically by installing the cradle 4 on the barcode reader 2. Specifically, the electrical connections are achieved simultaneously with the physical connections of the PDA 3 with the cradle 4 and the cradle 4 with the barcode reader 2.

The optical information reading apparatus 1 is, as described above, provided by an assembly of the PDA 3 and the barcode reader 2 which are joined physically by the cradle 4 and electrically by a transmission system made up of the communication I/F 15, the connector 13 (i.e., the signal terminal 13c), the second connector 39, the signal line 330, the first connector 34, the connector 23 (i.e., the signal terminal 23c), and the communication I/F 26 and works as a barcode handy terminal. In operation, the optical information reading apparatus 1, as shown in FIG. 21(b), works to read the barcode B optically through the barcode reader 2 and transmit it to the PDA 3 for data storage or processing. A scan of the barcode B located away is achieved only by grasping the grip 6 of the barcode reader 2 by a hand of the user and sweeping the barcode reader 2.

The barcode reader 2 and the PDA 3 of the optical information reading apparatus 1 are basically powered by the batteries 18 and 28 installed therein, respectively. In a case where the barcode reader 2 and the PDA 3 are combined and used as a handy terminal, if one of the batteries 18 and 28 of the barcode reader 2 and the PDA 3 lacks in available power, the other of the batteries 18 and 28 is used as a common power supply through the power output terminal 13a and the power input terminal 13b of the connector 13, the connectors 34 and 39 and the power supply lines 310 and 320 of the cradle 4, the power input terminal 23a and the power output terminal 23b of the connector 23.

Figure 38:
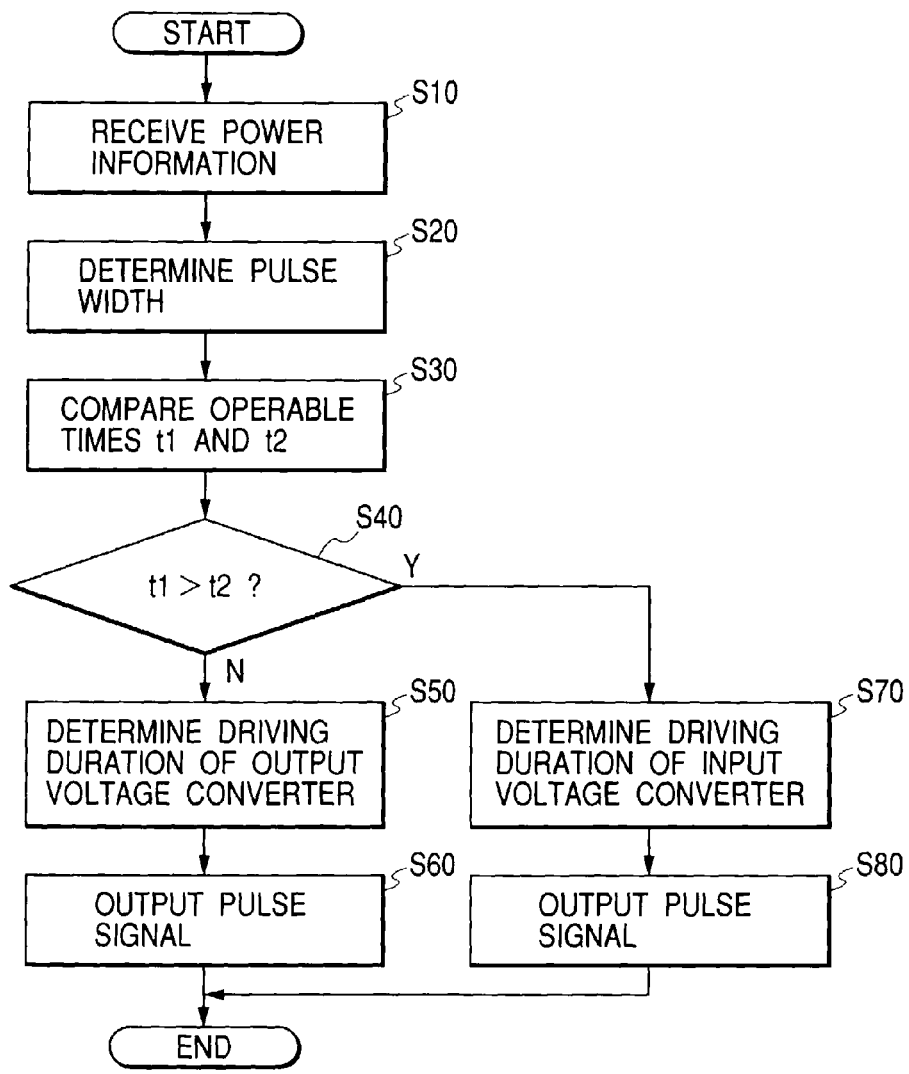
FIG. 38 is a flowchart of a program executed to establish transmission of electrical power between a barcode reader and a PDA in the fourteenth embodiment.

FIG. 38 is a flowchart of a program executed by the controller 14 (i.e., the CPU 14a) of the barcode reader 2 for establishing transmission of electrical power between the barcode reader 2 and the PDA 3.

After entering the program, the routine proceeds to step 10 wherein the power information is received from the PDA 3 which contains, as described above, data on the available reserve power E of the battery 28 and the operating voltage of the PDA 3. The reception of the power information is, as described above, achieved at a given interval.

The routine proceeds to step 20 wherein the width of a pulse signal use to drive the voltage converter 340 (the output voltage converting circuit 350 and the input voltage converting circuit 360) under PWM control is determined as a function of the operating voltage read out of the power information.

The routine proceeds to step 30 wherein the operable time t1 of the PDA 3 is determined as a function of the available reserve power E of the battery 28 as derived from the power information and compared with the operable time t2 of the barcode reader 2.

The routine proceeds to step 40 wherein it is determined whether the operable time t1 is greater than the operable time t2 or not. If a NO answer is obtained meaning that the operable time t1 of the PDA 3 is shorter than the operable time t2 of the barcode reader 2, then the routine proceeds to step 50 wherein the amount of electrical power to be fed to the PDA 3 is determined as a function of a difference between the operable times t1 and t2 to calculate a period of time for which the output voltage converting circuit 350 is to be driven (i.e., the length of time the operating power is to be fed to the PDA 3).

The routine proceeds to step 60 wherein the pulse signal, as determined in step 20, is outputted to the output voltage converting circuit 350 for the period of time as determined in step 50.

If a YES answer is obtained in step 40 meaning that the operable time t1 of the PDA 3 is longer than the operable time t2 of the barcode reader 2, then the routine proceeds to step 70 wherein the amount of electrical power to be fed to the barcode reader 2 from the PDA 3 is determined as a function of a difference between the operable times t1 and t2 to calculate a period of time for which the input voltage converting circuit 360 is to be driven (i.e., the length of time the operating power is to be fed to the barcode reader 2).

The routine proceeds to step 80 wherein the pulse signal, as determined in step 20, is outputted to the input voltage converting circuit 360 for the period of time as determined in step 70.

Accordingly, in use of the handy terminal made up of the barcode reader 2 joined to the PDA 3, when one of the battery 18 of the barcode reader 2 and the battery 28 of the PDA 3 lacks in available reserve power, the optical information reading apparatus 1 of this embodiment works to supply the electrical power from the other battery to increase the operation time for which the handy terminal can be used and ensure the stability of operation of the barcode reader 2 and the PDA 3 even if they are different in operating voltage.

Although not discussed in the flowchart in detail, the optical information reading apparatus 1 also works to determine the time interval at which the power information request signal is outputted from the barcode reader 2 to the PDA 3 as a function of the available reserve power of the battery 28 of the PDA 3. This establishes finer control of the supply of the electrical power when the available reserve power of the battery 28 of the PDA 3 becomes lower, thus increasing the total operating time of the optical information reading apparatus 1.

The optical information reading apparatus 1, as shown in FIG. 37, may be joined to an external power supply or the external information terminal 16. Further, it is possible to separate the optical information reading apparatus 1 into the barcode reader 2 and the PDA 3 easily. The barcode reader 2 itself, as shown in FIG. 23, can be used to read the barcode B. In this case, the barcode reader 2 may be connected electrically to the external information terminal 16. The PDA 3 may be employed alone or while being mounted on the cradle 4. In the latter case, the user may pivot the retainer of the cradle 4 to form the support which bears, as shown in FIG. 24, the PDA 3 on the table at the preselected tilt angle which provides the ease of visibility of the display 21 to the user. The PDA 3 may be connected to an external power supply through the AC adaptor 42 joined to the cradle 4 to provide electrical power to the PDA 3 or charge the battery 28.

Figure 39:
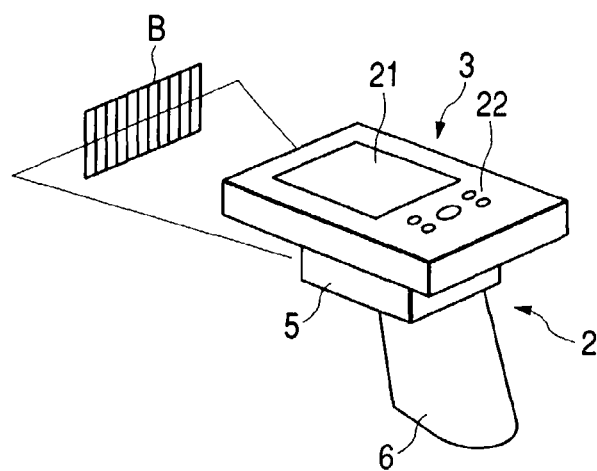
FIG. 39 is a perspective which shows a modification of the fourteenth embodiment of the invention.
Figure 40:
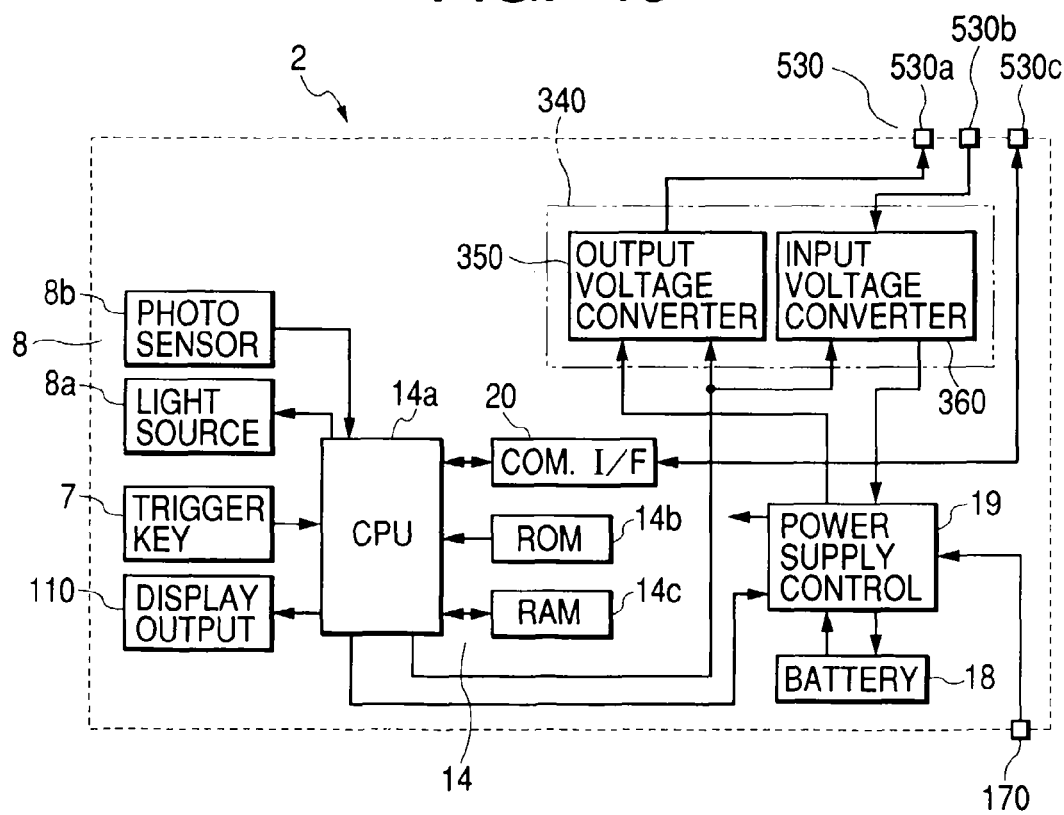
FIG. 40 is a block diagram which shows an electrical structure of a barcode reader of the modification, as illustrated in FIG. 39.

FIGS. 39 and 40 show a modification of the optical information reading apparatus 1 of the fourteenth embodiment which is different therefrom in that the barcode reader 2 is, as clearly illustrated in FIG. 39, joined directly to the PDA 3 without use of the cradle 4.

Specifically, the barcode reader 2 has installed therein the voltage converter 340 which is disposed within the cradle 4 in the fourteenth embodiment.

The barcode reader 2 is designed to have a joint structure (not shown) on the upper surface of the base body 5 which establishes a direction joint between the barcode reader 2 and the PDA 3. The joint structure may be made up of joint rails identical with the joint rails 12, as illustrated in FIGS. 4 and 5, formed on the base body 5 and joint rails identical with the joint rails 13 formed on the PDA 3 or implemented by the one shown in FIGS. 13(a) and 13(b).

The barcode reader 2 also has disposed therein the connector 530 which establishes an electrical connection to the connector 23 of the PDA 3 when they are jointed together. The connector 530, as can be seen in FIG. 40, made up of the power output terminal 530a, the power input terminal 530b, and the signal terminal 530c. When the connectors 530 and the 23 are joined, the power output terminal 530a leads to the power input terminal 23b of the PDA 3, the power input terminal 530b leads to the power output terminal 23b of the PDA 3, and the signal terminal 530c leads to the signal terminal 23c of the PDA 3, thereby enabling the transmission of electrical power and data signals between the barcode reader 2 and the PDA 3.

The barcode reader 2, as clearly shown in FIG. 40, has installed therein the voltage converter 340 which is controlled by the controller 14a and consists of the output voltage converting circuit 350 and the input voltage converting circuit 360. The output voltage converting circuit 350 works to convert the electrical power to be outputted from the power output terminal 530a into a predetermined voltage. Similarly, the input voltage converting circuit 360 works to convert the electrical power inputted to the power input terminal 530b into the voltage of interest to the barcode reader 2.

Other arrangements are identical, and explanation thereof in detail will be omitted here.

The voltage converter 340 may be built detachably within the barcode reader 2, thereby permitting the barcode reader to have a compact structure when the barcode reader 2 is used alone.

The output voltage converting circuit 350 may alternatively be installed in the PDA 3.

The barcode reader 2 may be designed to scan a two-dimensional bar coder, as illustrated in FIG. 19.

Figure 41:
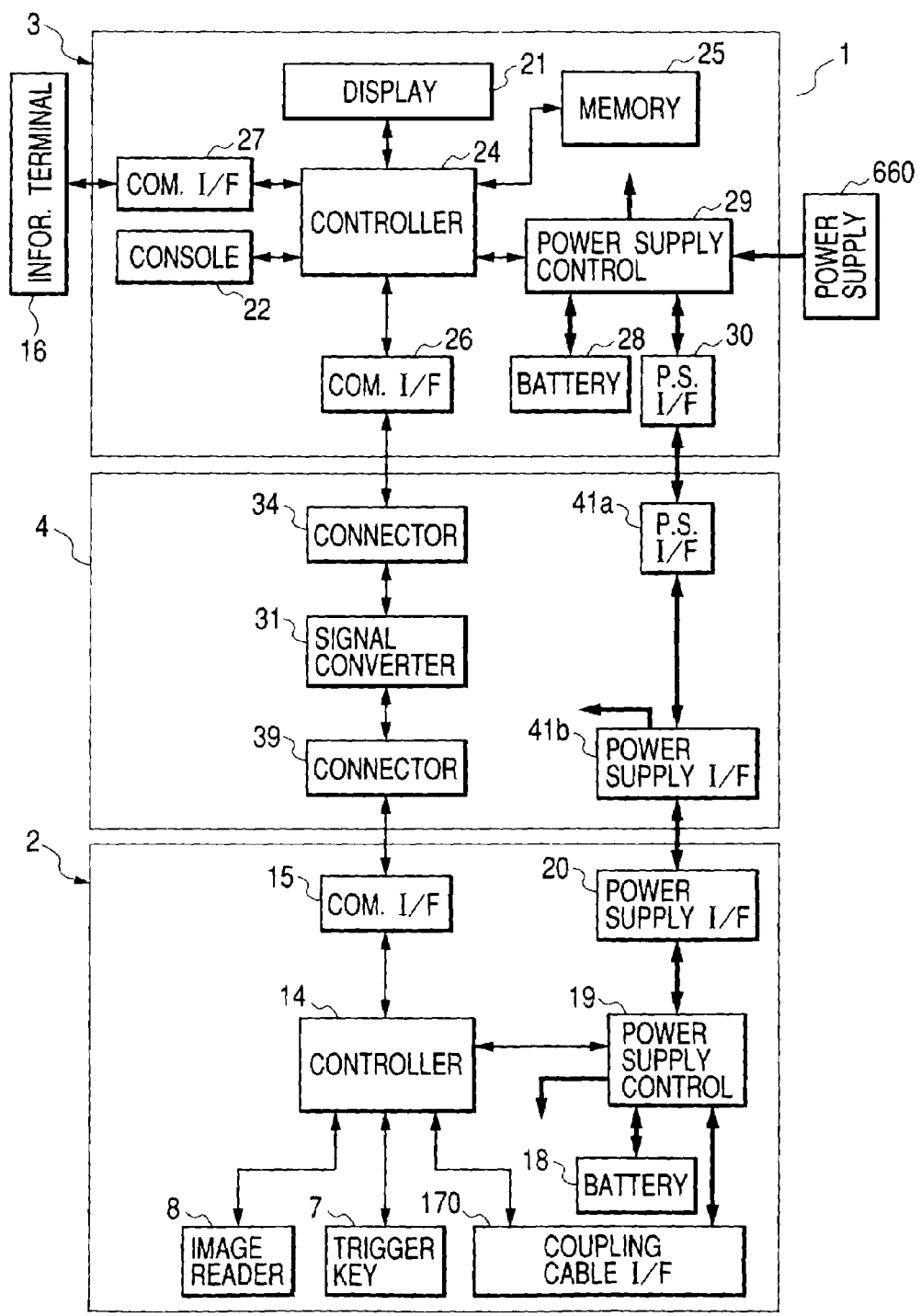
FIG. 41 is a block diagram which shows an electrical structure of an optical information reading apparatus according to the fifteenth embodiment of the invention.

FIG. 41 shows an electrical structure of the optical information reading apparatus 1 according to the fifteenth embodiment of the invention which is identical in mechanical structure with the seventh embodiment, as illustrated in FIGS. 21(a) and 21(b). The same reference numbers as employed in the above embodiments will refer to the same parts, and explanation thereof in detail will be omitted here.

FIG. 41 does not illustrate the voltage converter 340 which is used in the seventh embodiment, but may have it installed in the cradle 4.

The PDA 3 may be joined to an external power supply 660 to derive electrical power used to drive each component thereof. The storage battery 28 may be charged using the external power supply 660.

The PDA 3 also includes the power supply I/F 30 for transmission of electrical power between the barcode reader 2 and the PDA 3. The power supply I/F 30 is, like the connector 13, designed to receive the electrical power through the connector 23. The connector 23 is used for transmission of the electric power and data. The PDA 3 works to process, store, and display input data and output processed data.

The cradle 4 is substantially identical in a joint structure establishing a joint to the barcode reader 2 and a holder structure holding the PDA 3 within the cradle 4 with the one as described in the above embodiments.

Specifically, the cradle 4, as clearly shown in FIGS. 21(a) and 21(b), includes the pocket 32 formed on a base portion (i.e., a right portion in the drawings) of the mount plate 31 on which the PDA 3 is disposed. The pocket 32 is so sized as to receive the PDA 3 partially in contact with the back surface, the side surfaces, and the bottom surface of a power portion of the PDA 3 and provide the visibility of the display 21 and the console 22 to the user. The cradle 4 also has a retainer (not shown) which may be identical in structure with the retainer 33, as described in the first embodiment, for holding the PDA 3 tightly on the mount plate 31. The mount plate 31 is made of a flat plate which has a size enough to bear the lower portion of the PDA 3.

The retainer is, as in the first embodiment, made of a frame contoured to conform with the periphery of the upper portion of the PDA 3. The retainer is povitably supported by the mount plate 31 so that it is movable between two positions: a locked position and an unlocked position. When the retainer is pivoted downward, that is, it moves from the locked position to the unlocked position, the PDA 3 is permitted to be inserted into the pocket 32. When the PDA 3 is already fitted within the pocket 32, the retainer is released from the PDA 3 to permit the PDA 3 to be withdrawn from the pocket 32. In the locked position, the retainer engages the corners of the PDA 3 to lock it within the pocket 32.

When the retainer is in a fully pivoted position (i.e., the unlocked position), it serves, like the first embodiment, as a support which stands the cradle and the PDA 3 on a table at a tilt angle. The pocket 32, as shown in FIG. 21(a), has installed on the bottom wall thereof the first connector 34 which makes a joint to the connector 23 of the PDA 3 when the lower portion of the PDA 3 is fitted in the pocket 32 completely.

The cradle 4, as clearly shown in FIG. 21(a), has installed on the back surface of the mount plate 31 the connector 39 which is to be joined electrically to the connector 13 of the barcode reader 2. The cradle 4 also has the joint structure, as described in the above embodiments, which establishes a joint to the barcode reader 2 detachably. The joint or removal of the cradle 4 (i.e., the PDA 3) to or from the barcode reader 2 is accomplished by sliding the cradle 4 and the barcode reader 2 relative to each other to release the joint therebetween. Upon completion of the joint, the second connector 39 of the cradle 4 is coupled to the connector 13 of the barcode reader 2.

The cradle 4, as clearly shown in FIG. 41, has the first connector 34 and the second connector 39 and a signal line connecting them for establishing communication between the barcode reader 2 and the PDA 3 when jointed together. The cradle 4 also has a signal converter 31 installed between the connectors 34 and 38 which enables the communication between the barcode reader 2 and the PDA 3 if they are different in communication protocol.

The cradle 4, as shown in FIG. 41, has disposed therein the power supply I/F 41b for electrical connection with the power supply I/F 20 of the barcode reader 2 and the power supply I/F 41a for electrical connection with the power supply I/F 30 of the PDA 3.

The cradle 4 may receive the electric power used to drive circuit components installed in the cradle 4 from one of the barcode reader 2 and the PDA 3 through the power supply I/F 41b or 41a and also supply it to the other. Although not illustrated in FIG. 41 in detail, the power supply from the barcode reader 2 to the cradle 4 is achieved using the connectors 13 and 39. The power supply from the cradle 4 to the PDA 3 is achieved through the connectors 34 and 23.

The PDA 3 is designed to operate in two selectable modes: an interlocking mode in which the PDA 2 is allowed to receive the barcode data from the barcode reader 3 and process it and an uninterlocking mode in which the reception of the barcode data from the barcode reader 2 is infeasible. The uninterlocking mode is usually selected when the PDA 3 is employed alone or in an off-state. A switch between the interlocking and unlocking modes may be made manually through the console 22.

Similarly, the barcode reader 2 is designed to operate in two selectable modes: an active mode (also called a read enable mode below) which permits the barcode reader 2 to read the barcode B optically and a standby mode in which the barcode reader 2 enters a power-saving mode without reading the barcode B. In the standby mode, only the controller 14 is supplied with the electrical power and monitors depression of the trigger key 7 at all times. A switch between the active mode and the standby mode may be made by the trigger key 7 or automatically as a function of the operating mode of the PDA 3 joined to the barcode reader 2.

The controller 14 of the barcode reader 2, as described later in detail, works to perform a software function to monitor the operating mode of the PDA 3 when jointed to the barcode reader 2 and determine or limit its own operating mode as a function of the operating mode of the PDA 3.

A determination of the operating mode of the PDA 3 in the barcode reader 2 is made by receiving a mode signal outputted from the PDA 3 through the above described data transmission system. Specifically, when a given mode switching operation starts to be performed in the barcode reader 2, that is, when the trigger key 7 is actuated in the standby mode, the barcode reader 2 outputs a mode request signal to the PDA 3. The controller 24 of the PDA 3 is responsive to the mode request signal to output an answer signal indicating its own mode. When the answer signal indicative of the interlocking mode is received from the PDA 3, the barcode reader 2 determines that the PDA 3 is now placed in the interlocking mode. Alternatively, when the answer signal indicating the uninterlocking mode is received or any answer signal is not received, the barcode reader 2 determines that the PDA 3 is now placed in the uninterlocking mode. In this condition, the controller 14 of the barcode reader 2 is in the active mode and inhibits the PDA 3 from entering the uninterlocking mode. Additionally, when the trigger key 7 is actuated in the standby mode, the controller 14 switches the operating mode thereof to the active mode and determines, as described above, the operating mode of the PDA 3. When the PDA 3 is in the interlocking mode, the controller 14 of the barcode reader 2 maintains the active mode as it is. Alternatively, when the barcode reader 2 does not receive the answer signal from the PDA 3, that is, when the power of the PDA 3 is turned off, the controller 14 returns the operating mode thereof to the standby mode.

When the PDA 3 receives the mode request signal outputted from the barcode reader 2 in the uninterlocking mode, the controller 24 of the PDA 3 performs a software function to switch the operating mode thereof to the interlocking mode and output the answer signal indicating that the PDA 3 is in the interlocking mode to the barcode reader 2.

The barcode reader 2 is also designed to detect the joint between the barcode reader 2 and the PDA 3 in the manner as described in the above embodiments. Specifically, when turned on, the controller 14 outputs the test signal a, as indicated in FIG. 25, from the communication I/F 15 to the PDA 3 through the cradle 4. Upon input of the test signal a through the communication I/F 26, the controller 24 of the PDA 3 outputs the answer signal b from the communication I/F 26 to the barcode reader 2. When the answer signal b is inputted to the barcode reader 2 within the given period of time T from the output of the test signal a, the controller 14 of the barcode reader 2 concludes that the PDA 3 is now joined to the barcode reader 2 through the cradle 4.

The optical information reading apparatus 1 is, like the above embodiments, assembled by mounting the PDA 3 on the cradle 4 and attaching the cradle 4 to the barcode reader 2. The mounting of the PDA 3 on the cradle 4, as already described, is accomplished by putting the lower portion of the PDA 3 in the pocket 32 of the cradle 4 and turning the retainer of the cradle 4 to the locked position without use of any additional parts. The attachment of the cradle 4 to the barcode reader 2 is accomplished only by sliding the cradle 4 on the base body 5 of the barcode reader 2 to bring the joint rails of the cradle 4 into engagement with the joint rails of the barcode reader 2. Additionally, the electrical connection between the first connector 34 and the connector 23 is automatically established by putting the PDA 3 in the pocket 32 of the cradle 4. The electrical connection between the second connector 39 and the connector 13 is also established automatically by installing the cradle 4 on the barcode reader 2. Specifically, the electrical connections are achieved simultaneously with the physical connections of the PDA 3 with the cradle 4 and the cradle 4 with the barcode reader 2.

The optical information reading apparatus 1 is, as described above, provided by an assembly of the PDA 3 and the barcode reader 2 which are joined physically by the cradle 4 and electrically by a transmission system made up of the communication I/F 15, the connector 13, the second connector 39, the first connector 34, the connector 23, and the communication I/F 26 and works as a barcode handy terminal. In operation, the optical information reading apparatus 1, as shown in FIG. 21(*b*), works to read the barcode B optically through the barcode reader 2 and transmit it to the PDA 3 for data storage or processing. A scan of the barcode B located away is achieved only by grasping the grip 6 of the barcode reader 2 by a hand of the user and sweeping the barcode reader 2.

The barcode reader 2 and the PDA 3 of the optical information reading apparatus 1 are basically powered by the batteries 18 and 28 installed therein, respectively. In a case where the barcode reader 2 and the PDA 3 are combined and used as a handy terminal, if one of the batteries 18 and 28 of the barcode reader 2 and the PDA 3 lacks in available power, the other of the batteries 18 and 28 is used as a common power supply. The barcode reader 2 may be joined to an external power supply through the coupling cable I/F 170. Additionally, the PDA 3 may be joined to the external power supply 660 to drive all the barcode reader 2, the cradle 4, and the PDA 3 or charge the batteries 18 and 26 as needed.

It is possible to separate the optical information reading apparatus 1 into the barcode reader 2 and the PDA 3 easily. The barcode reader 2 itself, as shown in FIG. 23, can be used to read the barcode B. In this case, the barcode reader 2 may be connected electrically to the external information terminal 16. When the controller 14 of the barcode reader 2 concludes that the barcode reader 2 is not joined to the PDA 3, the barcode reader 2 transmits the barcode data to the external information terminal 16 through the coupling cable I/F 170 for processing it. A scan of the barcode B may be achieved easily by grasping the grip 6 of the barcode reader 2 and sweeping the barcode reader 2.

The PDA 3 may be employed alone or while being mounted on the cradle 4. In the latter case, the user may pivot the retainer of the cradle 4 to form the support which bears, as shown in FIG. 24, the PDA 3 on the table at the preselected tilt angle which provides the ease of visibility of the display 21 to the user.

In a case where the barcode reader 2 is joined to the PDA 3 and used as the optical information reading apparatus 1, a mismatch between the operating modes of the barcode reader 2 and the PDA 3 may result in a failure in operation of the optical information reading apparatus 1 as a whole or undesirable loss of electrical power. For instance, when the PDA 3 is employed alone or turned off (i.e., the uninterlocking mode), it is impossible for the PDA 3 to receive the barcode data outputted from the barcode reader 2. Additionally, when the PDA 3 is in the uninterlocking mode, but the barcode reader 2 is placed in the active mode, it results in an unwanted increase in power consumption of the barcode reader 2.

In order to avoid the above problem, the barcode reader 2 and the PDA 3 work to select the operating modes thereof as illustrated in FIGS. 42(a), 42(b), and 42(c). In FIG. 42(a), "○" indicates a combination of the operating modes in which the barcode reader 2 and the PDA 3 may be placed simultaneously. "×" indicates a combination of the operating modes in which the barcode reader 2 and the PDA 3 cannot be placed simultaneously. Specifically, when the PDA 3 is in the uninterlocking mode, the barcode reader 2 is not placed in the active mode.

FIG. 42(b) shows switching of the operating mode of the barcode reader 2 for each operating mode of the PDA 3 when the trigger key 7 of the barcode reader 2 is turned on. When the PDA 3 is in the interlocking mode, and the barcode reader 2 is in the active mode (i.e., the read enable mode), the barcode reader 2 keeps the active mode regardless of turning on of the trigger key 7. Upon turning on of the trigger key 7 when the barcode reader 2 is in the standby mode, the barcode reader 2 is switched in the operating mode to the active mode (i.e., the read enable mode). When the PDA 3 is in the uninterlocking mode, the barcode reader 2 is never placed in the active mode. Upon turning on of the trigger key 7 when the barcode reader 2 is in the standby mode, the operation of the barcode reader 2 is switched between two modes according to conditions, as indicated in FIG. 42(c).

FIG. 42(c) shows the operation of the barcode reader 2 selected in response to turning on of the trigger key 7 when the PDA 3 is in the uninterlocking mode. Specifically, when the PDA 3 has received the mode request signal from the barcode reader 2, and the barcode reader 2 has received the answer signal from the PDA 3, the PDA 3 is placed in the interlocking mode and allowed to acquire the barcode data. Simultaneously, the barcode reader 2 is switched to the active mode (i.e., the read enable mode). Alternatively, if the PDA 3 fails to receive the mode request signal from the barcode reader 2 because the PDA 3 is turned off, for example, the barcode reader 2 is kept in the standby mode.

Figure 43:
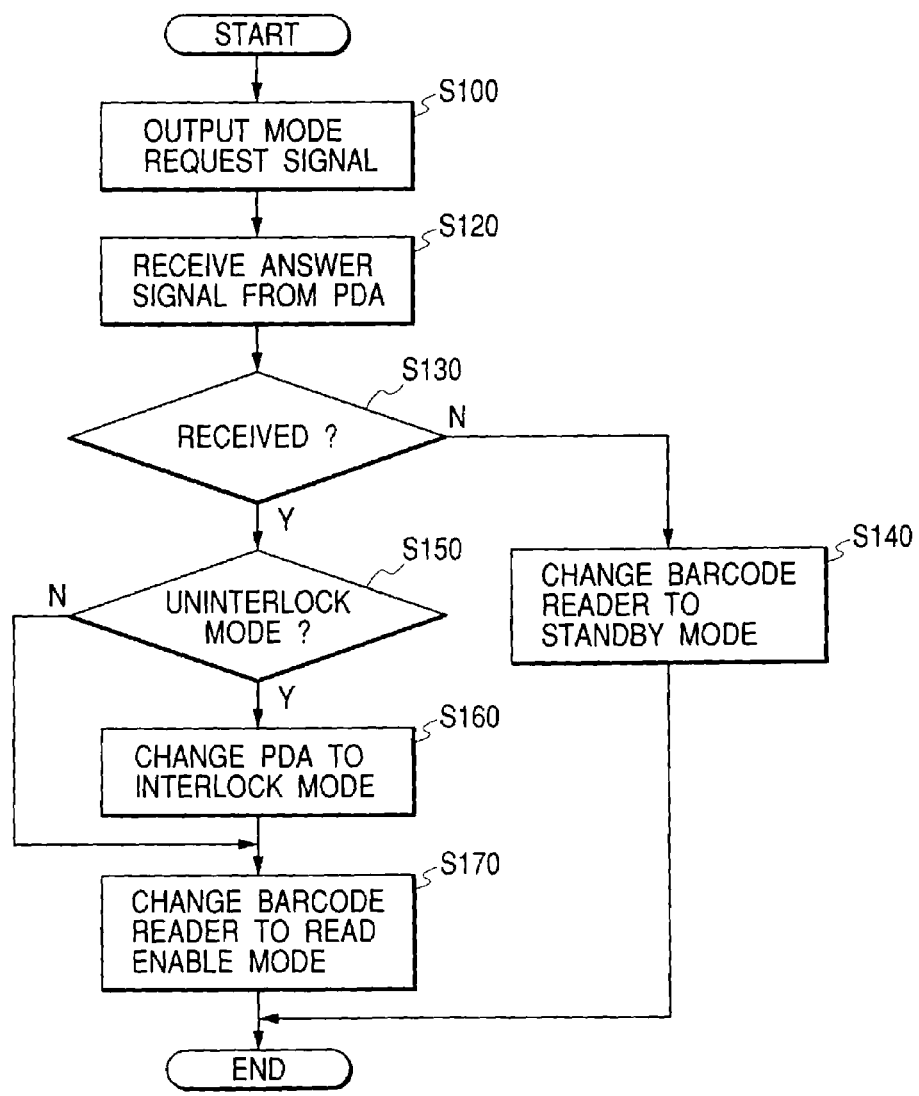
FIG. 43 is a flowchart of a program executed to select operating modes of a barcode reader and a PDA of the optical information reading apparatus of FIG. 41.

FIG. 43 shows a flowchart of a program executed by the controller 14 of the barcode reader 2 (including an operation of the controller 24 of the PDA 3) upon turning on of the trigger key 7 when the barcode reader 2 is in the standby mode.

After entering the program, the routine proceeds to step 100 wherein the barcode reader 2 outputs the mode request signal to the PDA 3 upon turning on of the trigger key 7.

The routine proceeds to step 120 wherein the barcode reader 2 tries to receive the answer signal from the PDA 3.

The routine proceeds to step 130 wherein it is determined whether the barcode reader 2 has been successful in receiving the answer signal from the PDA 3 or not. If a NO answer is obtained meaning that the barcode reader 2 has failed to receive the answer signal, the routine proceeds to step 140 wherein the barcode reader 2 is placed in the standby mode. The routine then terminates. Alternatively, if a YES answer is obtained in step 130, then the routine proceeds to step 150 wherein the answer signal is analyzed to determine whether the PDA 3 is now in the uninterlocking mode or not. If a YES answer is obtained meaning that the PDA 3 is in the uninterlocking mode, then the routine proceeds to step 160 wherein the operation of the PDA 3 is switched to the interlocking mode. The routine proceeds to step 170 wherein the operation of the barcode reader 2 is switched to the active mode (i.e., the read enable mode). The routine then terminates.

If a NO answer is obtained in step 150 meaning that the PDA 3 is now in the interlocking mode, then the routine proceeds directly to step 170.

As apparent from the above discussion, when the PDA 3 is in the uninterlocking mode, the barcode reader 2 is kept in the standby mode, thus avoiding undesirable operations of the barcode reader 2 and the PDA 3 due to a mismatch therebetween. This also minimizes an undesirable loss of power consumption in the optical information reading apparatus 1.

The barcode reader 2 may be replaced with the handheld two-dimensional code reader 81, as illustrated in FIG. 19.

The PDA 3 may be selected from a variety of commercially available PDAs and combined with the barcode reader 2 to construct the optical information reading apparatus of a type of interest to the user.

The determination of the operating mode of the PDA 3 may alternatively be made using a separate sensor. The optical information reading apparatus 1 may have switch keys for switching the operating modes of the barcode reader 2 and the PDA 3.

The image reading device 8 of the barcode reader 2 may be implemented by a laser scanner. Instead of the PDA 3, any compact portable information processing device may be used which is capable of entry, output, and processing of data. The cradle 4 may be made only of a box or a frame and have installed therein a console such as a data entry keypad. The barcode reader 2 may be Joined directly to the PDA 3, as illustrated in FIG. 39, without use of the cradle 4.

While the present invention has been disclosed in terms of the preferred embodiments in order to facilitate better understanding thereof, it should be appreciated that the invention can be embodied in various ways without departing from the principle of the invention Therefore, the invention should be understood to include all possible embodiments and modifications to the shown embodiments witch can be embodied without departing from the principle of the invention as set forth in the appended claims.

What is claimed is:

1. An optical information reading apparatus comprising:
a handheld optical information reading unit working to read optical information and output data on the optical information;
a portable information terminal designed to receive and process information to output the information; and
an attachment establishing a joint between said optical information reading unit and said portable information terminal,
wherein said optical information reading unit includes a joint detector working to detect the joint between said optical information reading unit and said portable information terminal and a communication system establishing communication with said portable information terminal, said optical information reading unit working to transmit the data on the optical information to said portable information terminal through said communication system when the joint detector has detected the joint between said optical information reading unit and said portable information terminal, and said joint detector includes a joint sensor which senses the joint between said optical information reading unit and said portable information terminal and outputs a joint signal indicative thereof, and wherein said optical information reading unit determines that said optical information reading unit is joined to said portable information terminal when the joint sensor outputs the joint signal.

2. An optical information reading apparatus as set forth in claim 1 wherein said communication system transmits the data on the optical information to said portable information terminal trough wire communication, each of said optical information reading unit and said portable information terminal is equipped with a wire communication connector, and said attachment includes a first connector joined to the connector of said portable information terminal, a second connector joined to the connector of said optical information reading unit, and a signal line connecting between the first and second connectors.

3. An optical information reading apparatus as set forth in claim 2, wherein said attachment includes a signal converter which works to convert a signal inputted to the first connector into a signal to be outputted from the second connector and also convert a signal inputted to the second connector into a signal to be outputted from the first connector.

4. An optical information reading apparatus as set forth in claim 1, wherein said joint sensor is implemented by a contactless sensor using one of light and magnetism which outputs the joint signal when said portable information terminal has a preselected positional relation to said optical information reading unit. information reading unit is joined to said portable information terminal when at least one of signal terminals of said communication system shows a predetermined electrical characteristic.

5. An optical information reading apparatus as set forth in claim 1, wherein said attachment has a data entry portion equipped with numeral keys which transmit input numeral data to said portable information terminal.

6. An optical information reading apparatus as set forth in claim 1, wherein said portable information terminal has a radio communication system which establishes radio communication with an external information processing device, and wherein said portable information terminal is designed to transmit the data on the optical information received through the communication system from said optical information reading unit to the external information processing device through the radio communication system.

7. An optical information reading apparatus as set forth in claim 1, wherein said portable information terminal has a communication system, and wherein said attachment is designed to mount said portable information terminal on said optical information reading unit, said attachment has a first attachment surface to which said portable information terminal is joined detachably and a second attachment surface to be joined to said optical information reading unit, and further comprising an electrical connection member which establishes an electrical connection between the communication systems of said portable information terminal and said optical information reading unit.

8. An optical information reading apparatus as set fort in claim 7, wherein said attachment has formed on the first attachment surface a pocket into which at least a lower portion of said portable information terminal is inserted so that the lower portion is held at front, back, side, and lower surfaces thereof within the pocket.

9. An optical information reading apparatus as set forth in claim 7, wherein said attachment includes a retainer which retains and holds said portable information terminal from moving in a longitudinal direction of said portable information terminal from a lower to an upper portion of said portable information terminal.

10. An optical information reading apparatus as set forth in claim 9, wherein said retainer has a stopper which holds said portable information terminal from moving in a direction parallel to the first attachment surface.

11. An optical information reading apparatus as set forth in claim 9, wherein said retainer has a claw which holds said portable information terminal from moving in a direction perpendicular to the first attachment surface.

12. An optical information reading apparatus as set forth in claim 9, wherein said retainer is designed to be movable between a locked position where the upper portion of said portable information terminal is locked to retain said portable information terminal on said attachment and an unlocked position which permits said portable information terminal to be removed from said attachment.

13. An optical information reading apparatus as set forth in claim 9, wherein said retainer is designed to be pivotable to an angular position where said retainer makes an acute angle with the second attachment surface of said attachment, said retainer serving as a support in the angular position which works to keep said attachment at a tilt angle on a plane.

14. An optical information reading apparatus as set forth in claim 7, wherein said first and second attachment surfaces are opposed to each other and extend substantially parallel to each other.

15. An optical information reading apparatus as set forth in claim 7, wherein each of the communication systems of said portable information terminal and said optical information reading unit has a wire communication connector, and wherein said electrical connection member is implemented by a cable connecting the wire communication connectors of said portable information terminal end said optical information reading unit.

16. An optical information reading apparatus as set forth in claim 15, wherein said cable is installed in said attachment.

17. An optical information reading apparatus as set forth in claim 7, wherein said attachment has a joint mechanism provided on the second attachment surface, and said optical information reading unit has a joint mechanism which establishes a mechanical joint to the joint mechanism of said attachment through sliding motion of said attachment relative to said optical information reading unit.

18. An optical information reading apparatus as set forth in claim 17, wherein the joint mechanism of said optical information reading unit has a pat along which the joint mechanism of said portable information terminal slides in engagement with the joint mechanism of said optical information reading unit, the joint mechanism of said optical information reading unit having at one end of the path a stopper defining a limit of the sliding motion of said attachment and at the other end of the pat an elastically deformable release deterrent working to deter said joint mechanism of said attachment from moving out of the engagement with the joint mechanism of said optical information reading unit.

19. An optical information reading apparatus as set forth in claim 17, wherein the joint mechanism of said optical information reading unit extends in parallel to an optical axis of an optically reading system of said optical information reading unit.

20. An optical information reading apparatus as set fort in claim 17, wherein the joint mechanism of said optical information reading unit includes a joint groove formed in an outer surface of said optical information reading unit.

21. An optical information reading apparatus as set forth in claim 17, wherein the joint mechanism of said optical information reading unit is designed to have a structure common to a plurality of attachments holding portable information terminals different in external shape from each other.

22. An optical information reading apparatus as set forth in claim 7, wherein said attachment is designed to bear said portable information terminal on a plane through a side of said attachment and a grip installed on said optical information reading unit so as to orient a front surface of said portable information terminal upward at a tilt angle to the plane.

23. An optical information reading apparatus comprising:
a handheld optical information reading unit working to read optical information and output data on the optical information;
a portable information terminal designed to receive and process information to output the information; and
an attachment establishing a joint between said optical information reading unit and said portable information terminal,
wherein said optical information reading unit includes a joint detector working to detect the joint between said optical information reading unit and said portable information terminal and a communication system establishing communication with said portable information terminal, said optical information reading unit working to transmit the data on the optical information to said portable information terminal through said communication system when the joint detector has detected the joint between said optical information reading unit and said portable information terminal;
wherein said optical information reading unit has a wire communication system for establishing communication with an external information processing device, the wire communication system being designed to achieve transmission of data between said portable information terminal and the external information processing device.

24. An optical information reading apparatus as set forth in claim 23, wherein said joint detector is designed to determine that said optical information reading unit is joined to said portable information terminal when said joint detector has outputted a lest signal to said portable information terminal through the communication system and received a given answer signal from said portable information terminal.

25. An optical information reading apparatus as set forth in claim 23, wherein said optical information reading unit is designed to determine that said optical information reading unit is joined to said portable information terminal when said joint detector has received a given test signal from said portable information terminal through the communication system.

26. An optical information reading apparatus as set forth in claim 23, wherein said optical information reading unit is designed to determine that said optical.

27. An optical information reading apparatus as set forth in claim 26, wherein the predetermined electrical characteristic of the signal terminal of said communication system is one of a voltage and an impedance.

28. An optical information reading apparatus as set forth in claim 23, wherein when said joint detector does not detect the joint between said optical information reading unit and said portable information terminal, said optical information reading unit transmits the data on the optical information to said external information processing device through the wire communication system.

29. An optical information reading apparatus as set fort in claim 23, further comprising a selecting circuit which switches between a normal mode in which the data on the optical information is transmitted to said external information processing device through the wire communication system and a bus use mode in which said portable information terminal uses said wire communication system.

30. An optical information reading apparatus as set forth in claim 29, wherein when said selecting circuit receives an information transmission request from said portable information terminal, said selecting circuit establishes the bus use mode.

31. An optical information reading apparatus as set forth in claim 29, wherein said selecting circuit monitors use of the wire communication system in the bus use mode and determines that said portable information terminal has completed use of the wire communication system when no transmission is established by the wire communication system for a given period of time.

32. An optical information reading apparatus as set forth in claim 23, wherein said attachment has a data entry portion equipped with numeral keys which transmit input numeral data to said portable information terminal.

33. An optical information reading apparatus as set forth in claim 23, wherein said portable information terminal has a radio communication system which establishes radio communication with an external information processing device, and wherein said portable information terminal is designed to transmit the data on to optical information received through the communication system from said optical information rending unit to the external information processing device through the radio communication system.

34. An optical information reading apparatus as set forth in claim 23, wherein said portable information terminal has a communication system, and wherein said attachment is designed to mount said portable information terminal on said optical information reading unit, said attachment has a first attachment surface to which said portable information terminal is joined detachably and a second attachment surface to be joined to said optical information reading unit, and further comprising an electrical connection member which establishes an electrical connection between the communication systems of said portable information terminal and said optical information reading unit.

35. An optical information reading apparatus as set forth in claim 34, wherein said attachment has formed on the first attachment surface a pocket into which at least a lower portion of said portable information terminal is inserted so that the lower portion is held at front, back, side, and lower surfaces thereof within the pocket.

36. An optical information reading apparatus as set forth in claim 34, wherein said attachment includes a retainer which retains and holds said portable information terminal from moving in a longitudinal direction of said portable information terminal from a lower to art upper portion of said portable information terminal.

37. An optical information reading apparatus as set forth in claim 36, wherein said retainer has a stopper which holds said portable information terminal from moving in a direction parallel to the first attachment surface.

38. An optical information reading apparatus as set forth in claim 36, wherein said retainer has a claw which holds said portable information terminal from moving in a direction perpendicular to the first attachment surface.

39. An optical information reading apparatus as set forth in claim 36, wherein said retainer is designed to be movable between a locked position where the upper portion of said portable information terminal is locked to retain said portable information terminal on said attachment and an unlocked position which permits said portable information terminal to be removed from said attachment.

40. An optical information reading apparatus as set forth in claim 36, wherein said retainer is designed to be pivotable to an angular position where said retainer makes an acute angle with the second attachment surface of said attachment, said retainer serving as a support in the angular position which works to keep said attachment at a tilt angle on a plane.

41. An optical information reading apparatus as set forth in claim 34, wherein said first and second attachment surfaces are opposed to each other and extend substantially parallel to each other.

42. An optical information reading apparatus as set forth in claim 34, wherein each of the communication systems of said portable information terminal and said optical information reading unit has a wire communication connector, and wherein said electrical connection member is implemented by a cable connecting the wire communication connectors of said portable information terminal and said optical information reading unit.

43. An optical information reading apparatus as set forth in claim 34, wherein said attachment has a joint mechanism provided on the second attachment surface, and said optical information reading unit has a joint mechanism which establishes a mechanical joint to the joint mechanism of said attachment through sliding motion of said attachment relative to said optical information reading unit.

44. An optical information reading apparatus comprising:
a handheld optical information reading unit working to read optical information and output data on the optical information;
a portable information terminal designed to receive and process information to output the information; and
an attachment establishing a joint between said optical information reading unit and said portable information terminal,
wherein said optical information reading unit includes a joint detector working to detect the joint between said optical information reading unit and said portable information terminal and a communication system establishing communication with said portable information terminal, said optical information reading unit working to transmit the data on the optical information to said portable information terminal through said communication system when the joint detector has detected the joint between said optical information reading unit and said portable information terminal; and
an intercommunication system which establish intercommunication between said portable information terminal and said optical information reading unit, and wherein said optical information reading unit is equipped with a power output terminal which is used to supply an operating electrical power to said portable information terminal through a power input terminal installed in said portable information terminal.

45. An optical information reading apparatus as set forth in claim 44, wherein said attachment has a first power supply terminal joined to the power input terminal of said portable information terminal, a second power supply terminal joined to the power output terminal of said optical information reading unit, and a power supply connecting line connecting the first and second power supply terminals.

46. An optical information reading apparatus as set forth in claim 45, wherein said attachment includes a voltage converter which works to convert a voltage of the operating electrical power inputted to said second power supply terminal into a voltage required to operate said portable information terminal correctly and output the converted voltage to said first power supply terminal.

47. An optical information reading apparatus as set forth in claim 46, wherein said voltage converter is made of a switching regulator which operates on the operating electrical power inputted to said second power supply terminal.

48. An optical information reading apparatus as set forth in claim 45, wherein said attachment is designed to establish communication with en external power supply and supply an operating electrical power provided by the external power supply to said portable information terminal through the first power supply terminal.

49. An optical information reading apparatus as set forth in claim 45, wherein said intercommunication system is implemented by a wire communication system, and wherein said attachment includes a first end a second connector for establishing communication between said optical information reading unit and said portable information terminal through the wire communication system, and wherein the first and second power supply terminals are provided by portions of terminals installed in the first and second connectors.

50. An optical information reading apparatus as set forth in claim 44, wherein when the joint detector detects the joint between said portable information terminal and said optical information reading unit, said optical information reading unit outputs the operating electrical power from the power output terminal.

51. An optical information reading apparatus as set forth in claim 44, wherein said optical information reading unit and said portable information terminal have installed therein batteries which work to provide electrical power to drive said optical information reading unit and said portable information terminal, respectively, and wherein said optical information reading unit compares an operable time of said optical information reading unit as estimated by an available reserve power remaining in the battery of said optical information reading unit with an operable time of said portable information terminal as estimated by an available reserve power remaining in the battery of said portable information terminal, when it is determined that the operable dine of said portable information terminal is shorter than that of said optical information reading unit said optical information reading unit outputting the operating electrical power from the power output terminal.

52. An optical information reading apparatus as set forth in claim 44, wherein said optical information reading unit has a feeder terminal for receiving an operating electrical power from an external power supply and works to output a portion of the operating electrical power from the power output terminal.

53. An optical information reading apparatus as set forth in claim 52, wherein said optical information reading unit has installed therein a battery working to provide an operating electrical power to said optical information reading wilt and includes a charging portion working to charge the battery with the operating electrical power supplied from the external power supply.

54. An optical information reading apparatus as set forth in claim 52, wherein said feeder terminal is provided by a terminal of a connector installed in a lower end of a grip of said optical information reading unit, and wherein said optical information reading unit receives the operating electrical power from the external power supply through a feeder line connected detachably to the connector.

55. An optical information reading apparatus as set forth in claim 54, wherein the connector includes a signal terminal used to establish wire communication with an external information processing device.

56. An optical information reading apparatus comprising:
a handheld optical information reading unit working to read optical information and output data on the optical information;
a portable information terminal designed to receive and process information to output the information, said portable information terminal being joined releasably to said optical information reading unit; and
a data transmission system establishing transmission of data between said optical information reading unit and said portable information terminal,
wherein said portable information terminal is designed to operate selectively in an interlocking mode which permits said portable information terminal to receive the data from said optical information reading unit and an uninterlocking mode in which reception of the data from said optical information reading unit is infeasible, and
wherein said optical information reading unit is designed to operate selectively in a read enable mode which enables said optical information reading unit to read the optical information and a standby mode in which electrical power to be consumed by said optical information reading unit is saved without reading the optical information, said optical information reading unit including a mode detecting circuit working to detect an operating mode of said portable information terminal in connection with said portable information terminal and a mode limiting circuit working to limit an operating mode thereof to one of the read enable mode and the standby mode as a function of the operating mode as detected by the mode detecting circuit,
wherein the mode detecting circuit receives a mode indicative signal from said portable information terminal trough said data transmission system to determine the operating mode of said portable information terminal.

57. An optical information reading apparatus as set forth in claim 56, wherein when the mode detecting circuit does not detect the interlocking mode of said portable information terminal, the mode limiting circuit prohibits said optical information reading unit from entering the read enable mode.

58. An optical information reading apparatus as set forth in claim 57, wherein said optical information reading unit switches the operating mode thereof from the standby mode to the read enable mode in response to a given made selecting operation, after which when the mode detecting circuit does not detect the interlocking mode of said portable information terminal, the mode limiting circuit returns the operating mode of said optical information reading unit to the standby mode.

59. An optical information reading apparatus as set forth in claim 56, wherein a switch from the standby made to the read enable mode in said optical information reading unit is accomplished in response to actuation of a data reading key.

60. An optical information reading apparatus as set forth in claim 56, wherein the mode detecting circuit outputs a mode request signal to said portable information terminal through said data transmission system and determines that said portable information terminal is in the interlocking mode when a given answer signal is received from said portable information terminal.

61. An optical information reading apparatus as set forth in claim 56, wherein said data transmission system includes a signal converter which works to convert a signal outputted from one of said optical information reading unit and maid portable information terminal into a signal in a form of communication matching a protocol of the other of said optical information reading unit and said portable information terminal.

62. An optical information reading apparatus as set forth in claim 61, further comprising an attachment which establishes a joint between said optical information reading unit and said portable information terminal, and wherein the signal converter is installed in said attachment.

63. An optical information reading apparatus as set forth in claim 56, wherein said portable information terminal is responsive to input of a mode request signal from said optical information reading unit to switch the operating mode thereof to the interlocking mode and output a given answer signal indicative the interlocking mode to said optical information reading unit.

\* \* \* \* \*